(12) United States Patent
Holzer et al.

(10) Patent No.: US 10,698,558 B2
(45) Date of Patent: Jun. 30, 2020

(54) AUTOMATIC TAGGING OF OBJECTS ON A MULTI-VIEW INTERACTIVE DIGITAL MEDIA REPRESENTATION OF A DYNAMIC ENTITY

(71) Applicant: Fyusion, Inc., San Francisco, CA (US)

(72) Inventors: Stefan Johannes Josef Holzer, San Mateo, CA (US); Stephen David Miller, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 164 days.

(21) Appl. No.: 15/620,506

(22) Filed: Jun. 12, 2017

(65) Prior Publication Data

US 2017/0277363 A1 Sep. 28, 2017

Related U.S. Application Data

(63) Continuation-in-part of application No. 14/800,638, filed on Jul. 15, 2015, now Pat. No. 9,940,541.
(Continued)

(51) Int. Cl.
*G06F 3/0481* (2013.01)
*G06F 16/58* (2019.01)
(Continued)

(52) U.S. Cl.
CPC ........ *G06F 3/0481* (2013.01); *G06F 16/5866* (2019.01); *G06F 16/7867* (2019.01);
(Continued)

(58) Field of Classification Search
CPC . G06F 3/0481; G06F 16/5866; G06F 16/7867
See application file for complete search history.

(56) References Cited

U.S. PATENT DOCUMENTS

| 5,613,048 A | 3/1997 | Chen et al. |
| 5,926,190 A | 7/1999 | Turkowski et al. |

(Continued)

OTHER PUBLICATIONS

"U.S. Appl. No. 14/800,638, Non Final Office Action dated Jul. 29, 2016", 11 pages.
(Continued)

*Primary Examiner* — Roland J Casillas
(74) *Attorney, Agent, or Firm* — Kwan & Olynick LLP

(57) ABSTRACT

Various embodiments of the present disclosure relate generally to systems and methods for automatic tagging of objects on a multi-view interactive digital media representation of a dynamic entity. According to particular embodiments, the spatial relationship between multiple images and video is analyzed together with location information data, for purposes of creating a representation referred to herein as a multi-view interactive digital media representation for presentation on a device. Multi-view interactive digital media representations correspond to multi-view interactive digital media representations of the dynamic objects in backgrounds. A first multi-view interactive digital media representation of a dynamic object is obtained. Next, the dynamic object is tagged. Then, a second multi-view interactive digital media representation of the dynamic object is generated. Finally, the dynamic object in the second multi-view interactive digital media representation is automatically identified and tagged.

20 Claims, 39 Drawing Sheets

Related U.S. Application Data

(60) Provisional application No. 62/377,516, filed on Aug. 19, 2016.

(51) Int. Cl.

| | | |
|---|---|---|
| *G06F 16/78* | (2019.01) | |
| *G06T 15/20* | (2011.01) | |
| *G06K 9/22* | (2006.01) | |
| *G06K 9/00* | (2006.01) | |

(52) U.S. Cl.
CPC ........... *G06K 9/00664* (2013.01); *G06K 9/22* (2013.01); *G06T 15/205* (2013.01)

(56) References Cited

U.S. PATENT DOCUMENTS

| | | | |
|---|---|---|---|
| 6,252,974 B1 | 6/2001 | Martens et al. | |
| 6,504,569 B1 | 1/2003 | Jasinschi et al. | |
| 8,078,004 B2 | 12/2011 | Kang et al. | |
| 8,244,069 B1 * | 8/2012 | Bourdev | G06K 9/033 382/291 |
| 8,803,912 B1 | 8/2014 | Fouts | |
| 9,129,179 B1 * | 9/2015 | Wong | G06F 16/583 |
| 2002/0094125 A1 | 7/2002 | Guo | |
| 2005/0232467 A1 | 10/2005 | Mohri et al. | |
| 2009/0153549 A1 * | 6/2009 | Lynch | G06T 15/205 345/419 |
| 2009/0263045 A1 | 10/2009 | Szeliski et al. | |
| 2009/0276805 A1 * | 11/2009 | Andrews, II | G06Q 30/02 725/35 |
| 2011/0007072 A1 * | 1/2011 | Khan | G06T 17/00 345/420 |
| 2011/0170789 A1 | 7/2011 | Amon et al. | |
| 2011/0261050 A1 | 10/2011 | Smolic et al. | |
| 2012/0147224 A1 | 6/2012 | Takayama | |
| 2012/0167146 A1 * | 6/2012 | Incorvia | H04N 21/234318 725/60 |
| 2013/0016897 A1 | 1/2013 | Cho et al. | |
| 2013/0018881 A1 | 1/2013 | Bhatt | |
| 2013/0057644 A1 | 3/2013 | Stefanoski et al. | |
| 2013/0162634 A1 | 6/2013 | Baik | |
| 2014/0049607 A1 | 2/2014 | Amon et al. | |
| 2014/0087877 A1 | 3/2014 | Krishnan | |
| 2014/0211989 A1 | 7/2014 | Ding et al. | |
| 2014/0253746 A1 | 9/2014 | Voss et al. | |
| 2014/0307045 A1 | 10/2014 | Richardt et al. | |
| 2015/0130799 A1 | 5/2015 | Holzer et al. | |
| 2015/0130894 A1 | 5/2015 | Holzer et al. | |
| 2015/0379763 A1 | 12/2015 | Liktor et al. | |
| 2016/0283826 A1 * | 9/2016 | Zhou | G06K 9/00677 |
| 2016/0344930 A1 * | 11/2016 | Chaaraoui | H04N 5/23238 |
| 2017/0018054 A1 | 1/2017 | Holzer et al. | |
| 2017/0018055 A1 | 1/2017 | Holzer et al. | |
| 2017/0018056 A1 | 1/2017 | Holzer et al. | |
| 2017/0084001 A1 | 3/2017 | Holzer et al. | |
| 2017/0126988 A1 | 5/2017 | Holzer et al. | |
| 2017/0148179 A1 | 5/2017 | Holzer et al. | |
| 2017/0148186 A1 | 5/2017 | Holzer et al. | |
| 2017/0148199 A1 | 5/2017 | Holzer et al. | |
| 2017/0148222 A1 | 5/2017 | Holzer et al. | |
| 2017/0148223 A1 | 5/2017 | Holzer et al. | |

OTHER PUBLICATIONS

"U.S. Appl. No. 14/800,638, Examiner Interview Summary dated May 9, 2017", 2 pages.

"U.S. Appl. No. 14/800,638, Examiner Interview Summary dated Nov. 7, 2016", 3 pages.

"U.S. Appl. No. 14/800,638, Final Office Action dated Jan. 20, 2017", 12 pages.

"U.S. Appl. No. 14/800,638, Non Final Office Action dated Jun. 15, 2017", 12 pgs.

"U.S. Appl. No. 14/800,640, Restriction Requirement dated Mar. 3, 2017", 5 pages.

"U.S. Appl. No. 14/800,642, Non Final Office Action dated May 18, 2017", 17 pages.

"U.S. Appl. No. 14/800,638, Advisory Action dated May 9, 2017", 5 pgs.

"International Application Serial No. PCT/US2016/042355, Search Report and Written Opinion dated Oct. 19, 2016", 9 pages.

"Int'l Application Serial No. PCT/US17/47684, Int'l Search Report and Written Opinion dated Oct. 27, 2017", 8 pgs.

\* cited by examiner

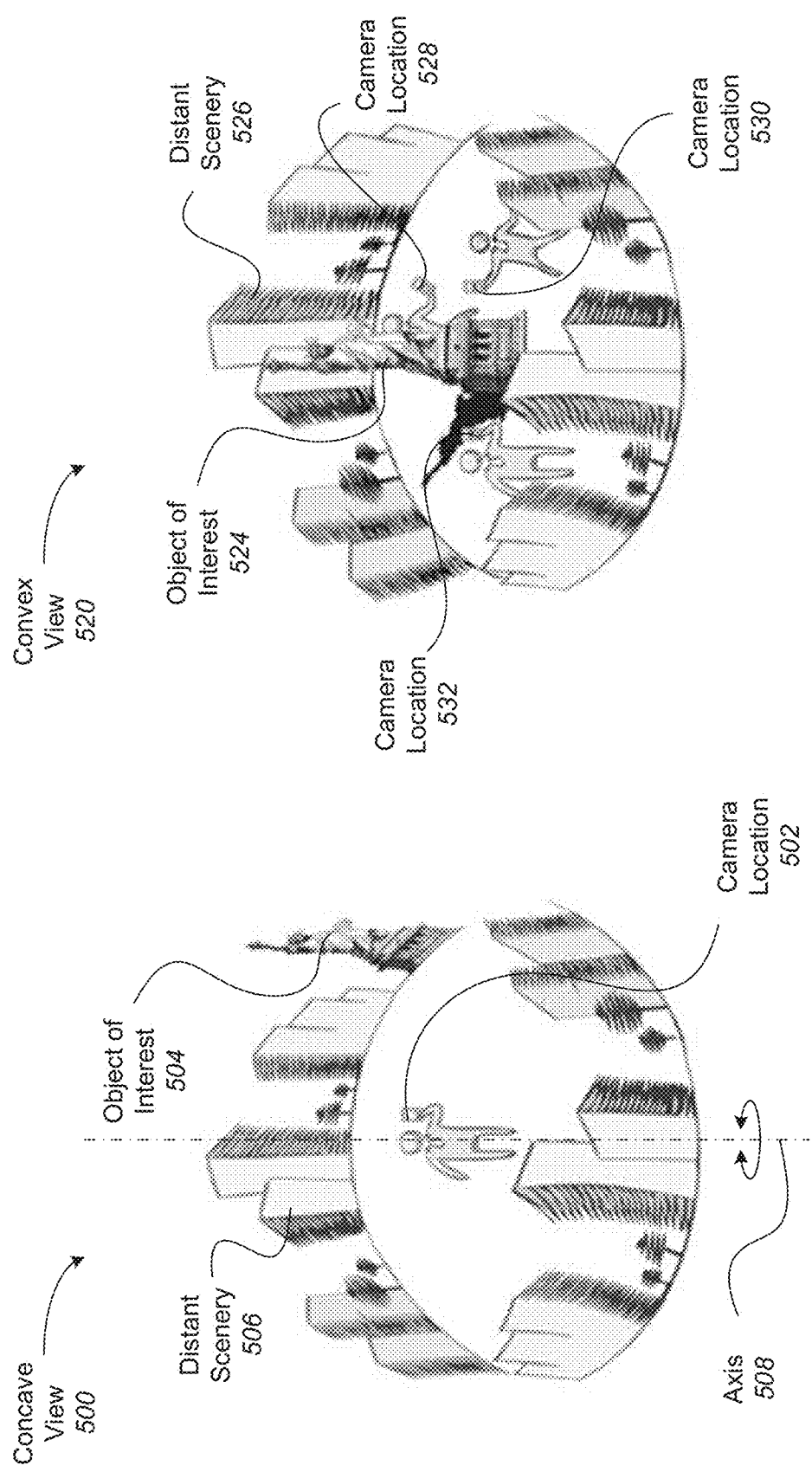

AUTOMATIC TAGGING OF OBJECTS ON A MULTI-VIEW INTERACTIVE DIGITAL MEDIA REPRESENTATION OF A DYNAMIC ENTITY

CROSS REFERENCE TO RELATED APPLICATION

This application claims the benefit of U.S. Provisional Application No. 62/377,516, filed on Aug. 19, 2016, which is incorporated by reference herein in its entirety for all purposes. In addition, this application is a Continuation-in-Part of U.S. application Ser. No. 14/800,638, filed on Jul. 15, 2015, which is also incorporated by reference herein in its entirety for all purposes.

TECHNICAL FIELD

The present disclosure relates generally to multi-view interactive digital media representations.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Current predictions (Ref: KPCB "Internet Trends 2012" presentation") indicate that every several years the quantity of visual data that is being captured digitally online will double. As this quantity of visual data increases, so does the need for much more comprehensive search and indexing mechanisms than ones currently available. Unfortunately, neither 2D images nor 2D videos have been designed for these purposes. Accordingly, improved mechanisms that allow users to view and index visual data, as well as query and quickly receive meaningful results from visual data are desirable.

SUMMARY

Various embodiments of the present disclosure relate generally to systems and methods for automatic tagging of objects on a multi-view interactive digital media representation (MIDMR) of a dynamic entity. According to particular embodiments, the spatial relationship between multiple images and video is analyzed together with location information data, for purposes of creating a representation referred to herein as a multi-view interactive digital media representation for presentation on a device. Multi-view interactive digital media representations correspond to multi-view interactive digital media representations of the dynamic objects in backgrounds. A first multi-view interactive digital media representation of a dynamic object is obtained. Next, the dynamic object is tagged. Then, a second multi-view interactive digital media representation of the dynamic object is generated. Finally, the dynamic object in the second multi-view interactive digital media representation is automatically identified and tagged.

BRIEF DESCRIPTION OF THE DRAWINGS

The disclosure may best be understood by reference to the following description taken in conjunction with the accompanying drawings, which illustrate particular embodiments of the present disclosure.

FIGS. 5A-5B illustrate examples of concave view and convex views, respectively, where both views use a back-camera capture style.

DETAILED DESCRIPTION

Figure 1:
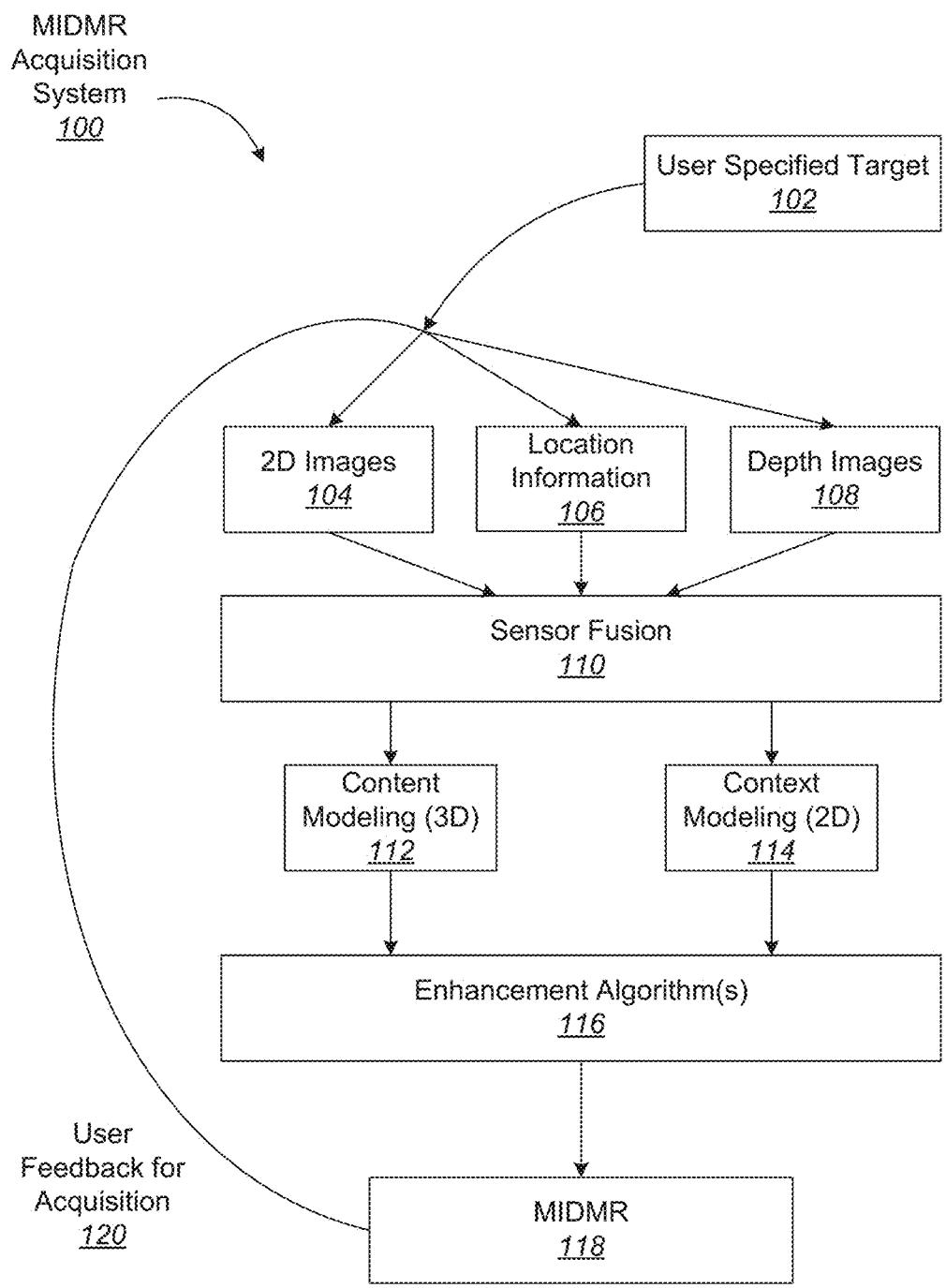
FIG. 1 illustrates an example of a MIDMR acquisition system.

As used herein, the term "multi-view interactive digital media representation" (MIDMR) refers to a technological improvement over a typical "surround view." Hence, while MIDMRs are similar to surround views, they are technically distinct based on more advanced features of MIDMRs, e.g., IMU rotational compensation factors allowing for imperfect capture arc trajectories.

A MIDMR is generated after any enhancement algorithms are applied. In various examples, the MIDMR can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MIDMRs that allow the MIDMRs to be indexed with a high degree of efficiency and accuracy; and the ability of the user to interact and change the viewpoint of the MIDMR. In particular example embodiments, the characteristics described above can be incorporated natively in the MIDMR representation, and provide the capability for use in various applications. For instance, MIDMRs can be used to enhance various fields such as e-commerce, visual search, 3D printing, file sharing, user interaction, and entertainment.

In some embodiments, the MIDMR model is not an actual three-dimensional model that is rendered, but a three-dimensional view experienced as a three-dimensional model by the user. For example, the MIDMR provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the MIDMR is generated simply through stitching of actual two-dimensional images and/or portions thereof. As used herein, the term "three-dimensional model" is used interchangeably with this type of three-dimensional view. Navigational inputs from an input device can be used to select which images to output in a MIDMR. For example, a user can tilt a mobile device or swipe a touch screen display to select the images to output in a MIDMR. The navigational inputs change the apparent position of the object included in a MIDMR on the display. For example, the object can appear to rotate on the display in response to the navigational inputs.

The MIDMR approach differs from rendering an object from a full 3-D model. With a full 3-D model approach, the navigational inputs can be used to adjust the position of the 3-D model in 3-D model space. Then, the 3-D model can be re-rendered to a 2-D image each time its position changes in the 3-D model space in response to the navigational inputs. This 3-D model approach provides for more transitions because the movements of the object are not predetermined. However, the 3-D model approach is computationally expensive, especially as the complexity of the 3-D model increases. Further, it requires the generation of a 3-D model, which can be time consuming.

The MIDMR approach doesn't require the constant rendering of images from a 3-D model space to a 2-D image. Further, the MIDMR approach doesn't require the generation of a 3-D model. Thus, the MIDMR approach can represent apparent motions of an object in 3-D in a faster and more computational efficient manner.

In various embodiments, a MIDMR can include images with an object. When the MIDMR is output, the object can appear to have an apparent motion, such as an ability to rotate about one or more axes. For example, the MIDMR can include images of a person that when output make the person appear to rotate about an axis such that the person can be viewed from different angles. The apparent rotation is accomplished using 2-D images only and doesn't require a 3-D model of the object, such as 3-D model including a plurality of polygons and associated textures. Hence, the operations can be performed in a more computationally efficient manner, as a textured 3-D model of the object doesn't have to be generated, the position of the 3-D model of the object and its polygons in the 3-D space for each rotation doesn't have to be determined and, after the 3-D model of the object is positioned in the 3-D space, it doesn't have to be textured and then rendered to a 2-D image for output to a display. The elimination of these steps with a MIDMR approach significantly reduces memory requirements and CPU requirements as compared to a traditional 3-D modeling approach.

In addition, when an apparent motion of an object is output from a MIDMR, it appears as if the object motion is generated from an image quality 3-D textured model. Image quality 3-D textured models are generated in a time consuming and often manual process. In particular, the generation of an image quality textured 3-D model of an object, such as an actual person, is quite difficult and time consuming, especially, when a "life like" rendering of the object is desired.

In the MIDMR approach, because of the elimination of the 3-D modeling steps, user-selected objects from user generated 2-D images can be converted quickly to a MIDMR and then output to a display in real-time. During output, the user can control aspects of apparent motion of the object within the MIDMR. Because the object in the MIDMR can be generated from real images, such as images received from a user controlled camera, the object appears life-like when output. In a traditional 3-D modeling approach, because of the difficulties associated with generating an image quality 3-D model, this capability is not offered.

Reference will now be made in detail to some specific examples of the systems and methods described in the present disclosure including the best modes for carrying the described systems and methods. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

Various aspects of the present disclosure relate generally to systems and methods for analyzing the spatial relationship between multiple images and video together with location information data, for the purpose of creating a single representation, a MIDMR, which eliminates redundancy in the data, and presents a user with an interactive and immersive active viewing experience. According to various embodiments, active is described in the context of providing a user with the ability to control the viewpoint of the visual information displayed on a screen. In particular example embodiments, the MIDMR data structure (and associated algorithms) is natively built for, but not limited to, applications involving visual search.

With reference to FIG. 1, shown is one example of a MIDMR acquisition system 100. In the present example embodiment, the MIDMR acquisition system 100 is depicted in a flow sequence that can be used to generate a MIDMR. According to various embodiments, the data used to generate a MIDMR can come from a variety of sources. In particular, data such as, but not limited to two-dimensional (2D) images 104 can be used to generate a MIDMR. These 2D images can include color image data streams such as multiple image sequences, video data, etc., or multiple images in any of various formats for images, depending on the application. Another source of data that can be used to generate a MIDMR includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a MIDMR can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a MIDMR can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a MIDMR are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a MIDMR can be generated without a user specified target in some applications.

In the present example embodiment, one or more enhancement algorithms can be applied at enhancement algorithm(s) block 116. In particular example embodiments, various algorithms can be employed during capture of MIDMR data, regardless of the type of capture mode employed. These algorithms can be used to enhance the user experience. For instance, automatic frame selection, stabilization, view interpolation, filters, and/or compression can be used during capture of MIDMR data. In some examples, these enhancement algorithms can be applied to image data after acquisition of the data. In other examples, these enhancement algorithms can be applied to image data during capture of MIDMR data.

According to particular example embodiments, automatic frame selection can be used to create a more enjoyable MIDMR. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a MIDMR in a manner similar to that used for video. In particular, keyframes in a MIDMR can be stabilized for to produce improvements such as smoother transitions, improved/enhanced focus on the content, etc. However, unlike video, there are many additional sources of stabilization for a MIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a MIDMR. Because points of interest in a MIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for MIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MIDMR is often focused on a particular object of interest, a MIDMR can be content-weighted so that the object of interest is maximally stabilized in some examples.

Another way to improve stabilization in a MIDMR includes direct selection of a region of a screen. For instance, if a user taps to focus on a region of a screen, then records a convex MIDMR, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MIDMR in some embodiments. In other embodiments, view interpolation can be applied during MIDMR generation.

In some examples, filters can also be used during capture or generation of a MIDMR to enhance the viewing experience. Just as many popular photo sharing services provide aesthetic filters that can be applied to static, two-dimensional images, aesthetic filters can similarly be applied to surround images. However, because a MIDMR representation is more expressive than a two-dimensional image, and three-dimensional information is available in a MIDMR, these filters can be extended to include effects that are ill-defined in two dimensional photos. For instance, in a MIDMR, motion blur can be added to the background (i.e. context) while the content remains crisp. In another example, a drop-shadow can be added to the object of interest in a MIDMR.

In various examples, compression can also be used as an enhancement algorithm 116. In particular, compression can be used to enhance user-experience by reducing data upload and download costs. Because MIDMRs use spatial information, far less data can be sent for a MIDMR than a typical video, while maintaining desired qualities of the MIDMR. Specifically, the IMU, keypoint tracks, and user input, combined with the view interpolation described above, can all reduce the amount of data that must be transferred to and from a device during upload or download of a MIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MIDMR 118 is generated after any enhancement algorithms are applied. In various examples, the MIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MIDMRs that allow the MIDMRs to be indexed with a high degree of efficiency and accuracy; and the ability of the user to interact and change the viewpoint of the MIDMR. In particular example embodiments, the characteristics described above can be incorporated natively in the MIDMR representation, and provide the capability for use in various applications. For instance, MIDMRs can be used to enhance various fields such as e-commerce, visual search, 3D printing, file sharing, user interaction, and entertainment.

According to various example embodiments, once a MIDMR 118 is generated, user feedback for acquisition 120 of additional image data can be provided. In particular, if a MIDMR is determined to need additional views to provide a more accurate model of the content or context, a user may be prompted to provide additional views. Once these additional views are received by the MIDMR acquisition system 100, these additional views can be processed by the system 100 and incorporated into the MIDMR.

Figure 2:
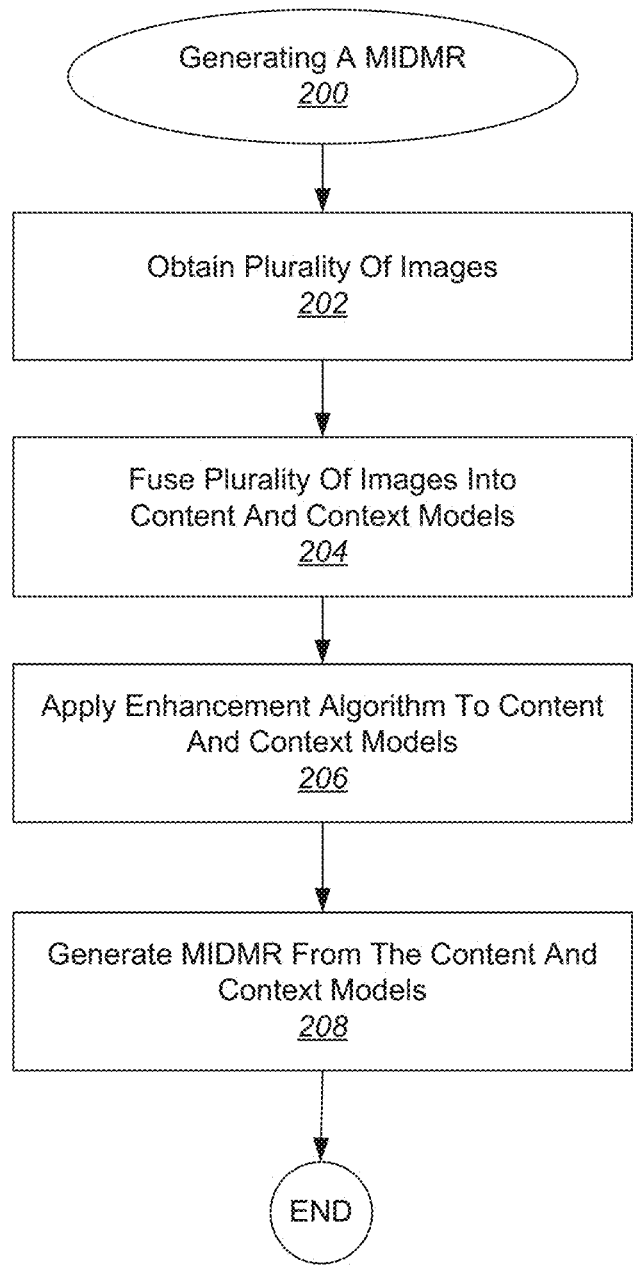
FIG. 2 illustrates an example of a process flow for generating a MIDMR.

With reference to FIG. 2, shown is an example of a process flow diagram for generating a MIDMR 200. In the present example, a plurality of images is obtained at 202. According to various embodiments, the plurality of images can include two-dimensional (2D) images or data streams. These 2D images can include location information that can be used to generate a MIDMR. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a MIDMR is generated from the content and context models at 208. In various examples, the MIDMR can include a three-dimensional model of the content and a two-dimensional model of the context. According to various embodiments, depending on the mode of capture and the viewpoints of the images, the MIDMR model can include certain characteristics. For instance, some examples of different styles of MIDMRs include a locally concave MIDMR, a locally convex MIDMR, and a locally flat MIDMR. However, it should be noted that MIDMRs can include combinations of views and characteristics, depending on the application.

Figure 3:
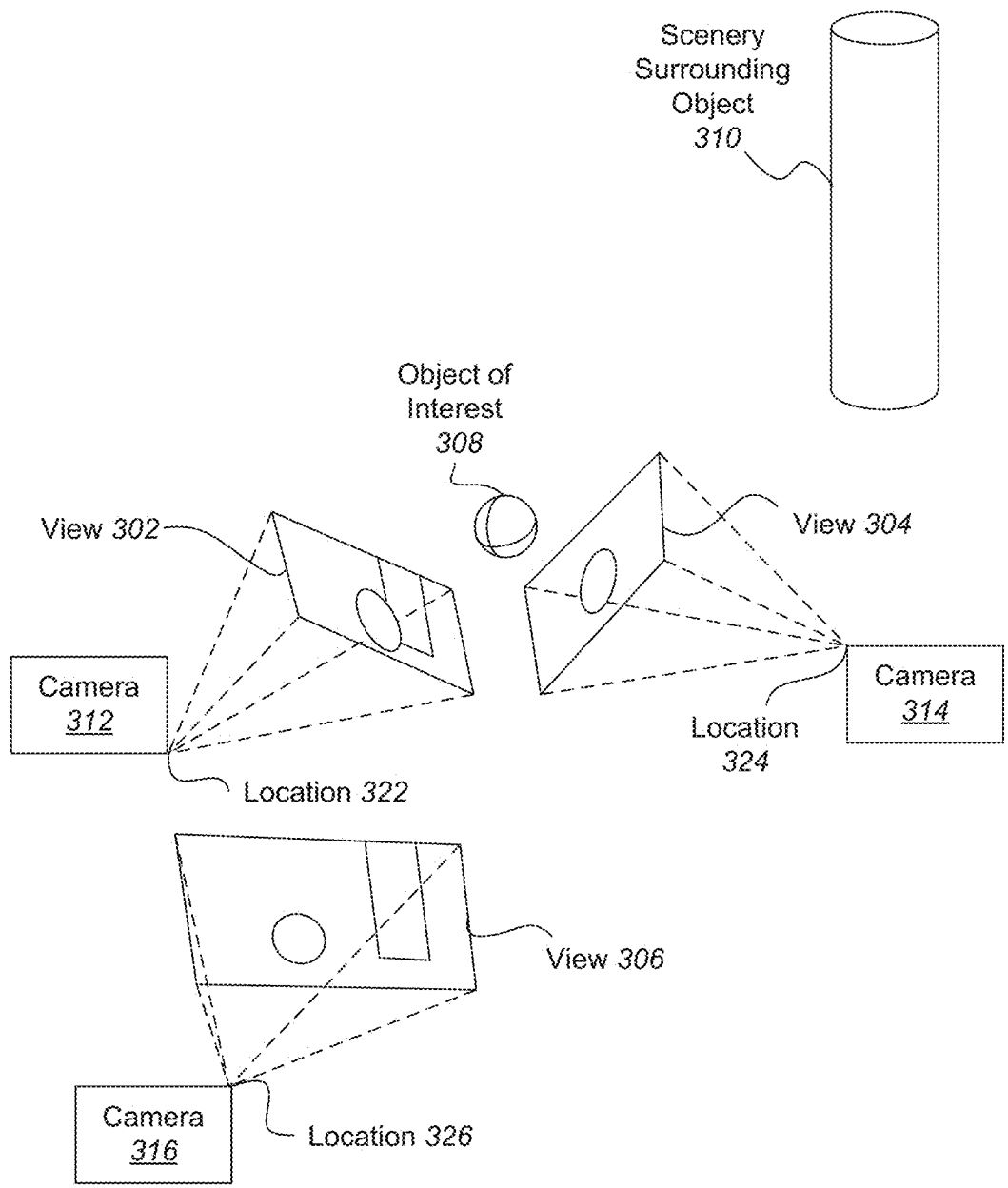
FIG. 3 illustrates one example of multiple camera views that can be fused into a three-dimensional (3D) model to create an immersive experience.

With reference to FIG. 3, shown is one example of multiple camera views that can be fused together into a three-dimensional (3D) model to create an immersive experience. According to various embodiments, multiple images can be captured from various viewpoints and fused together to provide a MIDMR. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 316 along with their associated locations 322, 324, and 326, respectively, provide a rich source of information about object of interest 308 and the surrounding context that can be used to produce a MIDMR. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a MIDMR.

Figure 4A:
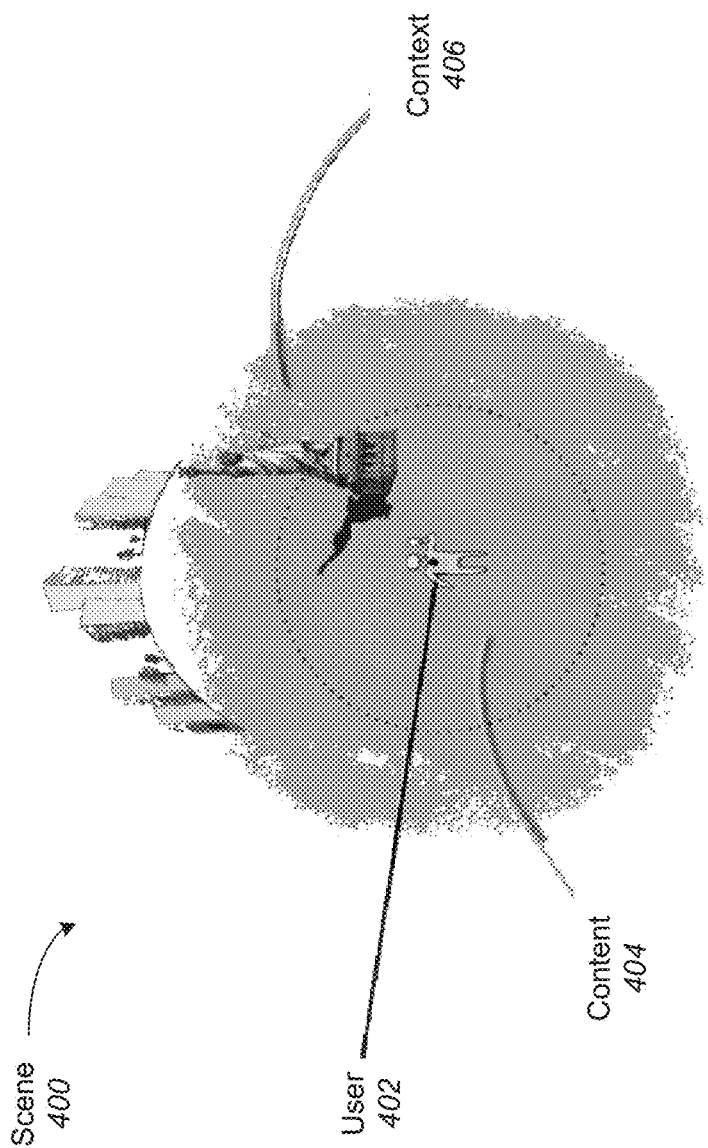
FIG. 4A illustrates one example of separation of content and context in a MIDMR.

FIG. 4A illustrates one example of separation of content and context in a MIDMR. According to various embodiments of the present disclosure, a MIDMR is a representation of a scene 400. With reference to FIG. 4A, shown is a user 402 located in a scene 400. The user 402 is capturing images of an object of interest, such as a statue. The images captured by the user constitute digital visual data that can be used to generate a MIDMR.

According to various embodiments of the present disclosure, the digital visual data included in a MIDMR can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a MIDMR may represent the content 404 as three-dimensional data, and the context 406 as a two-dimensional panoramic background. In other examples, a MIDMR may represent both the content 404 and context 406 as two-dimensional panoramic scenes. In yet other examples, content 404 and context 406 may include three-dimensional components or aspects. In particular embodiments, the way that the MIDMR depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the MIDMR produced may have some characteristics that are similar to other types of digital media such as panoramas. However, according to various embodiments, MIDMRs include additional features that distinguish them from these existing types of digital media. For instance, a MIDMR can represent moving data. Additionally, a MIDMR is not limited to a specific cylindrical, spherical or translational movement. Various motions can be used to capture image data with a camera or other capture device. Furthermore, unlike a stitched panorama, a MIDMR can display different sides of the same object.

Figure 4B:
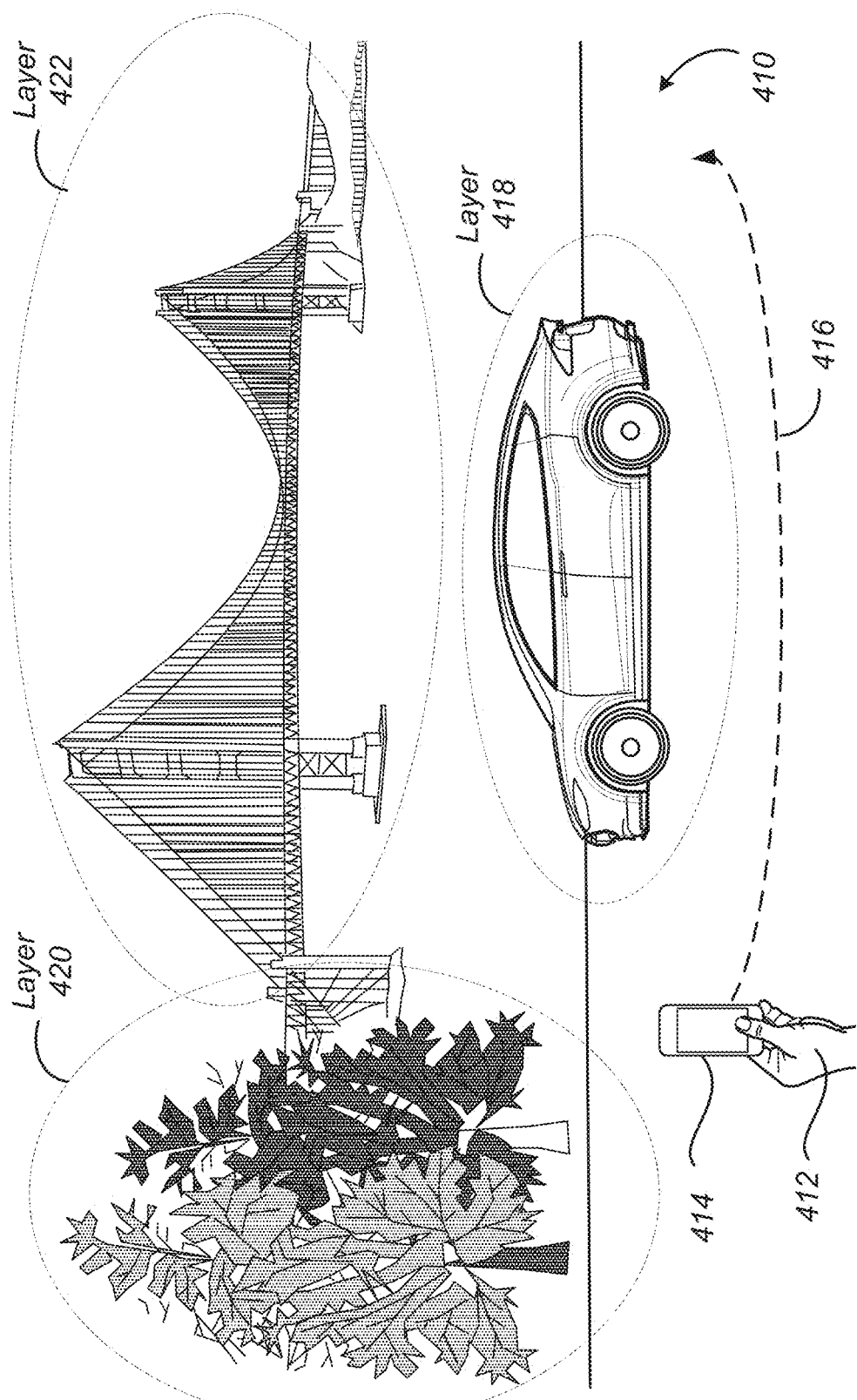
FIG. 4B illustrates one example of layering in a MIDMR.

Although a MIDMR can be separated into content and context in some applications, a MIDMR can also be separated into layers in other applications. With reference to FIG. 4B, shown is one example of layering in a MIDMR. In this example, a layered MIDMR 410 is segmented into different layers 418, 420, and 422. Each layer 418, 420, and 422 can include an object (or a set of objects), people, dynamic scene elements, background, etc. Furthermore, each of these layers 418, 420, and 422 can be assigned a depth.

According to various embodiments, the different layers 418, 420, and 422 can be displayed in different ways. For instance, different filters (e.g. gray scale filter, blurring, etc.) can be applied to some layers but not to others. In other examples, different layers can be moved at different speeds relative to each other, such that when a user swipes through a MIDMR a better three-dimensional effect is provided. Similarly, when a user swipes along the parallax direction, the layers can be displaced differently to provide a better three-dimensional effect. In addition, one or more layers can be omitted when displaying a MIDMR, such that unwanted objects, etc. can be removed from a MIDMR.

In the present example, a user 412 is shown holding a capture device 414. The user 412 moves the capture device 414 along capture motion 416. When the images captured are used to generate a MIDMR, layers 418, 420, and 422 are separated based on depth. These layers can then be processed or viewed differently in a MIDMR, depending on the application.

Figure 4C:
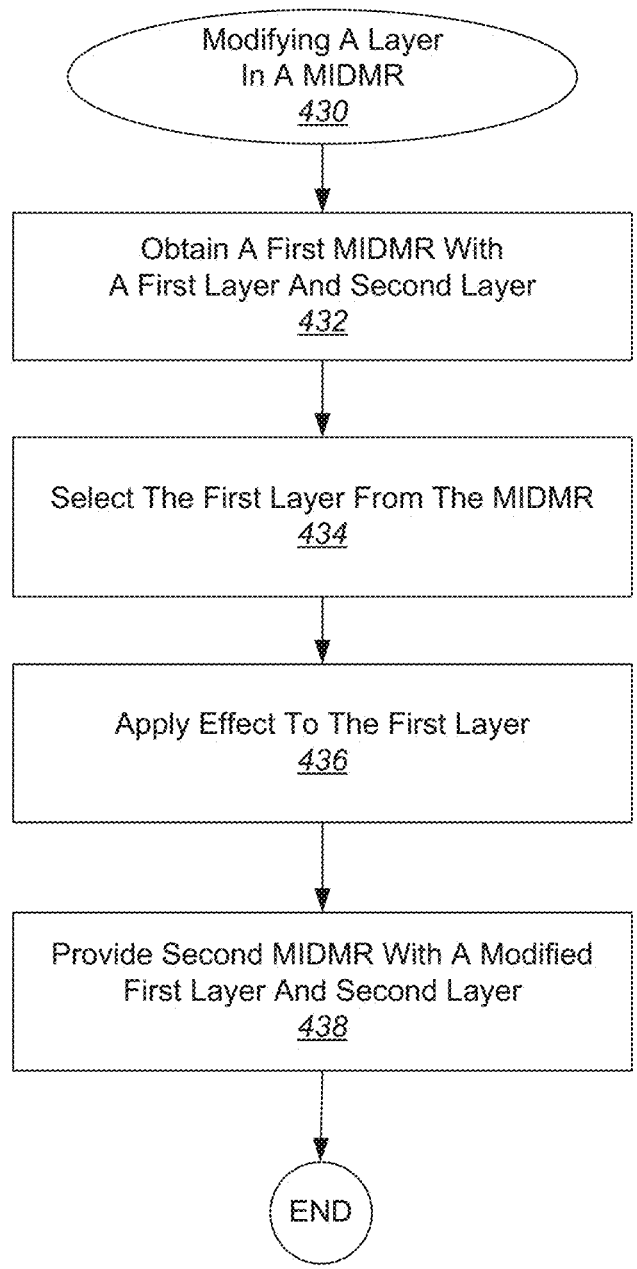
FIG. 4C illustrates one example of a process for modifying a layer in a MIDMR.

With reference to FIG. 4C, shown is one example of a process for generating a MIDMR with a modified layer in a MIDMR 430. In particular, a first MIDMR having a first layer and a second layer is obtained at 432. As described above with regard to FIG. 4B, a MIDMR can be divided into different layers. In the present example, the first layer includes a first depth and the second layer includes a second depth.

Next, the first layer is selected at 434. According to various examples, selecting the first layer includes selecting data within the first depth. More specifically, selecting data within the first depth includes selecting the visual data located within the first depth. According to various embodiments, the first layer can include features such as an object, person, dynamic scene elements, background, etc. In some examples, selection of the first layer is performed automatically without user input. In other examples, selection of the first layer is performed semi-automatically using user-guided interaction.

After the first layer is selected, an effect is applied to the first layer within the first MIDMR to produce a modified first layer at 436. In one example, the effect applied can be a filter such as a blurring filter, gray scale filter, etc. In another example, the effect applied can include moving the first layer at a first speed relative to the second layer, which is moved at a second speed. When the first speed is different from the second speed, three-dimensional effects can be improved in some instances. In some applications, a parallax effect can occur, thereby creating a three-dimensional effect.

Next, a second MIDMR is generated that includes the modified first layer and the second layer at 438. As described above, applying one or more effects to the first layer can improve the three-dimensional effects of a MIDMR in some applications. In these applications, the second MIDMR can have improved three-dimensional effects when compared to the first MIDMR. Other effects can be applied in different examples, and can emphasize or deemphasize various aspects of a first MIDMR to yield a second MIDMR. In addition, in some applications, a layer can be omitted in a second MIDMR. Specifically, when the first MIDMR includes a third layer, the second MIDMR omits this third layer. In one example, this third layer could include an object or person that would be "edited out" in the generated second MIDMR. In another example, this third layer could include a background or background elements, and the second MIDMR generated would not include the background or background elements. Of course, any object or feature can be located in this omitted third layer, depending on the application.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MIDMR.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6E illustrate examples of various capture modes for MIDMRs. Although various motions can be used to capture a MIDMR and are not constrained to any particular type of motion, three general types of motion can be used to capture particular features or views described in conjunction MIDMRs. These three types of motion, respectively, can yield a locally concave MIDMR, a locally convex MIDMR, and a locally flat MIDMR. In some examples, a MIDMR can include various types of motions within the same MIDMR.

Figure 6A:
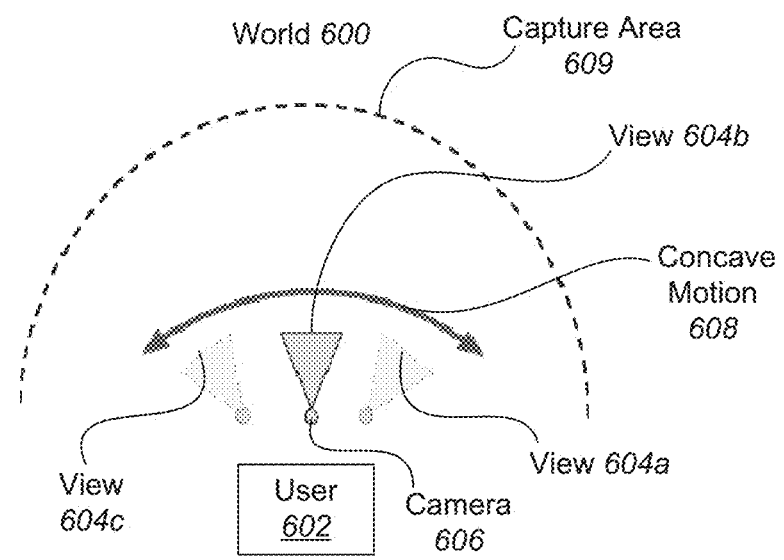
FIGS. 6A-6E illustrate examples of various capture modes for MIDMRs.

With reference to FIG. 6A, shown is an example of a back-facing, concave MIDMR being captured. According to various embodiments, a locally concave MIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
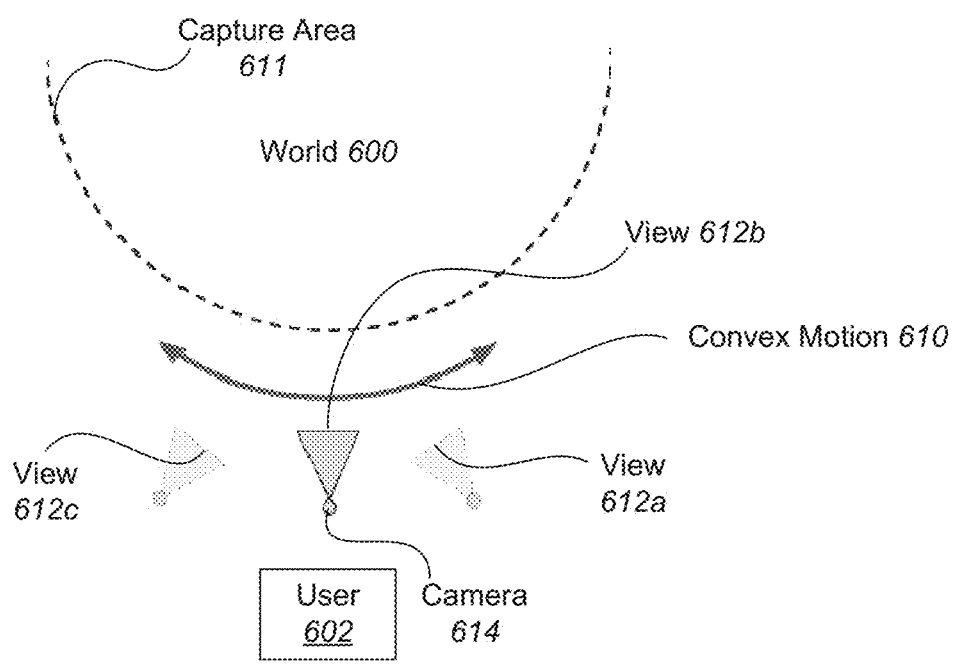

With reference to FIG. 6B, shown is an example of a back-facing, convex MIDMR being captured. According to various embodiments, a locally convex MIDMR is one in which viewing angles converge toward a single object of interest. In some examples, a locally convex MIDMR can provide the experience of orbiting about a point, such that a viewer can see multiple sides of the same object. This object, which may be an "object of interest," can be segmented from the MIDMR to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
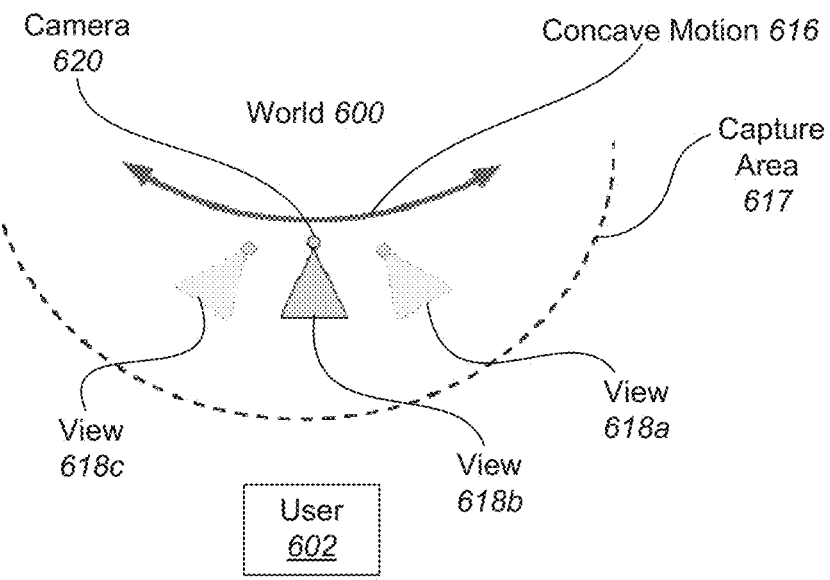

With reference to FIG. 6C, shown is an example of a front-facing, concave MIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
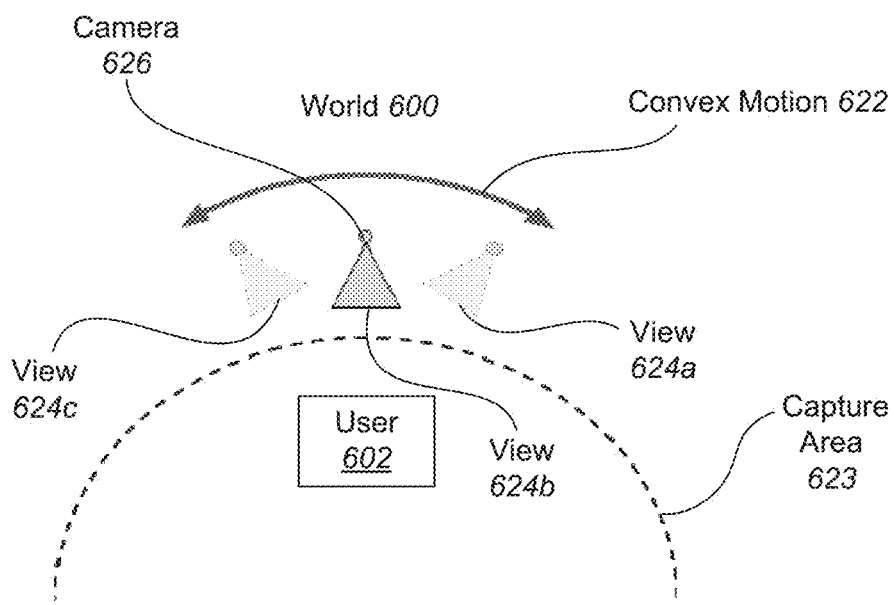

With reference to FIG. 6D, shown is an example of a front-facing, convex MIDMR being captured. In the present example embodiment, camera 626 is facing user 602. The camera follows a convex motion 622 such that the views 624a, 624b, and 624c converge towards the user 602. The capture area 617 follows a concave shape that surrounds the user 602.

Figure 6E:
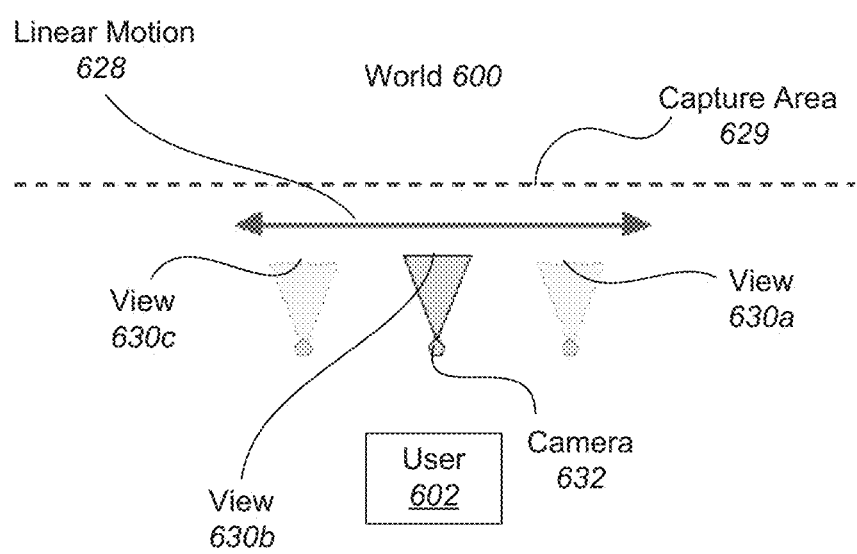

With reference to FIG. 6E, shown is an example of a back-facing, flat view being captured. In particular example embodiments, a locally flat MIDMR is one in which the rotation of the camera is small compared to its translation. In a locally flat MIDMR, the viewing angles remain roughly parallel, and the parallax effect dominates. In this type of MIDMR, there can also be an "object of interest", but its position does not remain fixed in the different views. Previous technologies also fail to recognize this type of viewing angle in the media-sharing landscape.

In the present example embodiment, camera 632 is facing away from user 602, and towards world 600. The camera follows a generally linear motion 628 such that the capture area 629 generally follows a line. The views 630a, 630b, and 630c have generally parallel lines of sight. An object viewed in multiple views can appear to have different or shifted background scenery in each view. In addition, a slightly different side of the object may be visible in different views. Using the parallax effect, information about the position and characteristics of the object can be generated in a MIDMR that provides more information than any one static image.

As described above, various modes can be used to capture images for a MIDMR. These modes, including locally concave, locally convex, and locally linear motions, can be used during capture of separate images or during continuous recording of a scene. Such recording can capture a series of images during a single session.

Figure 7A:
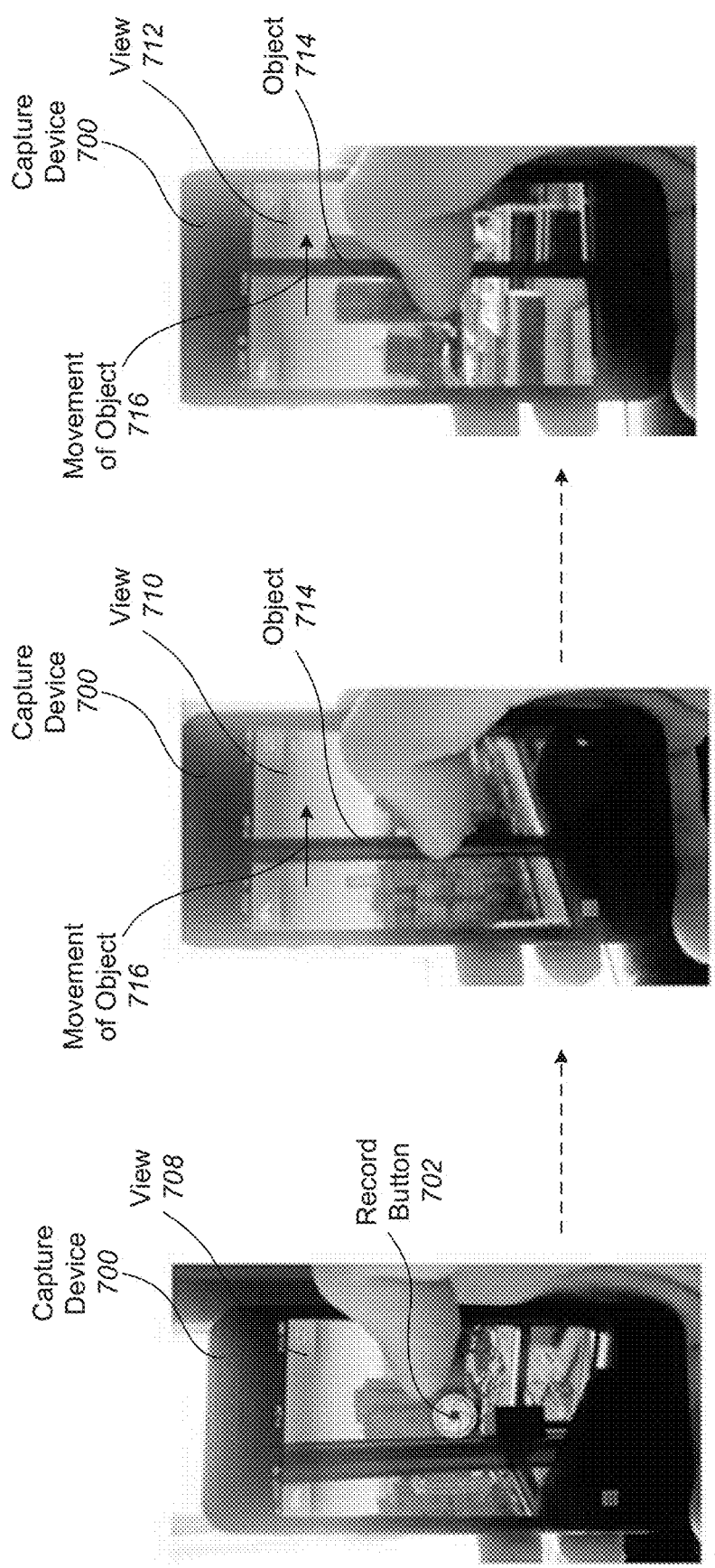
FIG. 7A illustrates one example of a process for recording data that can be used to generate a MIDMR.

According to various embodiments of the present disclosure, a MIDMR can be generated from data acquired in numerous ways. FIG. 7A illustrates one example of process for recording data that can be used to generate a MIDMR. In this example, data is acquired by moving a camera through space. In particular, a user taps a record button 702 on a capture device 700 to begin recording. As movement of the capture device 716 follows a generally leftward direction, an object 714 moves in a generally rightward motion across the screen, as indicated by movement of object 716. Specifically, the user presses the record button 702 in view 708, and then moves the capture device leftward in view 710. As the capture device moves leftward, object 714 appears to move rightward between views 710 and 712. In some examples, when the user is finished recording, the record button 702 can be tapped again. In other examples, the user can tap and hold the record button during recording, and release to stop recording. In the present embodiment, the recording captures a series of images that can be used to generate a MIDMR.

According to various embodiments, different types of panoramas can be captured in MIDMRs, depending on the type of movement used in the capture process. In particular, dynamic panoramas, object panoramas, and selfie panoramas can be generated based on captured data. In some embodiments, the captured data can be recorded as described with regard to FIG. 7A.

Figure 7B:
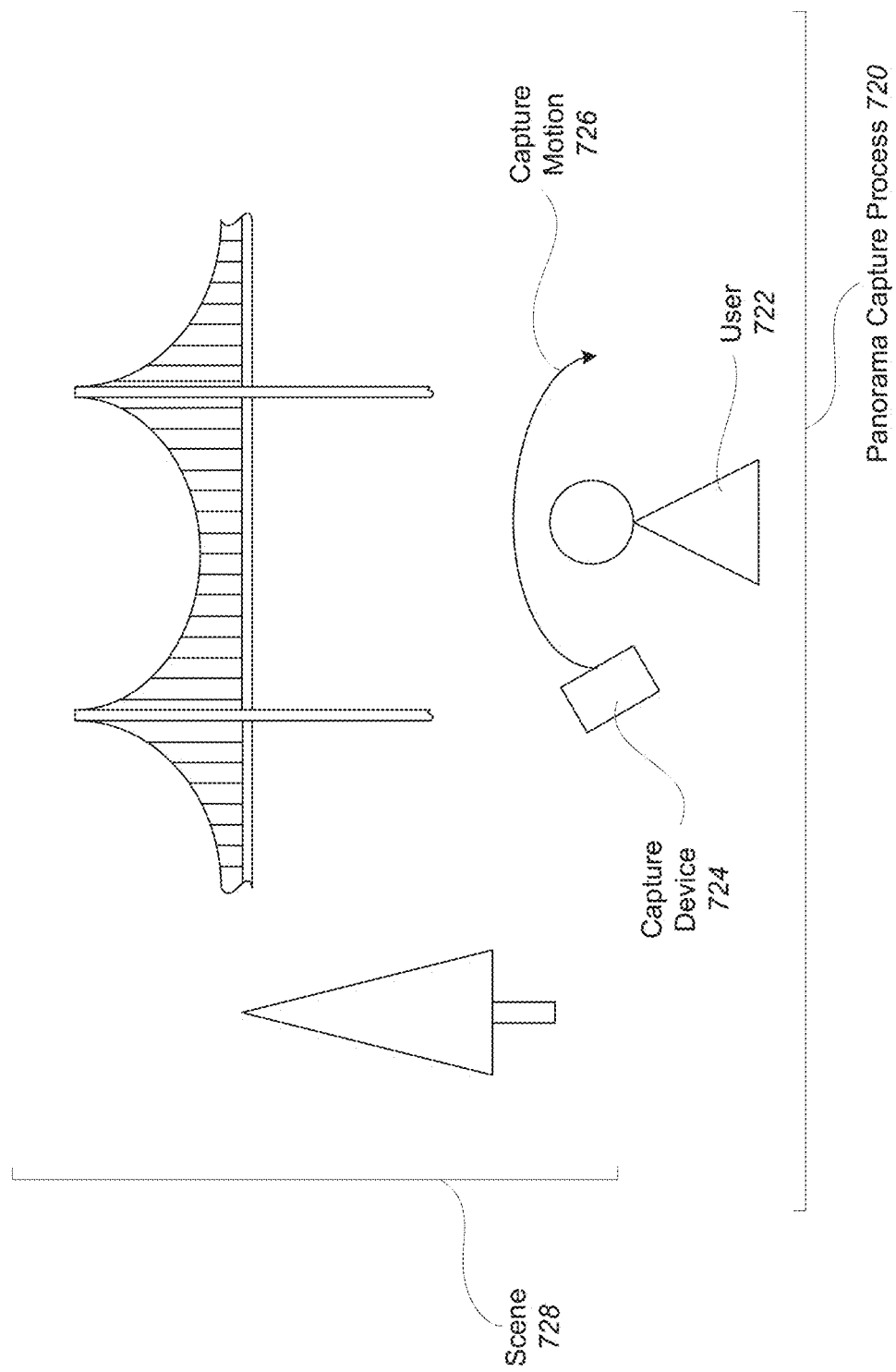
FIG. 7B illustrates one example of a dynamic panorama capture process.

FIGS. 7B-7F illustrate examples relating to dynamic panoramas that can be created with MIDMRs. With particular reference to FIG. 7B, shown is one example of a dynamic panorama capture process 720. In the present example, a user 722 moves capture device 724 along capture motion 726. This capture motion 726 can include rotating, waving, translating, etc. the capture device 724. During this capture process, a panorama of scene 728 is generated and dynamic content within the scene is kept. For instance, moving objects are preserved within the panorama as dynamic content.

Figure 7C:
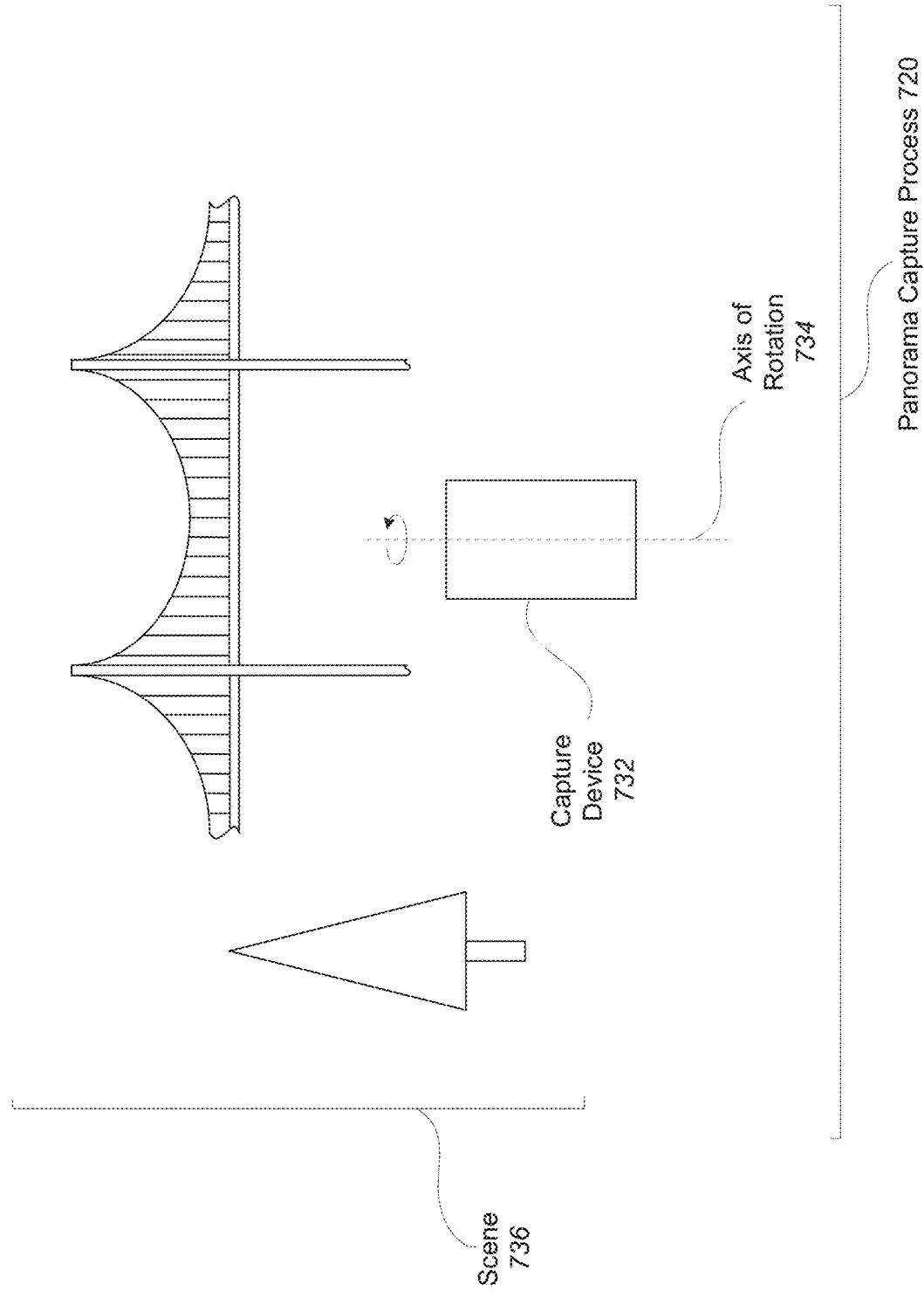
FIG. 7C illustrates one example of a dynamic panorama capture process where the capture device is rotated through the axis of rotation.

With reference to FIG. 7C, shown is a specific example of a dynamic panorama capture process 730 where a capture device 732 is rotated through an axis of rotation 734. In particular, capture device 732 is rotated about its center along an axis of rotation 734. This pure rotation captures a panorama of scene 736. According to various examples, this type of panorama can provide a "flat" scene that captures entities in the scene at a particular point in time. This "flat" scene can be a two-dimensional image, or can be an image projected on a cylinder, surface, etc.

Figure 7D:
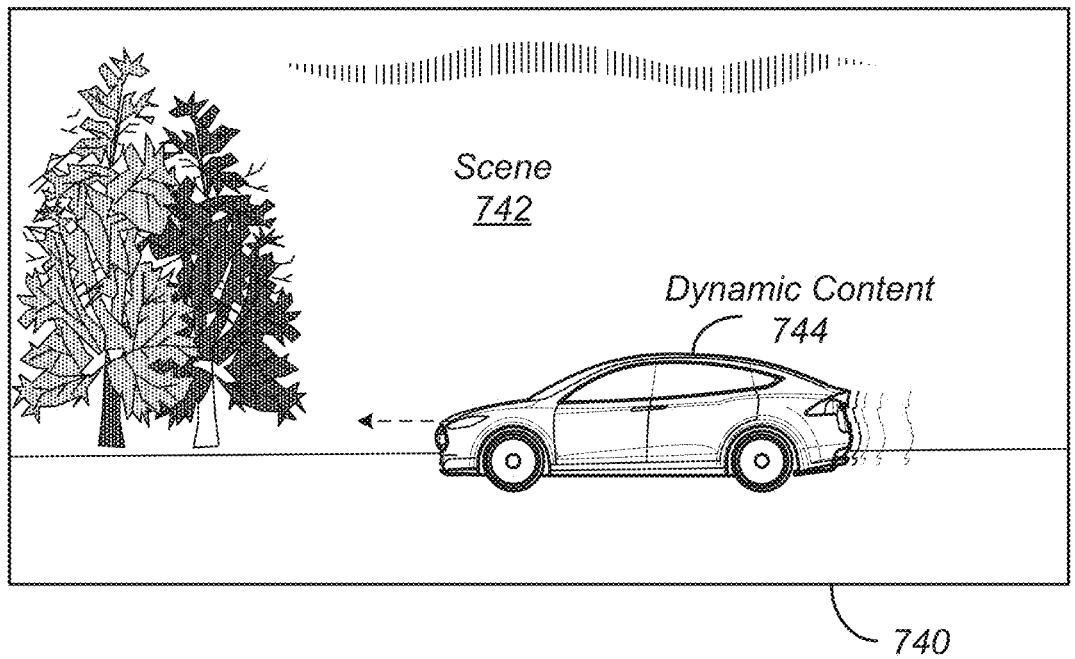
FIG. 7D illustrates one example of a dynamic panorama with dynamic content.

With reference to FIG. 7D, shown is one example of a dynamic panorama 740 with dynamic content 744. Once a panorama is captured, as described above with regard to FIGS. 7B-7C, a dynamic panorama 740 can be navigated by a user. In the present example, dynamic content 744 is animated when the user navigates through the dynamic panorama 740. For instance, as the user swipes across scene 742, the dynamic content 744 can be seen moving with respect to the scene 742.

Figure 7E:
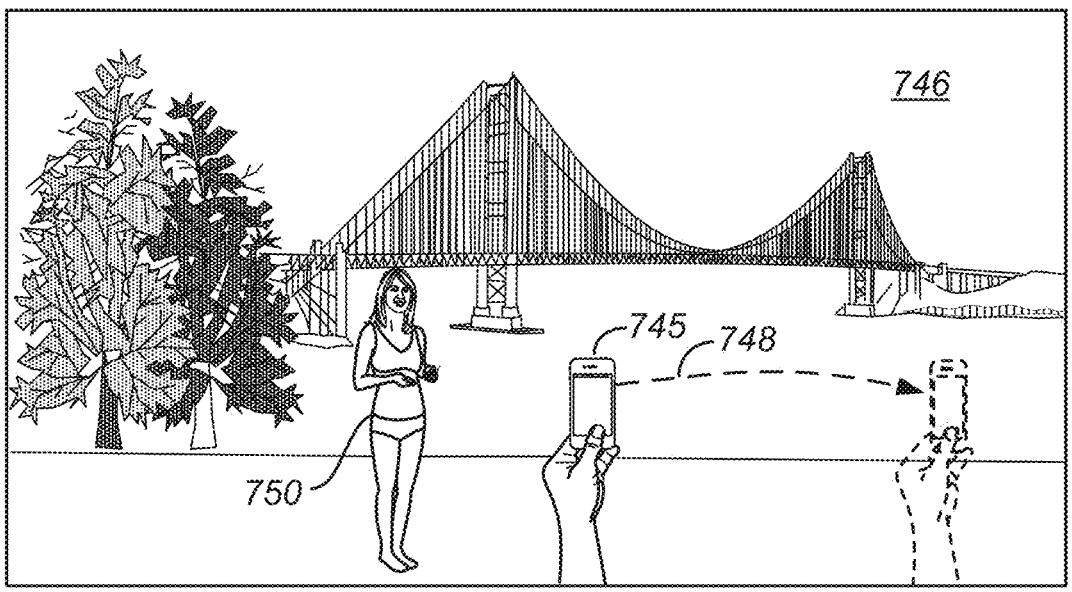
FIG. 7E illustrates one example of capturing a dynamic panorama with a 3D effect.

With reference to FIG. 7E, shown is one example of capturing a dynamic panorama with a 3D effect. In the present example, if a capture device is not rotated exactly around its camera center (as in FIG. 7C), a 3D effect can be obtained by moving different parts of the panorama at different speeds while the user navigates through the dynamic content. Although a nearby person or object 750 would create artifacts in a standard panorama capture process if the capture device is not rotated around its camera center (as in FIG. 7C), these "imperfections" can be used to create a 3D impression to the user by moving the object 750 at a different speed when swiping/navigating through a dynamic panorama. In particular, the capture device 745 shown uses a capture motion 748 that captures a distant scene 746 and a nearby person/object 750. The movements of the nearby person/object 750 can be captured as 3D motion within the MIDMR, while the distant scenery 746 appears to be static as the user navigates through the MIDMR, according to various embodiments.

Figure 7F:
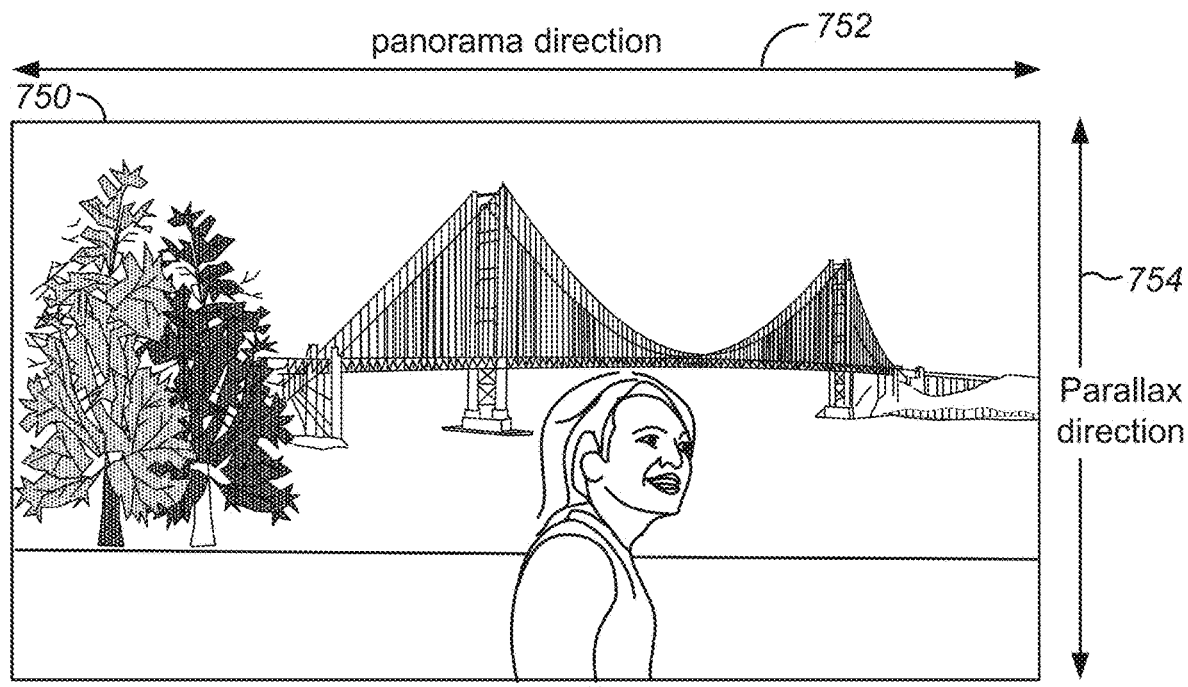
FIG. 7F illustrates one example of a dynamic panorama with parallax effect.

With reference to FIG. 7F, shown is one example of a dynamic panorama 750 with parallax effect. Three-dimensional effects can be presented by applying a parallax effect when swiping perpendicular to the panorama direction 752. In particular, when swiping perpendicular to the panorama direction, along the parallax direction 754, nearby objects are displaced along the parallax direction 754 while the scene at distance stays still or moves less than the nearby objects.

Figure 7G:
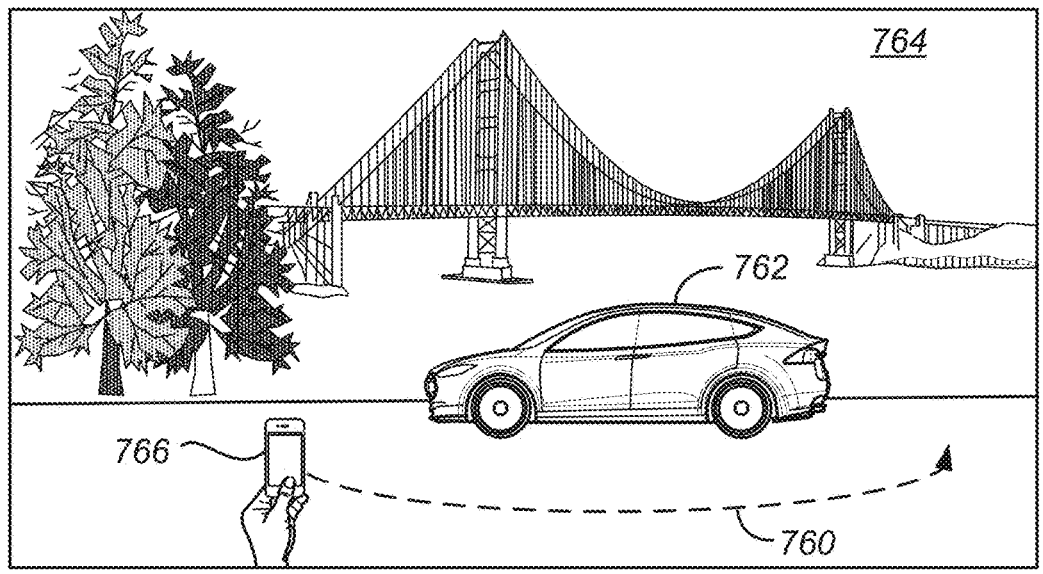
FIG. 7G illustrates one example of an object panorama capture process.

FIGS. 7G-7J illustrate examples relating to object panoramas that can be created with MIDMRs. With reference to FIG. 7G, shown is one example of an object panorama capture process. In particular, a capture device 766 is moved around an object 762 along a capture motion 760. One particular example of a capture device 766 is a smartphone. The capture device 766 also captures a panoramic view of the background 764 as various views and angles of the object 762 are captured. The resulting MIDMR includes a panoramic view of object 762.

Figure 7H:
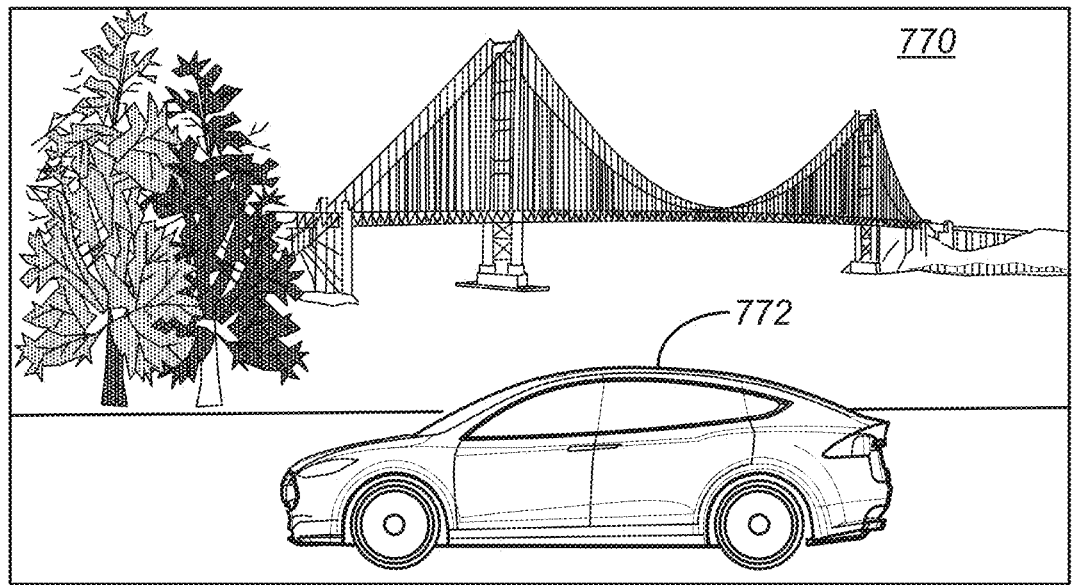
FIG. 7H illustrates one example of a background panorama with an object panorama projected on it.
Figure 17A:
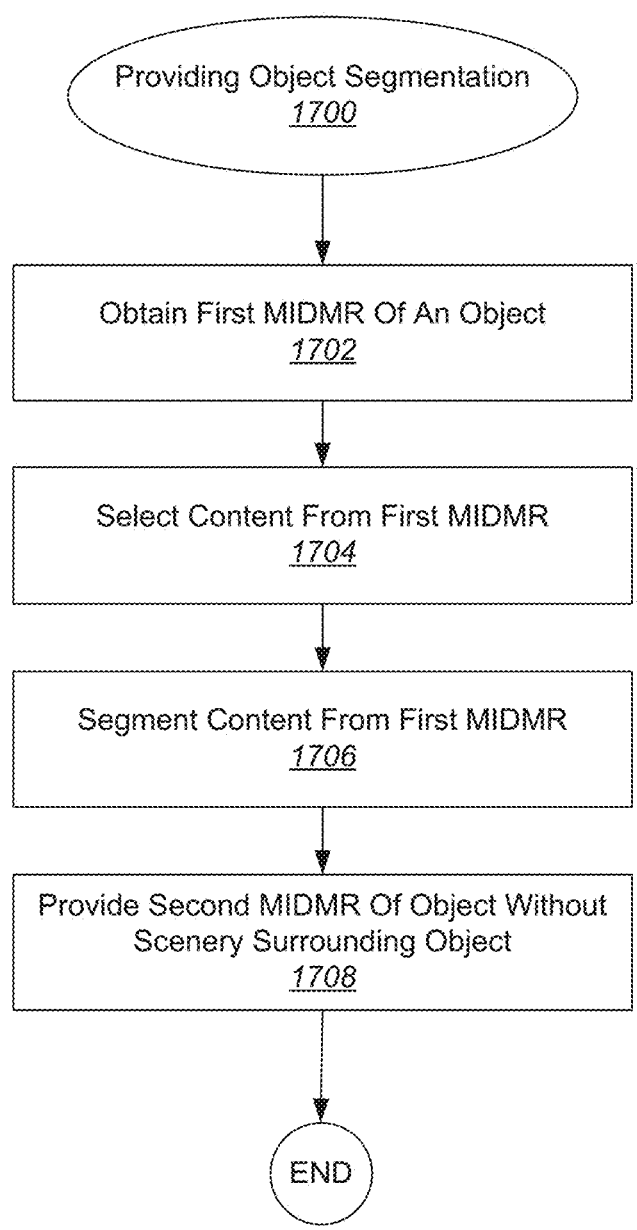
FIG. 17A illustrates one example of a process for providing object segmentation.

In some embodiments, a MIDMR can be created by projecting an object panorama onto a background panorama, an example of which is shown in FIG. 7H. In particular, a panorama 768 of this kind is built using background panorama 770 and projecting a foreground object panorama 772 onto the background panorama 770. In some examples, an object panorama can be segmented content taken from a MIDMR, as described in more detail with regard to FIGS. 17A-17B.

Figure 7I:
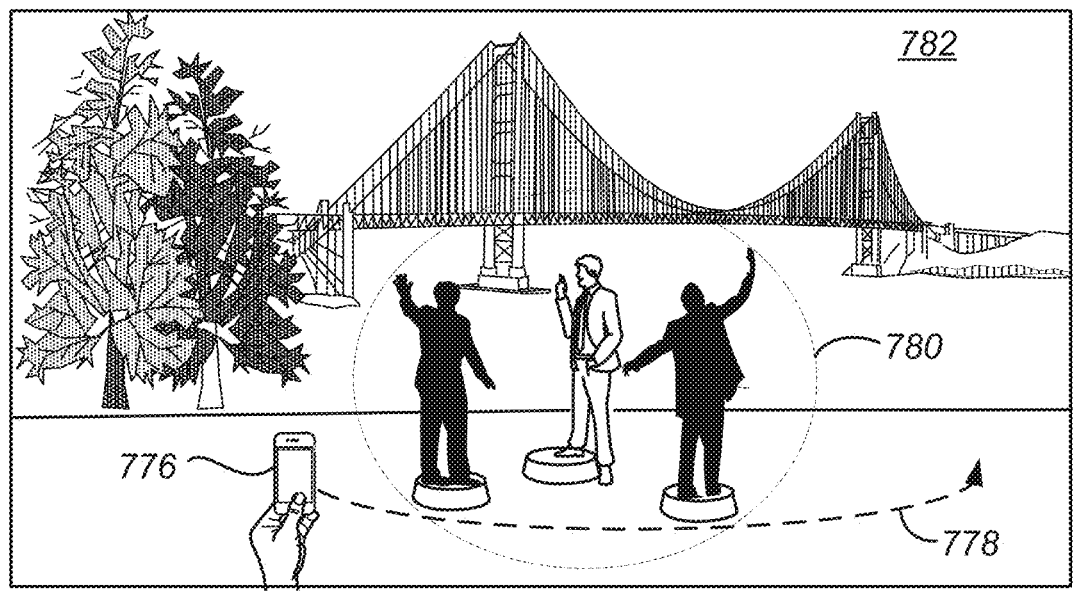
FIG. 7I illustrates one example of multiple objects constituting an object panorama.

According to various embodiments, multiple objects can make up an object panorama. With reference to FIG. 7I, shown is one example of a capture process for a group of objects 780 making up an object panorama. As shown, a capture device 776 can move around a foreground object, which can be a single object or a group of objects 780 located at a similar distance to the capture device. The capture device 776 can move around the object or group of objects 780 along a capture motion 778, such that various views and angles of the objects are captured. The resulting MIDMR can include an object panorama of the group of objects 780 with distant background 782 as the context.

Figure 7J:
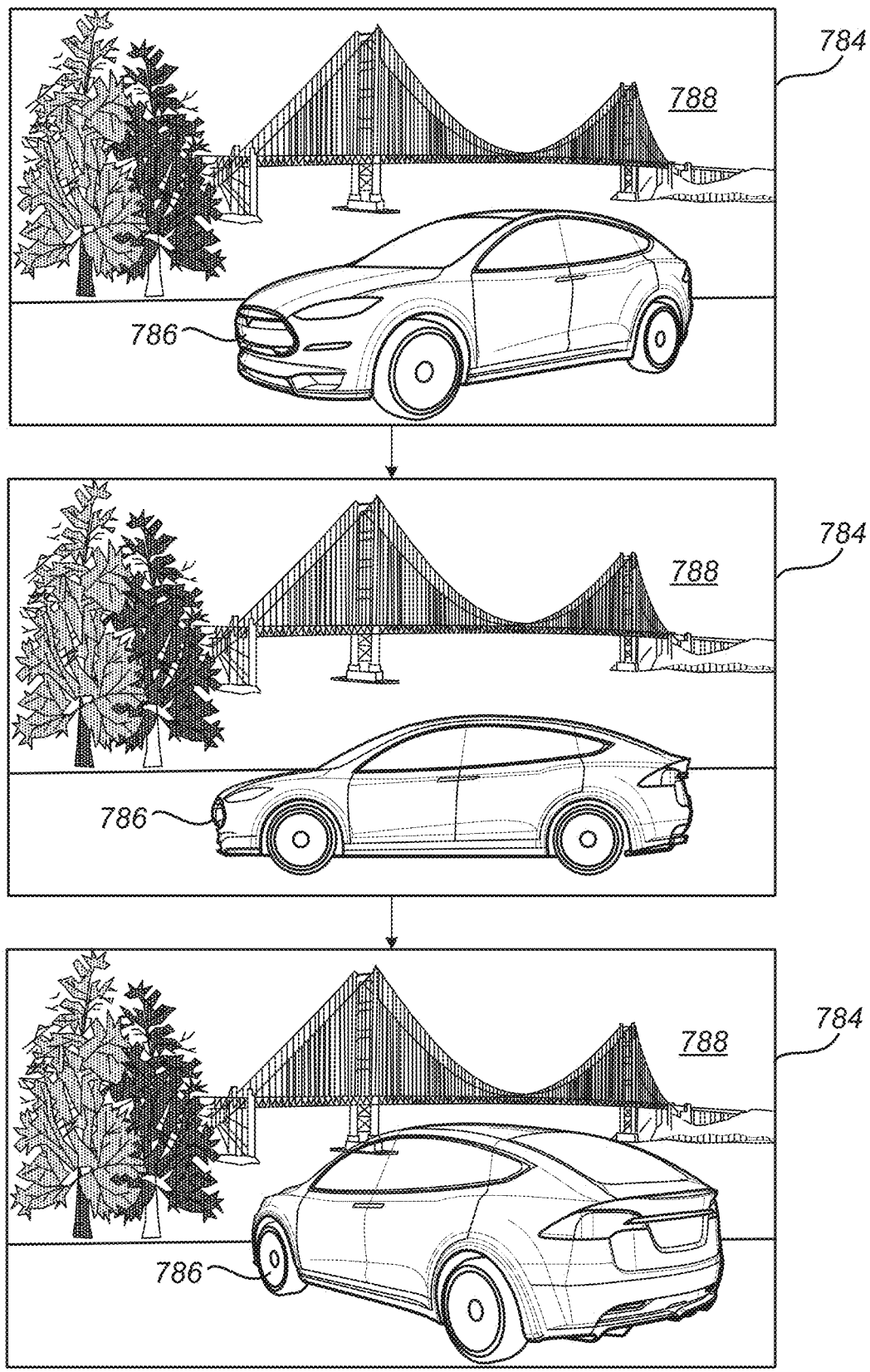
FIG. 7J illustrates one example of changing the viewing angle of an object panorama based on user navigation.

Object panoramas allow users to navigate around the object, according to various examples. With reference to FIG. 7J, shown is one example of changing the viewing angle of an object panorama based on user navigation. In this example, three views are shown of a MIDMR panorama 784. In the MIDMR panorama, a foreground object 786 is shown in front of a background panorama 788. As a user navigates the panorama by swiping or otherwise interacting with the MIDMR, the location of the object, the viewing angle of the object, or both can be changed. In the present example, the user can swipe in the direction of the main panorama axis. This navigation can rotate the foreground object 786 in this view. In some examples, the distant background panorama 788 may not change as the foreground object panorama rotates or otherwise moves.

According to various embodiments, object panoramas can also include parallax effects. These parallax effects can be seen when swiping/navigating perpendicular to the direction of the main panorama axis. Similar to FIG. 7F, three-dimensional effects can be presented when swiping perpendicular to the panorama direction. In particular, when swiping perpendicular to the panorama direction, along the parallax direction, nearby objects are displaced along the parallax direction while the scene at distance stays still or moves less than the nearby objects.

Although the previous examples relate to static content and background context in object panoramas, dynamic content can be integrated in the object panorama for either or both the foreground object and the background context. For instance, dynamic content can be featured in a manner similar to that described in conjunction with FIG. 7D. Similarly, dynamic context can also be included in object panoramas.

Figure 7K:
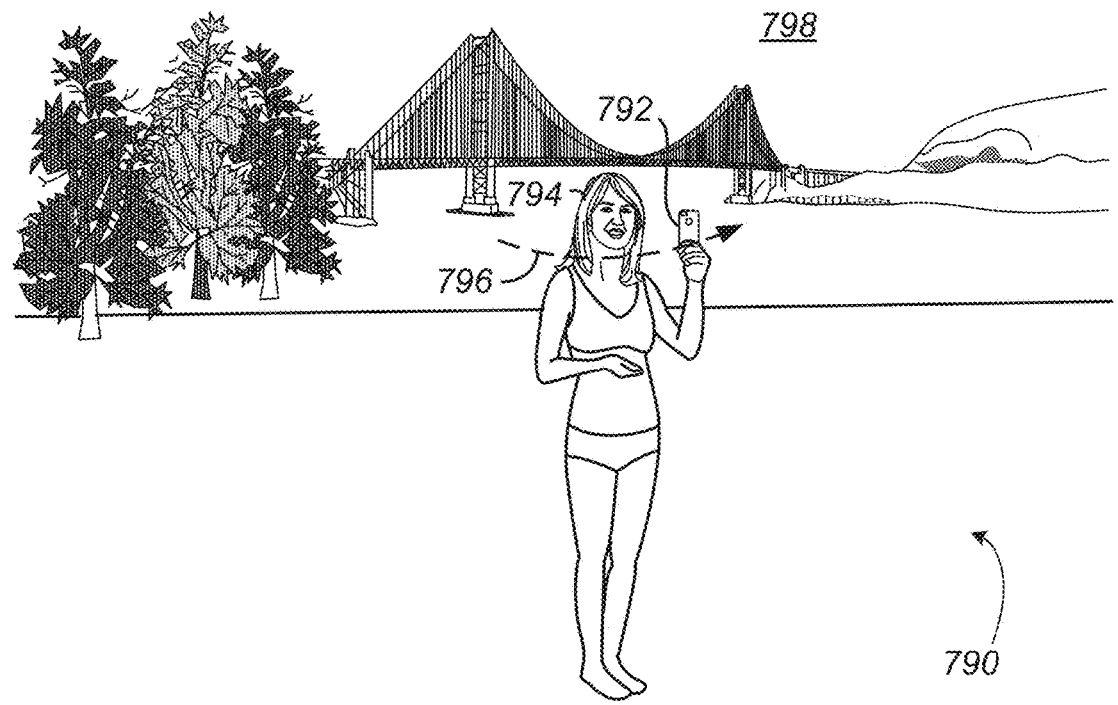
FIG. 7K illustrates one example of a selfie panorama capture process.
Figure 7L:
FIG. 7L illustrates one example of a background panorama with a selfie panorama projected on it.

Another type of panorama that can be included in MIDMRs is a selfie panorama. In some examples, a selfie panorama can be segmented content taken from a MIDMR, as described in more detail with regard to FIGS. 17A-17B. FIGS. 7K-7L illustrate examples relating to selfie panoramas that can be created with MIDMRs. With reference to FIG. 7K, shown is one example of a selfie panorama capture process 790. In particular, a user 794 moves a capture device 792 along capture motion 796 while capturing images of the user 794. In some examples, the capture device 792 can use a front-facing camera, such as one included on a smart phone. In other examples, a digital camera or other image recording device can be used. A selfie panorama is created with these images, with background 798 providing the context.

With reference to FIG. 7L, shown is one example of a background panorama with a selfie panorama projected on it. In the present example, a MIDMR panorama 723 is built from a background panorama 725 with a selfie panorama 721 projected on it. According to various examples, the selfie panorama can include a single person or multiple people, similar to the object or group of objects described in conjunction with FIG. 7I. In the present example, selfie panoramas can include dynamic content. For instance, the user can look at the capture device as the capture device moves or the user can keep still while moving the capture device. The user's movements can be captured while the selfie panorama 721 is recorded. These dynamic elements will be mapped into the panorama and can be displayed while interacting with the resulting selfie panorama 721. For instance, the user's blinks can be recorded and captured. Navigation of the selfie panorama can be done in a manner similar to that described in conjunction with FIG. 7J. In particular, the location and viewpoint of the person(s) in the selfie panorama 721 can be changed by the user by swiping/navigating in the direction of the main panorama axis. According to various embodiments, selfie panoramas 721 can also include parallax effects. These parallax effects can be seen when swiping/navigating perpendicular to the direction of the main panorama axis. In addition, similar to FIG. 7F, three-dimensional effects can be presented when swiping perpendicular to the panorama direction. In particular, when swiping perpendicular to the panorama direction, along the parallax direction, nearby objects are displaced along the parallax direction while the scene at distance stays still or moves less than the nearby objects.

Figure 7M:
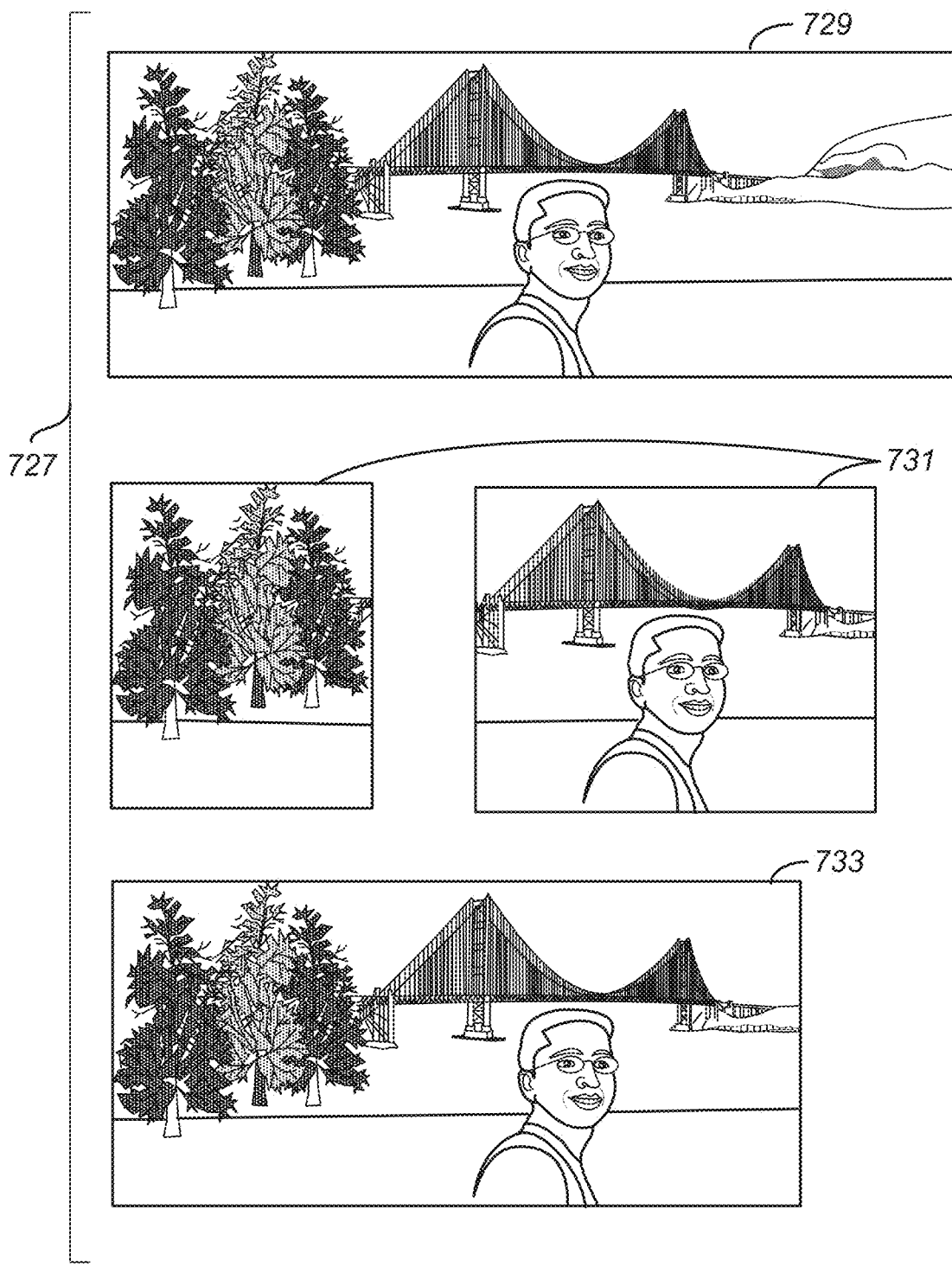
FIG. 7M illustrates one example of extended views of panoramas based on user navigation.

As described above, various types of panoramas can be created with MIDMRs. In addition, MIDMRs can be viewed and navigated in different ways. With reference to FIG. 7M, shown is one example of extended views of panoramas that are provided based on user navigation. In the present example, possible views 727 include a full panorama view 729, recording views 731, and extended view 733. A full panorama view 729 includes a full view of the information in a MIDMR. The recording views 731 include the visual data captured in images and/or recordings. The extended view 733 shows more than what is visible during one point in time in recording views 731 but less than the full panorama view 729. The portion of the panorama 729 that is visible in an extended view 733 is defined by user navigation. An extended view 733 is especially interesting for a selfie or object panorama, because the extended view follows the object/person in the panorama and shows a larger view than what was visible for the camera while recording. Essentially, more context is provided to the user in an extended view 733 during navigation of the MIDMR.

Figure 8:
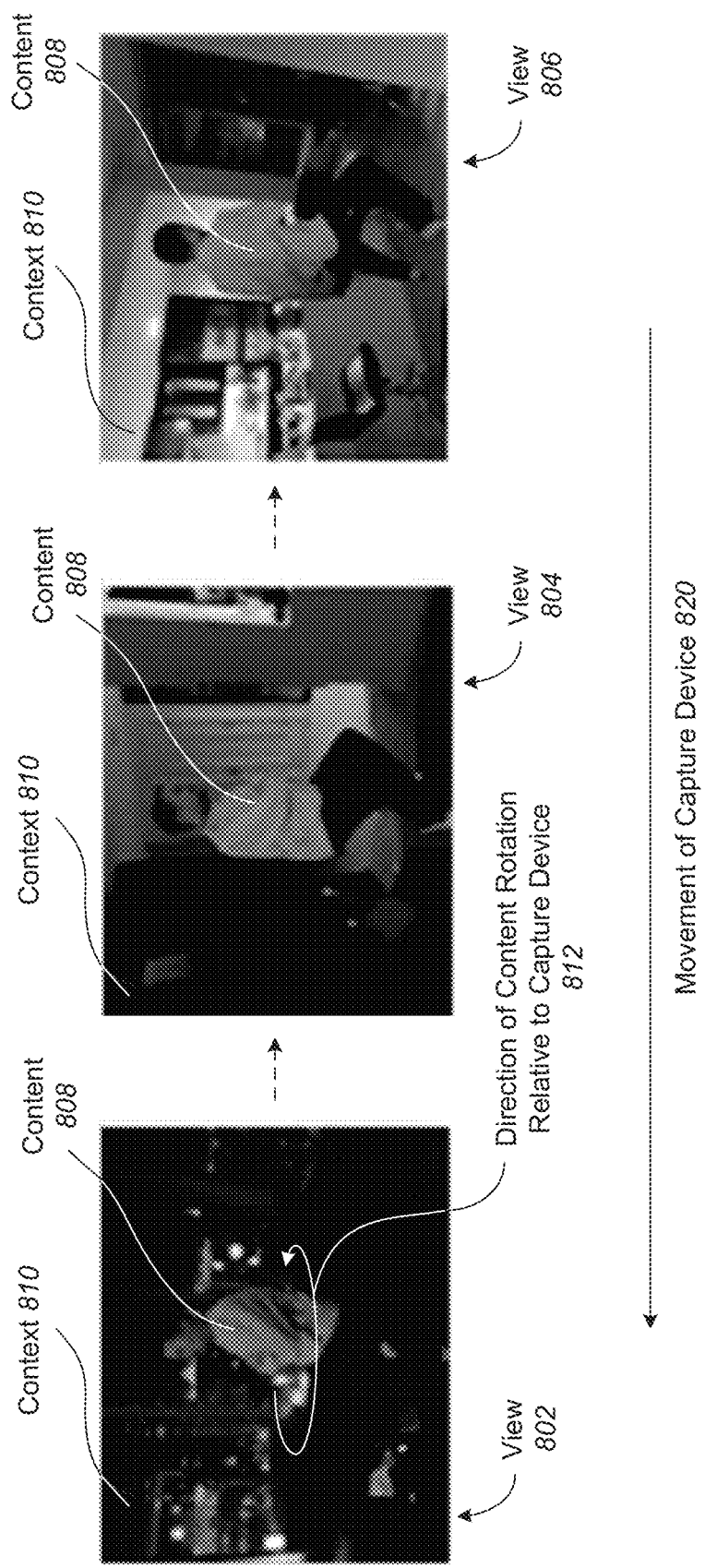
FIG. 8 illustrates an example of a MIDMR in which three-dimensional content is blended with a two-dimensional panoramic context.

According to various embodiments, once a series of images is captured, these images can be used to generate a MIDMR. With reference to FIG. 8, shown is an example of a MIDMR in which three-dimensional content is blended with a two-dimensional panoramic context. In the present example embodiment, the movement of capture device 820 follows a locally convex motion, such that the capture device moves around the object of interest (i.e., a person sitting in a chair). The object of interest is delineated as the content 808, and the surrounding scenery (i.e., the room) is delineated as the context 810. In the present embodiment, as the movement of the capture device 820 moves leftwards around the content 808, the direction of content rotation relative to the capture device 812 is in a rightward, counterclockwise direction. Views 802, 804, and 806 show a progression of the rotation of the person sitting in a chair relative to the room.

Figure 9:
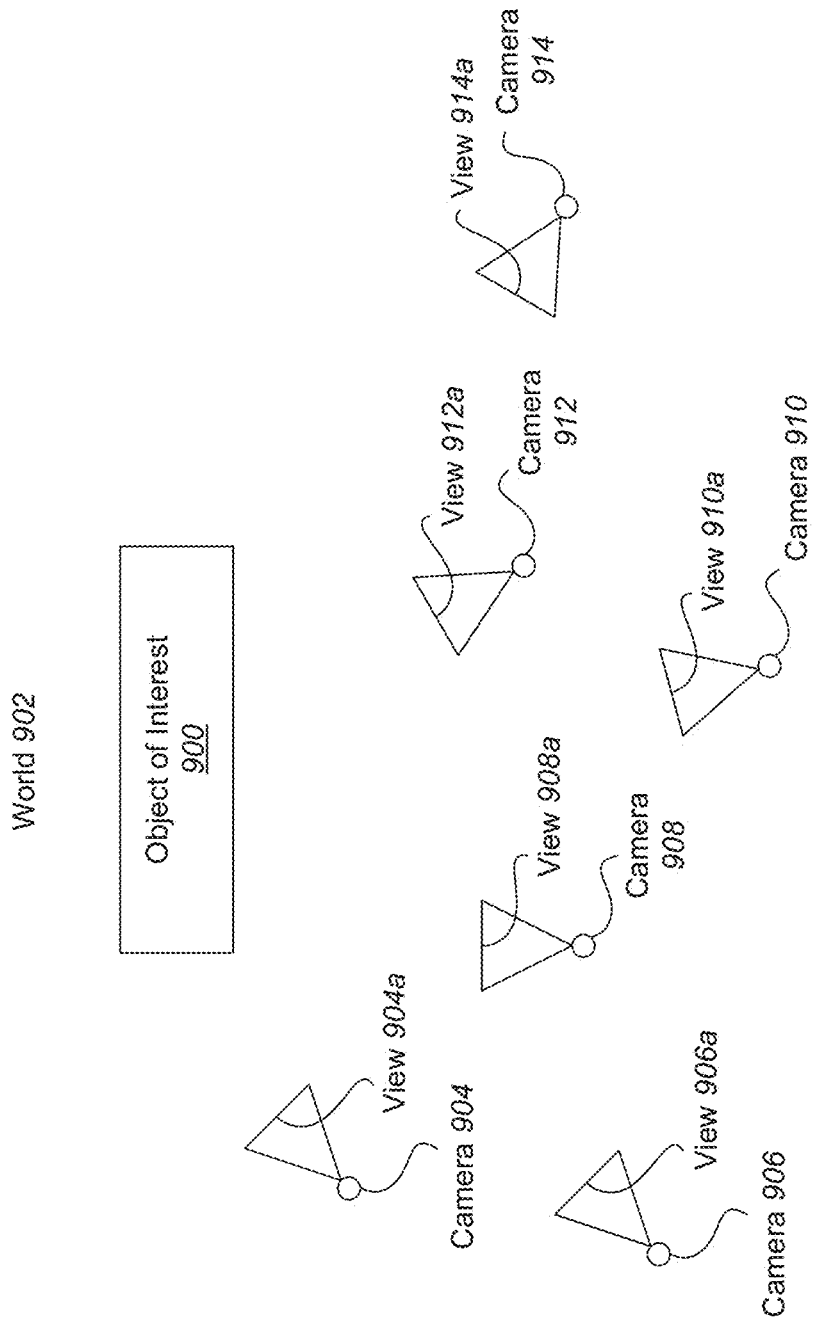
FIG. 9 illustrates one example of a space-time MIDMR being simultaneously recorded by independent observers.

According to various embodiments, a series of images used to generate a MIDMR can be captured by a user recording a scene, object of interest, etc. Additionally, in some examples, multiple users can contribute to acquiring a series of images used to generate a MIDMR. With reference to FIG. 9, shown is one example of a space-time MIDMR being simultaneously recorded by independent observers.

In the present example embodiment, cameras 904, 906, 908, 910, 912, and 914 are positioned at different locations. In some examples, these cameras 904, 906, 908, 910, 912, and 914 can be associated with independent observers. For instance, the independent observers could be audience members at a concert, show, event, etc. In other examples, cameras 904, 906, 908, 910, 912, and 914 could be placed on tripods, stands, etc. In the present embodiment, the cameras 904, 906, 908, 910, 912, and 914 are used to capture views 904a, 906a, 908a, 910a, 912a, and 914a, respectively, of an object of interest 900, with world 902 providing the background scenery. The images captured by cameras 904, 906, 908, 910, 912, and 914 can be aggregated and used together in a single MIDMR in some examples. Each of the cameras 904, 906, 908, 910, 912, and 914 provides a different vantage point relative to the object of interest 900, so aggregating the images from these different locations provides information about different viewing angles of the object of interest 900. In addition, cameras 904, 906, 908, 910, 912, and 914 can provide a series of images from their respective locations over a span of time, such that the MIDMR generated from these series of images can include temporal information and can also indicate movement over time.

Figure 10:
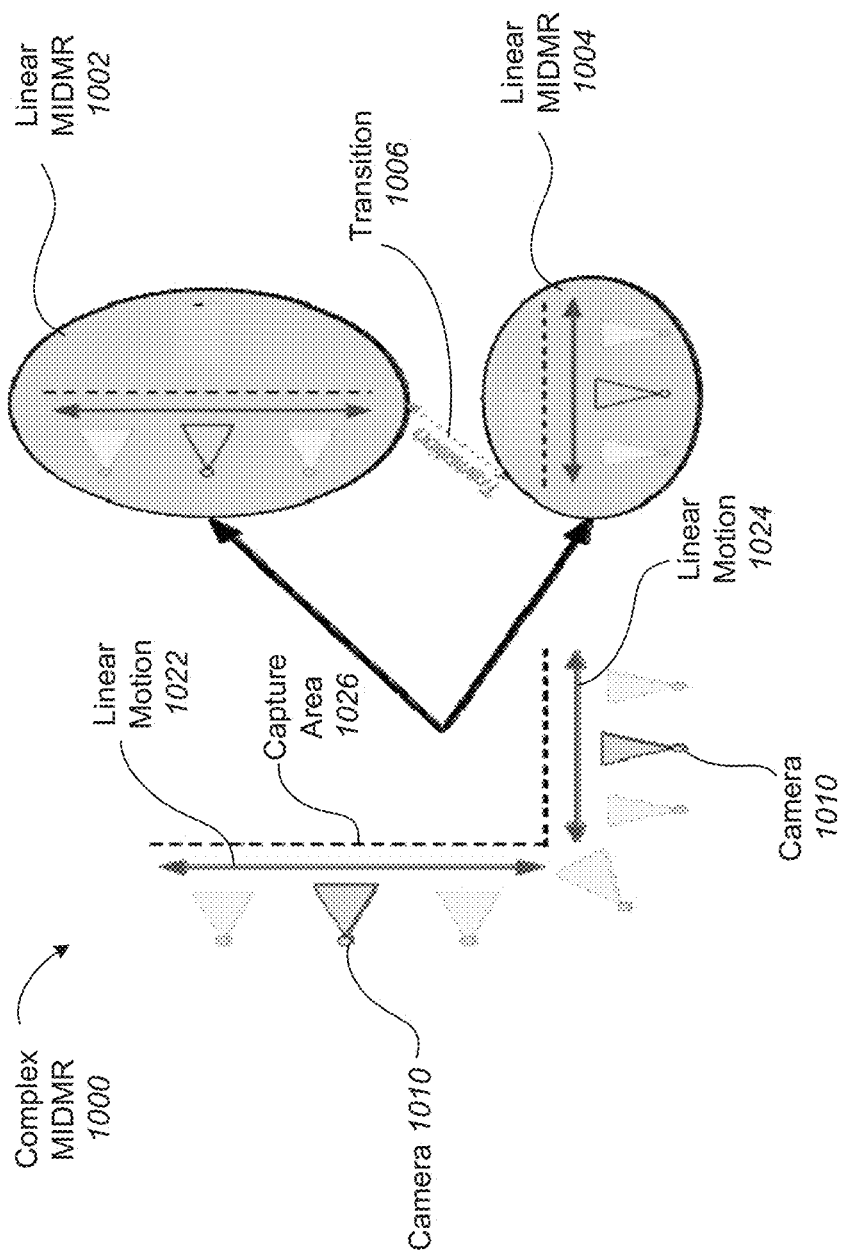
FIG. 10 illustrates one example of separation of a complex surround-view into smaller, linear parts.

As described above with regard to various embodiments, MIDMRs can be associated with a variety of capture modes. In addition, a MIDMR can include different capture modes or different capture motions in the same MIDMR. Accordingly, MIDMRs can be separated into smaller parts in some examples. With reference to FIG. 10, shown is one example of separation of a complex surround-view into smaller, linear parts. In the present example, complex MIDMR 1000 includes a capture area 1026 that follows a sweeping L motion, which includes two separate linear motions 1022 and 1024 of camera 1010. The MIDMRs associated with these separate linear motions can be broken down into linear MIDMR 1002 and linear MIDMR 1004. It should be noted that although linear motions 1022 and 1024 can be captured sequentially and continuously in some embodiments, these linear motions 1022 and 1024 can also be captured in separate sessions in other embodiments.

In the present example embodiment, linear MIDMR 1002 and linear MIDMR 1004 can be processed independently, and joined with a transition 1006 to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear MIDMRs can also be separated into discrete components. In some examples, MIDMRs can be broken down based on local capture motion. For example, a complex motion may be broken down into a locally convex portion and a linear portion. In another example, a complex motion can be broken down into separate locally convex portions. It should be recognized that any number of motions can be included in a complex MIDMR 1000, and that a complex MIDMR 1000 can be broken down into any number of separate portions, depending on the application.

Figure 11:
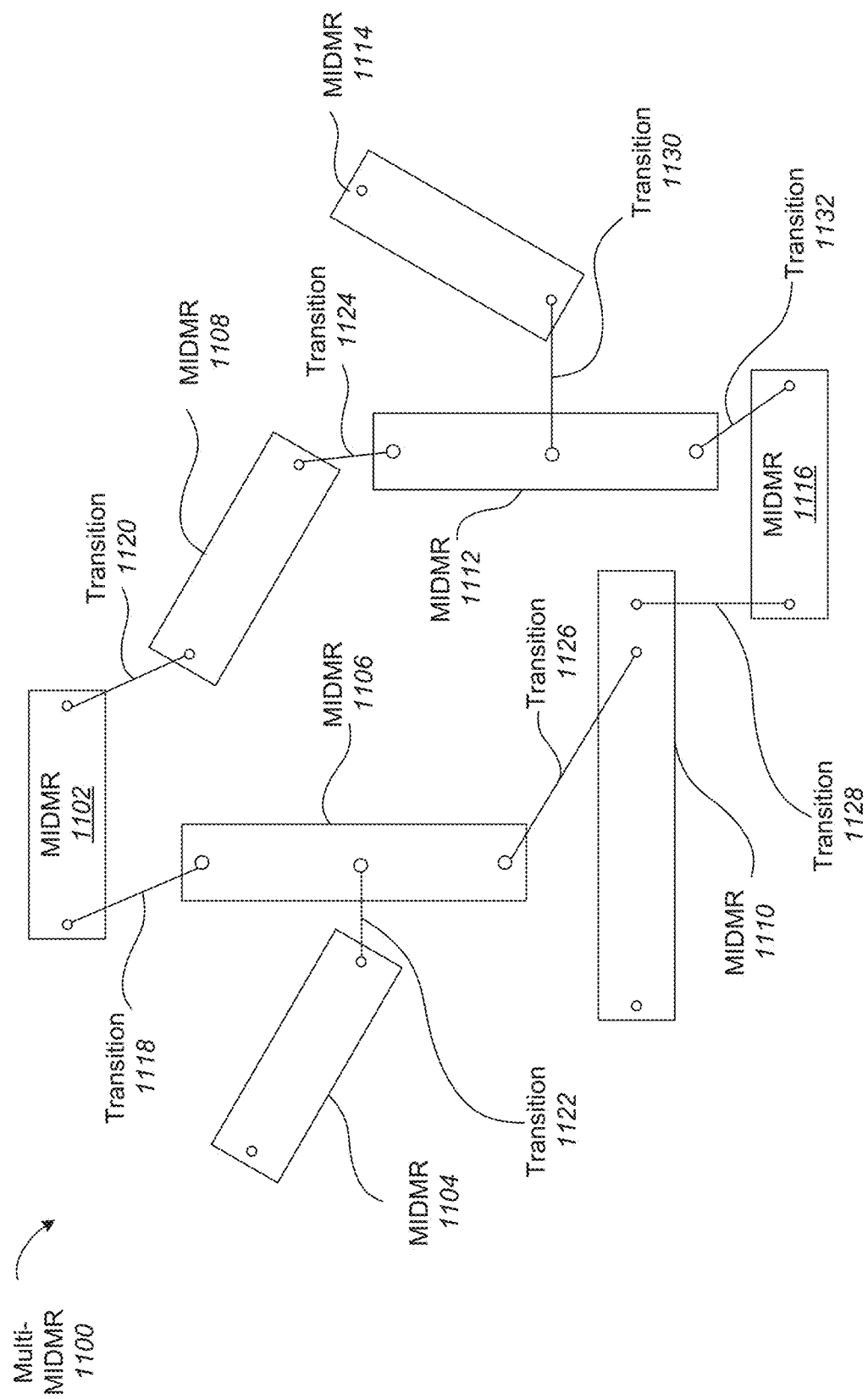
FIG. 11 illustrates one example of a combination of multiple MIDMRs into a multi-MIDMR.

Although in some applications, it is desirable to separate complex MIDMRs, in other applications it is desirable to combine multiple MIDMRs. With reference to FIG. 11, shown is one example of a graph that includes multiple MIDMRs combined into a multi-MIDMR 1100. In this example, the rectangles represent various MIDMRs 1102, 1104, 1106, 1108, 1110, 1112, 1114, and 1116, and the length of each rectangle indicates the dominant motion of each MIDMR. Lines between the MIDMRs indicate possible transitions 1118, 1120, 1122, 1124, 1126, 1128, 1130, and 1132 between them.

In some examples, a MIDMR can provide a way to partition a scene both spatially and temporally in a very efficient manner. For very large scale scenes, multi-MIDMR 1100 data can be used. In particular, a multi-MIDMR 1100 can include a collection of MIDMRs that are connected together in a spatial graph. The individual MIDMRs can be collected by a single source, such as a single user, or by multiple sources, such as multiple users. In addition, the individual MIDMRs can be captured in sequence, in parallel, or totally uncorrelated at different times. However, in order to connect the individual MIDMRs, there must be some overlap of content, context, or location, or of a combination of these features. Accordingly, any two MIDMRs would need to have some overlap in content, context, and/or location to provide a portion of a multi-MIDMR 1100. Individual MIDMRs can be linked to one another through this overlap and stitched together to form a multi-MIDMR 1100. According to various examples, any combination of capture devices with either front, back, or front and back cameras can be used.

In some embodiments, multi-MIDMRs 1100 can be generalized to more fully capture entire environments. Much like "photo tours" collect photographs into a graph of discrete, spatially-neighboring components, multiple MIDMRs can be combined into an entire scene graph. In some examples, this can be achieved using information obtained from but not limited to: image matching/tracking, depth matching/tracking, IMU, user input, and/or GPS. Within such a graph or multi-MIDMR, a user can switch between different MIDMRs either at the end points of the recorded motion or wherever there is an overlap with other MIDMRs in the graph. One advantage of multi-MIDMRs over "photo tours" is that a user can navigate the MIDMRs as desired and much more visual information can be stored in MIDMRs. In contrast, traditional "photo tours" typically have limited views that can be shown to the viewer either automatically or by allowing the user to pan through a panorama with a computer mouse or keystrokes.

According to various embodiments, a MIDMR is generated from a set of images. These images can be captured by a user intending to produce a MIDMR or retrieved from storage, depending on the application. Because a MIDMR is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a MIDMR provides views from many sides of an object, distinctive views that are appropriate for search can be selected from the MIDMR or requested from a user if a distinctive view is not available.

For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a MIDMR is determined to need additional views to produce a more accurate model, a user may be prompted to provide additional images.

Figure 12:
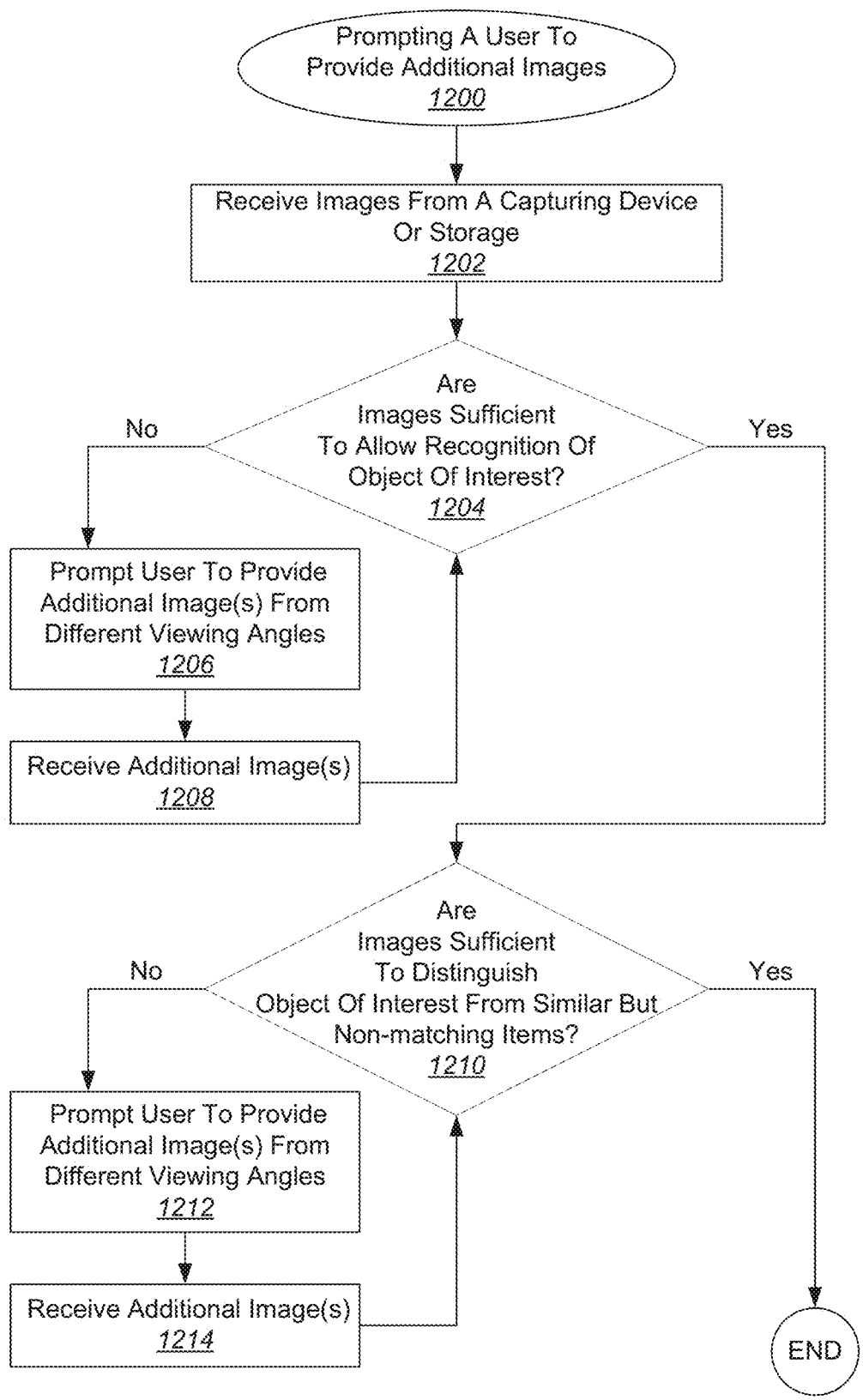
FIG. 12 illustrates one example of a process for prompting a user for additional views of an object of interest to provide a more accurate MIDMR.

With reference to FIG. 12, shown is one example of a process for prompting a user for additional images 1200 to provide a more accurate MIDMR. In the present example, images are received from a capturing device or storage at 1202. Next, a determination is made whether the images provided are sufficient to allow recognition of an object of interest at 1204. If the images are not sufficient to allow recognition of an object of interest, then a prompt is given for the user to provide additional image(s) from different viewing angles at 1206. In some examples, prompting a user to provide one or more additional images from different viewing angles can include suggesting one or more particular viewing angles. If the user is actively capturing images, the user can be prompted when a distinct viewing angle is detected in some instances. According to various embodiments, suggestions to provide one or more particular viewing angles can be determined based on the locations associated with the images already received. In addition, prompting a user to provide one or more additional images from different viewing angles can include suggesting using a particular capture mode such as a locally concave MIDMR, a locally convex MIDMR, or a locally flat MIDMR, depending on the application.

Next, the system receives these additional image(s) from the user at 1208. Once the additional images are received, a determination is made again whether the images are sufficient to allow recognition of an object of interest. This process continues until a determination is made that the images are sufficient to allow recognition of an object of interest. In some embodiments, the process can end at this point and a MIDMR can be generated.

Optionally, once a determination is made that the images are sufficient to allow recognition of an object of interest, then a determination can then be made whether the images are sufficient to distinguish the object of interest from similar but non-matching items at 1210. This determination can be helpful especially when using visual search, examples of which are described in more detail below with regards to FIGS. 19-22. In particular, an object of interest may have distinguishing features that can be seen from particular angles that require additional views. For instance, a portrait of a person may not sufficiently show the person's hairstyle if only pictures are taken from the front angles. Additional pictures of the back of the person may need to be provided to determine whether the person has short hair or just a pulled-back hairstyle. In another example, a picture of a person wearing a shirt might warrant additional prompting if it is plain on one side and additional views would show prints or other insignia on the sleeves or back, etc.

In some examples, determining that the images are not sufficient to distinguish the object of interest from similar but non-matching items includes determining that the number of matching search results exceeds a predetermined threshold. In particular, if a large number of search results are found, then it can be determined that additional views may be needed to narrow the search criteria. For instance, if a search of a mug yields a large number of matches, such as more than 20, then additional views of the mug may be needed to prune the search results.

If the images are not sufficient to distinguish the object of interest from similar but non-matching items at 1210, then a prompt is given for the user to provide additional image(s) from different viewing angles at 1212. In some examples, prompting a user to provide one or more additional images from different viewing angles can include suggesting one or more particular viewing angles. If the user is actively capturing images, the user can be prompted when a distinct viewing angle is detected in some instances. According to various embodiments, suggestions to provide one or more particular viewing angles can be determined based on the locations associated with the images already received. In addition, prompting a user to provide one or more additional images from different viewing angles can include suggesting using a particular capture mode such as a locally concave MIDMR, a locally convex MIDMR, or a locally flat MIDMR, depending on the application.

Next, the system receives these additional image(s) from the user at 1214. Once the additional images are received, a determination is made again whether the images are sufficient to distinguish the object of interest from similar but non-matching items. This process continues until a determination is made that the images are sufficient to distinguish the object of interest from similar but non-matching items. Next, the process ends and a MIDMR can be generated from the images.

Figure 13B:
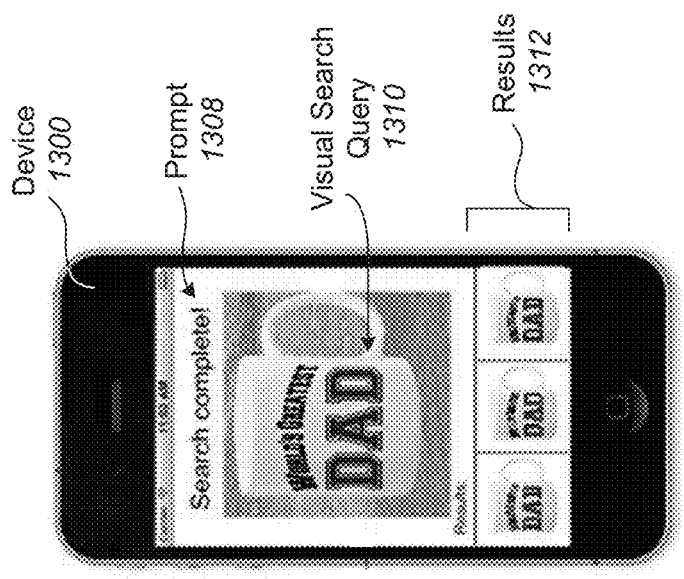
FIGS. 13A-13B illustrate an example of prompting a user for additional views of an object to be searched.
Figure 13A:
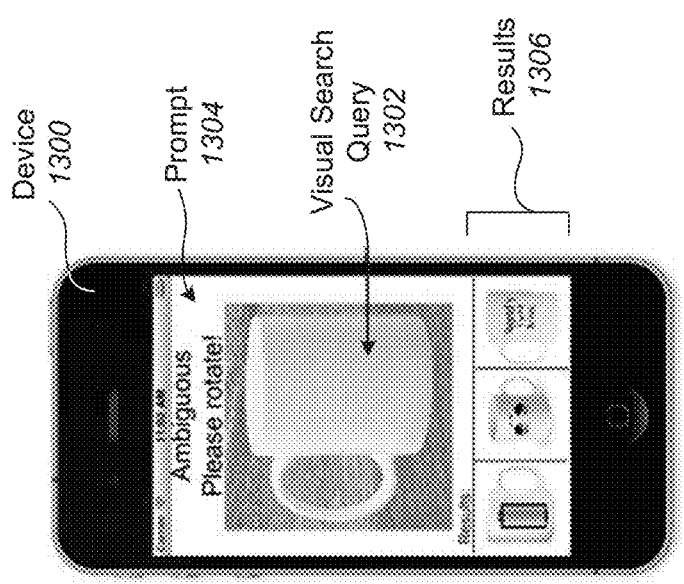

With reference to FIGS. 13A-13B, shown are examples of prompts requesting additional images from a user in order to produce a more accurate MIDMR. In particular, a device 1300 is shown with a search screen. In FIG. 13A, an example of a visual search query 1302 is provided. This visual search query 1302 includes an image of a white mug. The results 1306 include various mugs with a white background. In particular embodiments, if a large amount of search results is found, a prompt 1304 can be provided to request additional image data from the user for the search query.

In FIG. 13B, an example of another visual search query 1310 is provided in response to prompt 1304 in FIG. 13A. This visual search query 1310 provides a different viewpoint of the object and provides more specific information about the graphics on the mug. This visual search query 1310 yields new results 1312 that are more targeted and accurate. In some examples, an additional prompt 1308 can be provided to notify the user that the search is complete.

Once a MIDMR is generated, it can be used in various applications, in particular embodiments. One application for a MIDMR includes allowing a user to navigate a MIDMR or otherwise interact with it. According to various embodiments, a MIDMR is designed to simulate the feeling of being physically present in a scene as the user interacts with the MIDMR. This experience depends not only on the viewing angle of the camera, but on the type of MIDMR that is being viewed. Although a MIDMR does not need to have a specific fixed geometry overall, different types of geometries can be represented over a local segment of a MIDMR such as a concave, convex, and flat MIDMR, in particular embodiments.

In particular example embodiments, the mode of navigation is informed by the type of geometry represented in a MIDMR. For instance, with concave MIDMRs, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex MIDMRs, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-MIDMR or a graph of MIDMRs in which individual MIDMRs can be loaded piece by piece and further MIDMRs may be loaded when necessary (e.g. when they are adjacent to/overlap the current MIDMR and/or the user navigates towards them). If the user reaches a point in a MIDMR where two or more MIDMRs overlap, the user can select which of those overlapping MIDMRs to follow. In some instances, the selection of which MIDMR to follow can be based on the direction the user swipes or moves the device.

Figure 14:
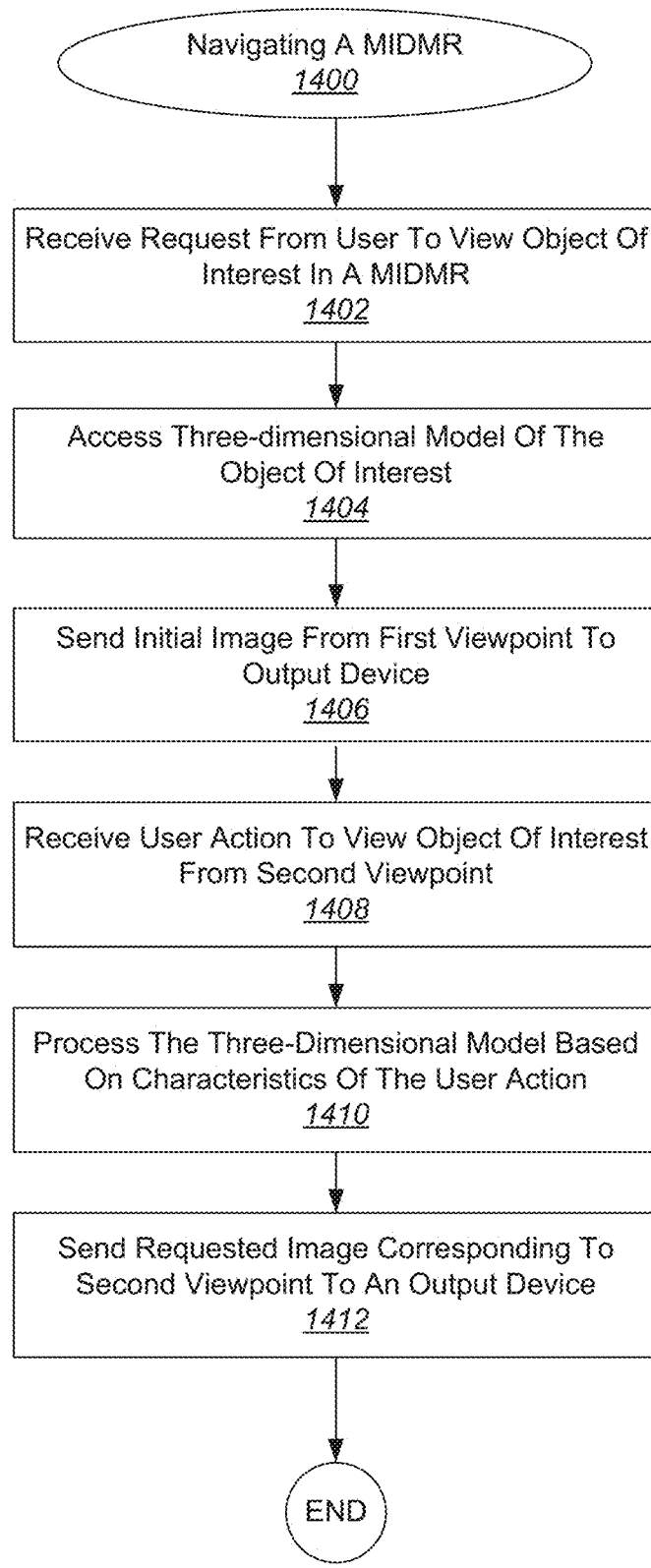
FIG. 14 illustrates one example of a process for navigating a MIDMR.

With reference to FIG. 14, shown is one example of a process for navigating a MIDMR 1400. In the present example, a request is received from a user to view an object of interest in a MIDMR at 1402. According to various embodiments, the request can also be a generic request to view a MIDMR without a particular object of interest, such as when viewing a landscape or panoramic view. Next, a three-dimensional model of the object is accessed at 1404. This three-dimensional model can include all or a portion of a stored MIDMR. For instance, the three-dimensional model can be a segmented content view in some applications. An initial image is then sent from a first viewpoint to an output device at 1406. This first viewpoint serves as a starting point for viewing the MIDMR on the output device.

In the present embodiment, a user action is then received to view the object of interest from a second viewpoint. This user action can include moving (e.g. tilting, translating, rotating, etc.) an input device, swiping the screen, etc., depending on the application. For instance, the user action can correspond to motion associated with a locally concave MIDMR, a locally convex MIDMR, or a locally flat MIDMR, etc. According to various embodiments, an object view can be rotated about an axis by rotating a device about the same axis. For example, the object view can be rotated along a vertical axis by rotating the device about the vertical axis. Based on the characteristics of the user action, the three-dimensional model is processed at 1410. For instance, movement of the input device can be detected and a corresponding viewpoint of the object of interest can be found. Depending on the application, the input device and output device can both be included in a mobile device, etc. In some examples, the requested image corresponds to an image captured prior to generation of the MIDMR. In other examples the requested image is generated based on the three-dimensional model (e.g. by interpolation, etc.). An image from this viewpoint can be sent to the output device at 1412. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications. In other examples, a message can be provided to the output device indicating if there is insufficient information in the MIDMR to provide the requested images.

In some embodiments, intermediate images can be sent between the initial image at 1406 and the requested image at 1412. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Figure 15A:
FIG. 15A illustrates an example of swipe-based navigation of a MIDMR.

With reference to FIG. 15A, shown is an example of swipe-based navigation of a MIDMR. In the present example, three views of device 1500 are shown as a user navigates a MIDMR. In particular, the input 1510 is a swipe by the user on the screen of device 1500. As the user swipes from right to left, the object of interest moves relative to the direction of swipe 1508. Specifically, as shown by the progression of images 1506, 1504, and 1502, the input 1510 allows the user to rotate around the object of interest (i.e., the man wearing sunglasses).

In the present example, a swipe on a device screen can correspond to rotation of a virtual view. However, other input modes can be used in other example embodiments. For instance, a MIDMR can also be navigated by tilting a device in various directions and using the device orientation direction to guide the navigation in the MIDMR. In another example, the navigation can also be based on movement of the screen by the user. Accordingly, a sweeping motion can allow the user to see around the MIDMR as if the viewer were pointing the device at the object of interest. In yet another example, a website can be used to provide interaction with the MIDMR in a web-browser. In this example, swipe and/or motion sensors may be unavailable, and can be replaced by interaction with a mouse or other cursor or input device.

According to various embodiments, MIDMRs can also include tagging that can be viewed during navigation. Tagging can provide identification for objects, people, products, or other items within a MIDMR. In particular, tagging in a MIDMR is a very powerful tool for presenting products to users/customers and promoting those elements or items. In one example, a tag 1512 can follow the location of the item that is tagged, such that the item can be viewed from different angles while the tag locations still stay valid. The tags 1512 can store different types of data, such as a name (e.g. user name, product name, etc.), a description, a link to a website/webshop, price information, a direct option for purchasing a tagged object, a list of similar objects, etc. In some examples, the tags can become visible when a user selects an item in a MIDMR. In other examples, the tags can be automatically displayed. In addition, additional information can be accessed by selecting a tag 1512 in some applications. For instance, when a user selects a tag, additional information can be displayed on screen such as a description, link, etc.

In some embodiments, a user can create a tag 1512 by selecting either a point or a region in one viewpoint of a MIDMR. This point or region is then automatically propagated into other viewpoints. Alternatively, tag locations can be automatically suggested to the user by an application based on different information, such as face detection, object detection, objects in focus, objects that are identified as foreground, etc. In some examples, object detection can be made from a database of known objects or object types/classes. In some embodiments, the system automatically generates a set of possible tags from which the user can choose.

In the present example, tag 1512 identifies a shirt in the MIDMR. Of course, any text or title can be included, such as a name, brand, etc. This tag 1512 can be mapped to a particular location in the MIDMR such that the tag is associated with the same location or point in any view selected. As described above, tag 1512 can include additional information that can be accessed by tapping or otherwise selecting the tag, in some embodiments. Although tagging is shown in FIG. 15A, it should be noted that MIDMRs may not include tagging in some examples.

Figure 15B:
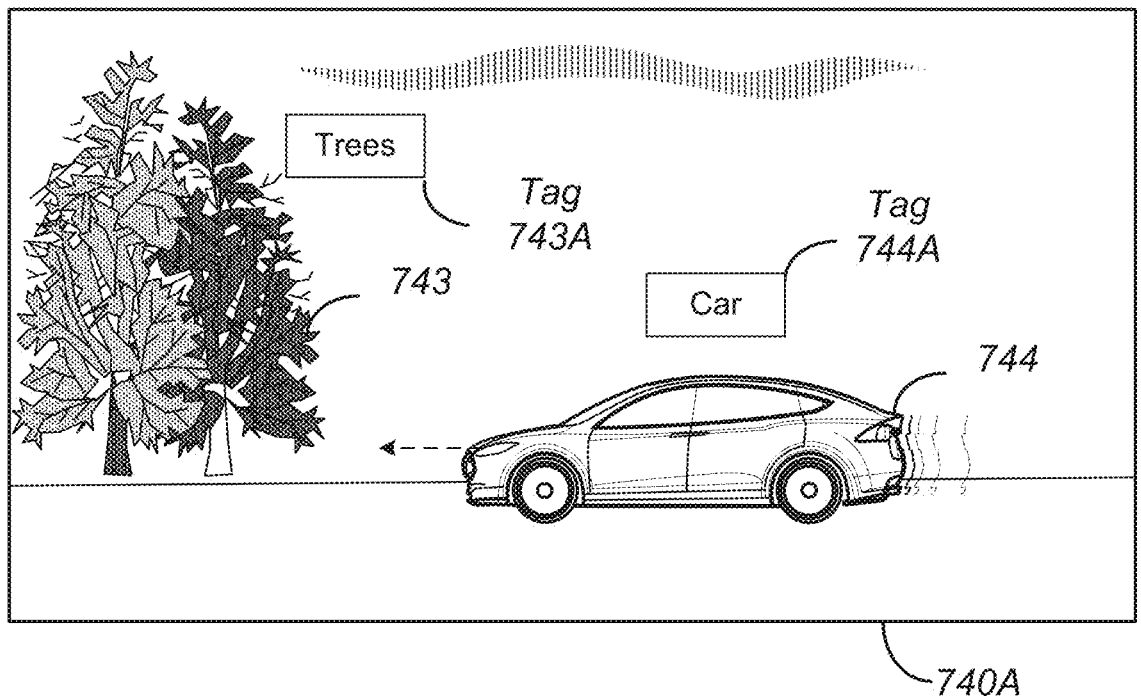
FIG. 15B illustrates an example first MIDMR of a dynamic panorama with dynamic content and automatic tagging.

In various embodiments, the system can automatically tag an object common to different MIDMRs. In some embodiments, the object can be a stationary object or a dynamic object. FIG. 15B illustrates a first MIDMR 740A, which corresponds to FIG. 7D, and includes dynamic object 744 (a car) and stationary object 743 (trees). As shown in FIG. 15B, MIDMR 740A also depicts a tag 744A, labeled "Car." MIDMR 740A also includes tag 743A, labeled "Trees." According to the techniques presented herein, tags 744A and 743A could have been created automatically or by a user. In some embodiments, if the tags were created automatically, an image recognition module would scan the image(s) corresponding to MIDMR 740A. The image recognition module would then match objects detected, in this case a car and trees, with a database, either locally (local storage) or globally (Internet). The image recognition module would then find the closest match for the detected objects and then tag the objects with names or titles associated with the closest matches. In FIG. 15B, the image recognition module would detect the trees and car objects, search through databases for similar shapes and patterns, discover matches with other trees and cars, and then tag each object respectively. In other embodiments, a user can tag the objects by selecting the objects and labeling the objects with the tags. In the unlikely event that similar objects found are not associated with text, titles, names or tags found locally or globally, including social media and imbedded descriptions, the user is prompted to enter a tag for the object.

Figure 15C:
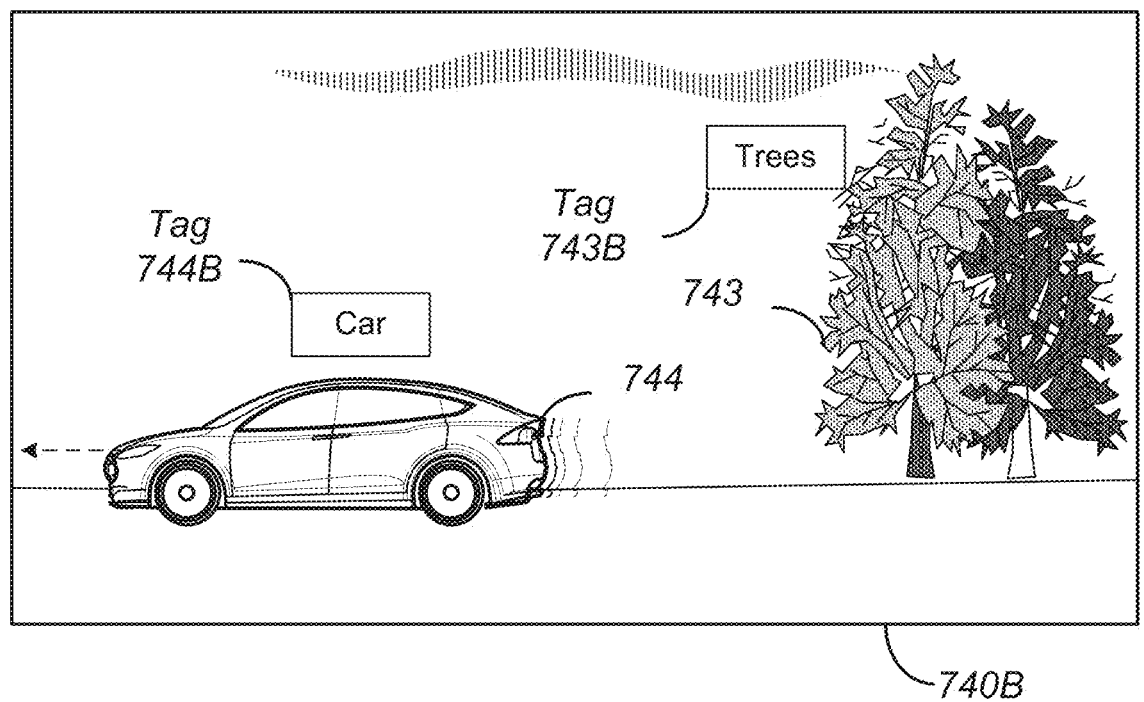
FIG. 15C illustrates an example second MIDMR of a dynamic panorama with dynamic content and automatic tagging.

As mentioned above, object 744 is a dynamic object and object 743 is a stationary object. FIG. 15C depicts a second MIDMR 740B which contains a different view of objects 744 and 743. Since object 744 is a car, the car has been moving during the capturing of images that generated MIDMRs 740A and 740B. In particular, car 744 has now moved past trees 743. Since trees 743 are stationary, depicting trees 743 on the right side of MIDMR 740B implies that MIDMR 740B shows a viewpoint of a location that is somewhere left of the viewpoint depicted in MIDMR 740A. Once again the objects are tagged. While the tags appear to be the same label, the tags are actually newly generated tags that correspond to the tags in FIG. 15B. As with FIG. 15B, the tags can be generated automatically or manually by a user. In automatically tagging the dynamic object 744, they system first recognizes that MIDMR 740B contains common shapes as the shapes depicted in MIDMR 740A. Next, after determining that the common shapes are indeed the same objects, the system automatically tags objects with tags corresponding to the tags used in FIG. 15B. Because each MIDMR is a different MIDMR, each tag that refers to the same object across multiple views, is technically a new tag. For example, because the view has changed from 740A to 740B, tag 743A cannot be used because the location of the tag is on the right side of trees 743. Thus, a new tag 743B is generated and presented on the left side of trees 743 in order to be visible to the user. Tag 743B corresponds to, and contains the same "Trees" label as, tag 743A. Similarly, tag 744B is a new tag that corresponds to, and contains the same "Car" label as, tag 744A. In some embodiments, new tags, such as new tags 743B and 744B, are generated by referring to a list of similar objects in other MIDMRs. For example, if the tags "tree" or "car" were objects in a list of objects from other MIDMRs, then the new tags 743B and 744B are chosen based on best match with the list of objects. In some embodiments, "best match" refers to results generated using overall pixel comparisons, point tracking comparisons, or other matching algorithms described in this disclosure. In such embodiments, if the tag is a new object not in the list, then the new tag object is added to the list of objects for future tagging.

For stationary objects, auto-tagging is much easier because the placement of the stationary objects in different, subsequently captured images is relatively the same. Although trees 743 in FIGS. 15B and 15C are in very different locations, the difference is exaggerated for illustrative purposes. In practice, a camera would be capturing images at a high enough snapshot rate that the same stationary object in two directly adjacent photos would have minimal location change. Thus, if two adjacent images have what appear to be the same object but in two drastically different locations, the system can assume that the two objects are different objects, which means the tag in the first image would no longer correspond to the tag in the second image. In determining what constitutes as sufficiently different, time lapse between the timestamps of each image taken is measured. In addition, in some embodiments, the movement and speed of movement of the camera is also factored in. After accounting for such factors, a value for the delta in position change is calculated and compared to a threshold value. If given the time between snapshots, and the speed and direction of movement of the camera, the difference in location of the object in the second image versus the first image is below a predetermined threshold value, then the objects are deemed to be the same object and a tag corresponding to the first tag can be automatically generated. If the difference exceeds the threshold value, then the object is deemed to be a different object altogether and the process for generating new tags is repeated for the new object.

For moving/dynamic objects, auto-tagging is a little more complicated depending on the speed of the moving object. In some embodiments, the velocity of the object has to be taken into account when determining whether the object is indeed the same object from one image to an adjacent image. In some embodiments, the object is analyzed as to whether similar objects are also mobile. Such a comparison can be made with existing known mobile objects. For example, if the object is tagged as a certain object, a search is performed to see if the object can be mobile. In the case of a car, the system searches databases to determine that cars are indeed mobile. If the object is a tree, the system searches the databases to determine that trees are not mobile. In some embodiments, the tags are associated with a marker indicating whether the object is dynamic. In some embodiments, the threshold values for location differences of dynamic objects across adjacent images are much larger. In some embodiments, the values of the location differences of dynamic objects across adjacent images are normalized by the velocities of the dynamic objects and the movement of the camera (if any). For example, if a car is traveling at 2 feet/sec and the camera is stationary, then the value of the difference of location between 1 sec snapshots is divided by 2 feet. After normalization, the object is treated as a stationary object and compared to the usual stationary object threshold values for acceptable location differences.

In some embodiments, tags 744A and 743A could have been created automatically by a tagging neural network trained to identify and label objects within the MIDMR. In some embodiments, the neural network system described herein is a convolutional neural network. In some embodiments, the neural network may comprise multiple computational layers.

In some embodiments, a neural network is trained to label each pixel in an image corresponding to MIDMR 740A. The neural network may be trained to label every pixel in the image with a particular category label (e.g., person, car, sky, etc.). Such training may be done by inputting training pairs comprising a training image and a corresponding label map. The training image may be input into the neural network as a tensor, such as third-order tensor, to be processed through the various layers of neural network for labeling. In some embodiments, the neural network is trained by aggregating outputs from different layers in a feature map that results in a downsample from the original image size. The result may then be compared to the predetermined label map corresponding to that training image. The parameters of the neural network may then be updated. In some embodiments, the parameters are updated using a stochastic gradient descent.

Once the neural network is sufficiently trained, it may be used to label pixels in new image sequences. Such image sequences may be images frames corresponding to a MIDMR. In other embodiments, the images may be unprocessed images captured by a camera.

In some embodiments, a feature map of the image is then produced by the neural network. In some embodiments, the neural network may be trained for k object classes (e.g., person, car, sky, etc.) to produce a feature map that has k channels where channel T represents the probability of each pixel being of object class T. In various embodiments, object classes may include, but are not limited to, the following object classes: building, grass, tree, cow, sheep, sky, airplane, water, face, car, bicycle, flower, sign, bird, book, chair, road, cat, dog, body, and boat. As previously described with reference to the training of the neural network, the neural network is trained by aggregating outputs from different layers in a feature map that results in a downsample from the original image size. The benefit of aggregating feature maps from different layers of the neural network allows the use of both finer scale and coarser scale details to produce these probability maps. For example, using only lower layers or only higher layers would produce suboptimal outputs.

In some embodiment, a probability map for a class of interest may be generated. In some embodiments, to get a probability map of an object class of interest (e.g. person), the feature map corresponding to the person object class is extracted. Then pixels with low probabilities are eliminated. For example, the pixels where the person object class is not the most probable amongst all other classes are zeroed out. In some embodiments, a threshold probability may be predetermined or set by a user. In some embodiments, the pixels with low probabilities are not eliminated, but labeled instead. The pixels corresponding to the desired object class may also be labeled. In some embodiments, the probability values may then be re-normalized between 0-1.

In some embodiments, tags 744A and 743A could have been created automatically by a neural network trained to identify, tag, and label objects within the MIDMR in combination with being created by a user.

In some embodiments, a RANSAC (random sample consensus) algorithm may be implemented to determine the transformation between two objects within the two MIDMRs. In the example described in FIGS. 15B and 15C, when the transformation of objects 743 and 744 in MIDMRs 740A and 740B, respectively, is calculated to determine that objects 743 and 744 in MIDMRs 740A and 740B are the same object, respectively, tags 743B and 744B are automatically generated for objects 743 and 744 in MIDMR 740B. As described herein, transformation may be calculated from keypoints tracked from a first view to a second view. Various transformations may be calculated from various different parameters gathered from various combinations of keypoints. First, keypoints in the first view and corresponding keypoints in the second view are identified. In some embodiments, the first view includes an image that was captured before the image in the second view. In other embodiments, the first view may include an image captured after the image in the second view. In various embodiments, keypoints may be identified using a Harris-style corner detector algorithm or other keypoint detection method. In other embodiments, various other corner detection algorithms may be implemented, such as a Moravec corner detection algorithm, a Forstner corner detector, etc. Such corner detector algorithm may be implemented to detect salient features to designate as keypoints in each view, such as areas of large contrast, areas with minimum ambiguity in different dimensions, and/or areas with high cornerness. A predetermined number keypoints with the highest Harris score may then be selected. For example, 1,000 keypoints may be identified and selected on the first view. The corresponding 1,000 keypoints on the second view can then be identified using a Kanade-Lucas-Tomasi (KLT) feature tracker to track keypoints between the two image views.

Next, two keypoints in the first view and the corresponding keypoints in the second view are selected. In some embodiments, the two keypoints in the first view may be selected randomly by the RANSAC algorithm. The two corresponding keypoints in the second view may be identified by the KLT feature tracker. In some embodiments, two keypoints may be randomly selected in the second view and the corresponding keypoints in the first view are identified. Each pair of corresponding keypoints may be referred to herein as a correspondence. For example, keypoint A on view N and keypoint A' on view N+1 correspond to each other via KLT feature tracking and may comprise a pair (A, A'). A second correspondence (B, B') may be selected which comprises keypoint B on view N and keypoint B' on view N+1.

Based on the two keypoint correspondences, a transformation is then determined between the first view and the second view. In some embodiments, a set of two keypoint correspondences are used to determine a transformation. In other words, a transformation, T1, between the first view and second view may be calculated from the two corresponding pairs of keypoints using a predetermined algorithm. Various parameters may be used to calculate the transformation between corresponding keypoints by a predetermined algorithm. In one example embodiment, similarity 2D parameters, including x and y translations, a 2D rotation, and a 2D scale, may be used to determine the translation. Other parameters that may be used include 2D translation (x and y translation), 2D Euclidean parameters (2D rotation and x,y translation), affine, homography, etc. As another example, a mathematical model may be used, such as that provided in M. Brown, R. Hartley, and D. Nister. Minimal solutions for panoramic stitching. In Proceedings of the International Conference on Computer Vision and Pattern Recognition (CVPRO7), Minneapolis, June 2007. In order to calculate a transformation based on rotation and focal length, four parameters are required: three for rotation and one for focal length. In the above examples, four constraints can be provided by the two correspondences for each selected keypoints between views. The derived close-form solution is the calculated transformation based on the two selected keypoint correspondences. In some embodiments, more than two keypoints are utilized for keypoint correspondences.

Figure 15D:
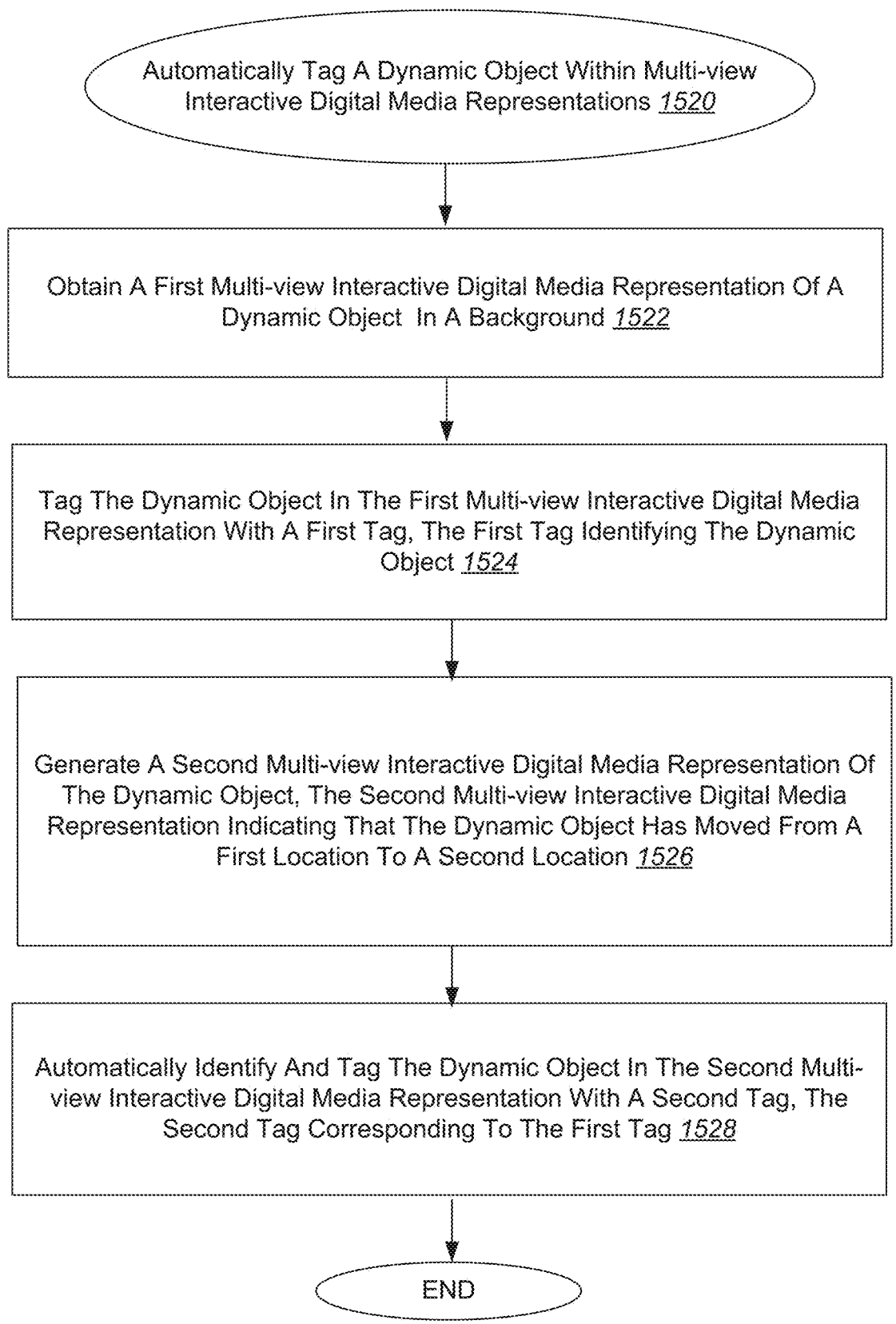
FIG. 15D illustrates an example of a process for automatically tagging of a dynamic object within MIDMRs.

With reference to FIG. 15D, shown is an example of a process for automatically tagging a dynamic object within multi-view interactive digital media representations. At 1522, a first multi-view interactive digital media representations of an object in a background is obtained. Next, the dynamic object in the first multi-view interactive digital media representation is tagged with a first tag, the first tag identifying the dynamic object, at 1524. Then a second multi-view interactive digital media representations of the dynamic object is generated at 1526. In some examples, the second multi-view interactive digital media representation indicates that the dynamic object has moved from a first location to a second location. At 1528, the dynamic object in the second multi-view interactive digital media representation is automatically identified and tagged with a second tag, the second tag corresponding to the first tag.

Figure 16A:
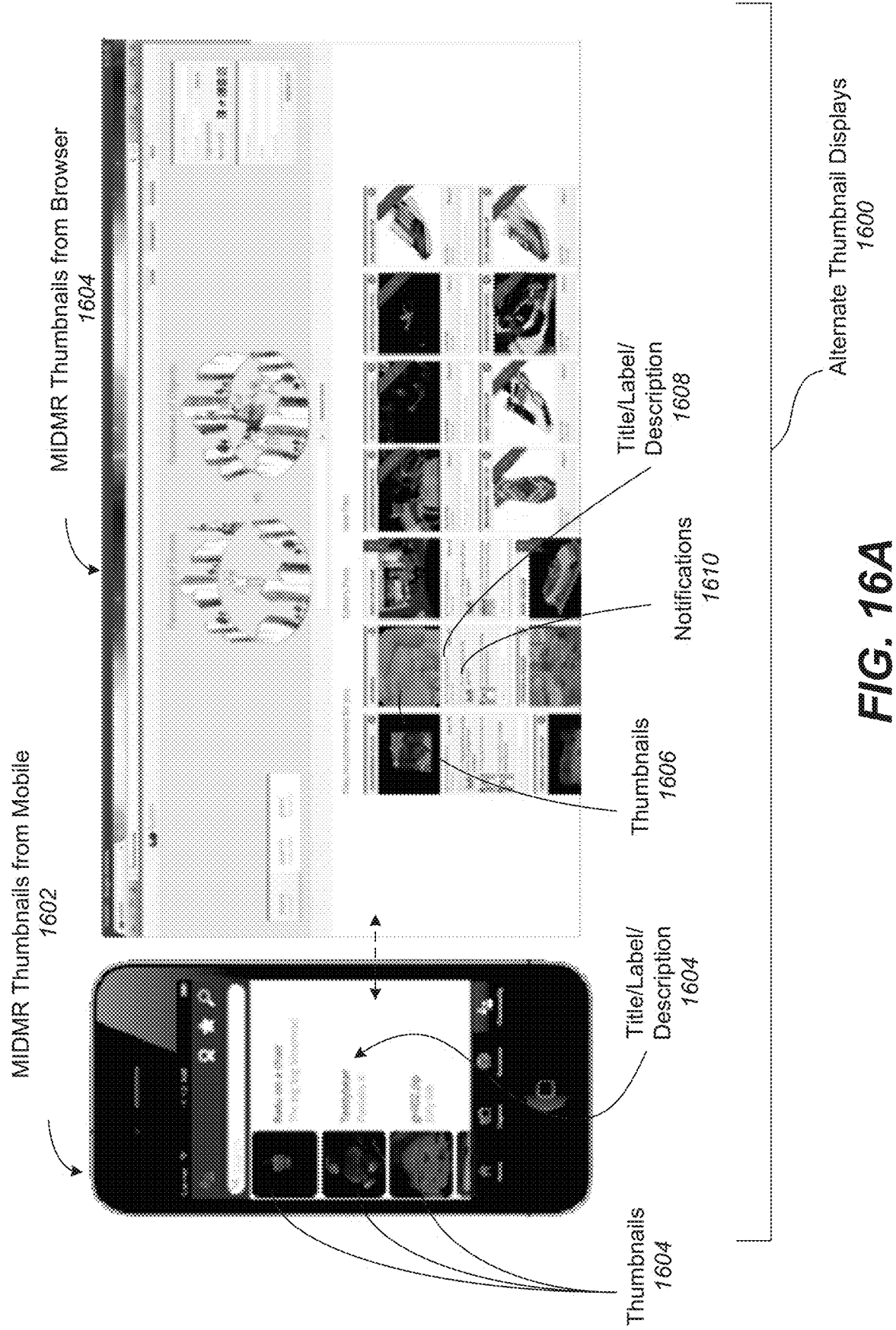
FIG. 16A illustrates examples of a sharing service for MIDMRs, as shown on a mobile device and browser.

According to various embodiments, MIDMRs can be stored and accessed in various ways. In addition, MIDMRs can be used in many applications. With reference to FIG. 16A, shown are examples of a sharing service for MIDMRs on a mobile device 1602 and browser 1604. The mobile device 1602 and browser 1604 are shown as alternate thumbnail displays 1600, because the MIDMRs can be accessed by either interface, depending on the application. According to various embodiments, a set of MIDMRs can be presented to a user in different ways, including but not limited to: a gallery, a feed, and/or a website. For instance, a gallery can be used to present a collection of thumbnails to a user. These thumbnails can be selected from the MIDMRs either by the user or automatically. In some examples, the size of the thumbnails can vary based on characteristics such as, but not limited to: an automatically selected size that is based on the structure and size of the content it contains; and/or the popularity of the MIDMR. In another example, a feed can be used to present MIDMRs using interactive thumbnails.

In the present example, MIDMR thumbnails from a mobile device 1602 include thumbnails 1604 and title/label/description 1604. The thumbnails 1604 can include an image from the MIDMR. The title/label/description 1604 can include information about the MIDMR such as title, file name, description of the content, labels, tags, etc.

Furthermore, in the present example, MIDMR thumbnails from a browser 1604 include thumbnails 1606, title/label/description 1608, and notifications 1610. The thumbnails 1606 can include an image from the MIDMR. The title/label/description 1608 can include information about the MIDMR such as title, file name, description of the content, labels, tags, etc. In addition, notifications 1610 can include information such as comments on a MIDMR, updates about matching content, suggested content, etc. Although not shown on the mobile version, notifications can also be included, but may be omitted in the interest of layout and space considerations in some embodiments. In some examples, notifications can be provided as part of a MIDMR application on a mobile device.

Figure 16B:
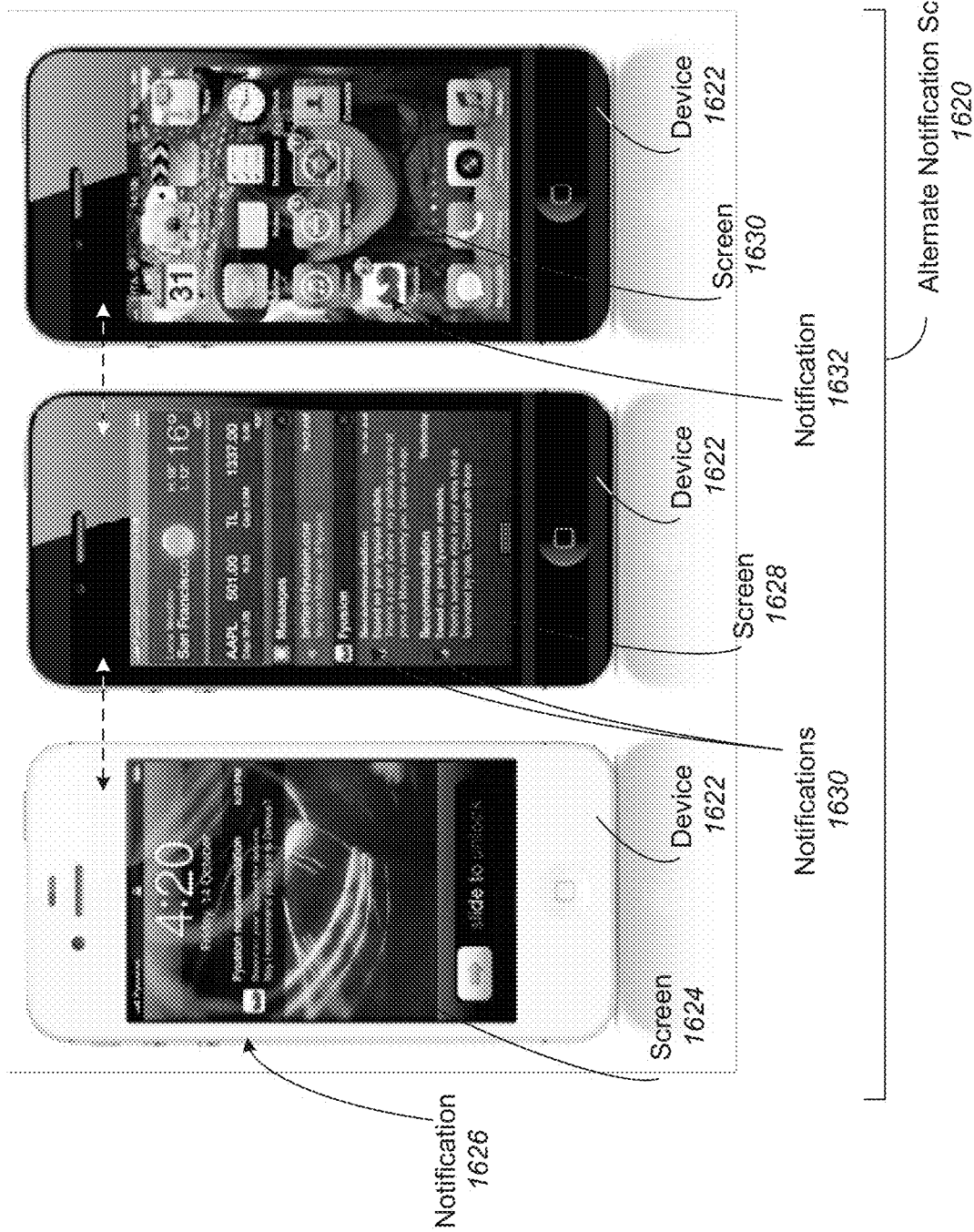
FIG. 16B illustrates examples of MIDMR-related notifications on a mobile device.

With reference to FIG. 16B, shown are examples of MIDMR-related notifications on a mobile device. In particular, alternative notification screens 1620 for a device 1622 are shown that include different formats for notifications. In some examples, a user can navigate between these screens depending on the user's preferences.

In the present example, screen 1624 includes a notification 1626 that includes a recommendation to the user based on content from recent MIDMRs. In particular, the recommendation relates to a trip to Greece based on the application's finding that the user has an affinity for statues. This finding can be inferred from content found in the user's stored or recently browsed MIDMRs, in some examples.

In the present example, screen 1628 includes notifications 1630 based on content from MIDMRs that the user has stored, browsed, etc. For instance, one notification is a recommendation for a pair of shoes available at a nearby retailer that are similar to the user's shoes as provided in a MIDMR model. The recommendation also includes a link to a map to the retailer. This recommendation can be based on a MIDMR that the user has saved of a pair of shoes. The other notification is a recommendation to connect to another user that shares a common interest/hobby. In this example, the recommendation is based on the user's detected interest in hats. These recommendations can be provided automatically in some applications as "push" notifications. The content of the recommendations can be based on the user's MIDMRs or browsing history, and visual search algorithms, such as those described with regard to FIGS. 19-22, can be used in some examples.

Screen 1630 shows another form of notification 1632 in the present example. Various icons for different applications are featured on screen 1630. The icon for the MIDMR application includes a notification 1632 embedded into the icon that shows how many notifications are waiting for the user. When the user selects the icon, the notifications can be displayed and/or the application can be launched, according to various embodiments.

Figure 17B:
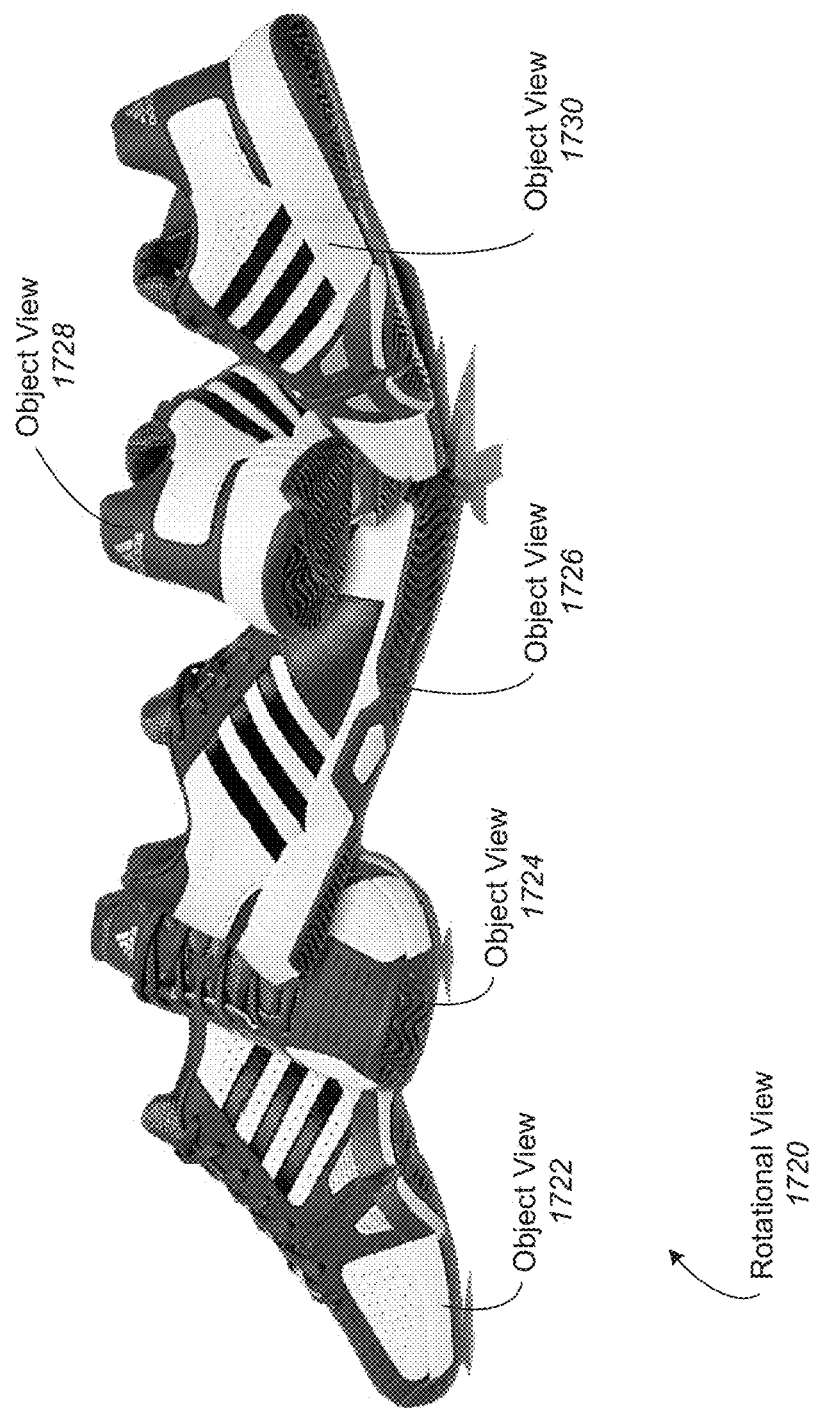
FIG. 17B illustrates one example of a segmented object viewed from different angles.

According to various embodiments of the present disclosure, MIDMRs can be used to segment, or separate, objects from static or dynamic scenes. Because MIDMRs include distinctive 3D modeling characteristics and information derived from image data, MIDMRs provide a unique opportunity for segmentation. In some examples, by treating an object of interest as the MIDMR content, and expressing the remaining of the scene as the context, the object can be segmented out and treated as a separate entity. Additionally, the MIDMR context can be used to refine the segmentation process in some instances. In various embodiments, the content can be chosen either automatically or semi-automatically using user guided interaction. One important use for MIDMR object segmentation is in the context of product showcases in e-commerce, an example of which is shown in FIG. 17B. In addition, MIDMR-based object segmentation can be used to generate object models that are suited for training artificial intelligence search algorithms that can operate on large databases, in the context of visual search applications.

With reference to FIG. 17, shown is one example of a process for providing object segmentation 1700. At 1702, a first MIDMR of an object is obtained. Next, content is selected from the first MIDMR at 1704. In some examples, the content is selected automatically without user input. In other examples, the content is selected semi-automatically using user-guided interaction. The content is then segmented from the first MIDMR at 1706. In some examples, the content is segmented by reconstructing a model of the content in three-dimensions based on the information provided in the first MIDMR, including images from multiple camera viewpoints. In particular example embodiments, a mechanism for selecting and initializing a segmentation algorithm based on iterative optimization algorithms (such as graphical models) can be efficiently employed by reconstructing the object of interest, or parts of it, in three-dimensions from multiple camera viewpoints available in a MIDMR. This process can be repeated over multiple frames, and optimized until segmentation reaches a desired quality output. In addition, segmenting the content can include using the context to determine parameters of the content.

In the present example, once the content is segmented from the first MIDMR, a second MIDMR is generated that includes the object without the content or scenery surrounding the object. At 1708, this second MIDMR is provided. In some examples, the second MIDMR can then be stored in a database. This second MIDMR can be used in various applications. For instance, the segmented content includes a product for use in e-commerce. As illustrated in FIG. 17B, the segmented content can be used to show a product from various viewpoints. Another application includes using the second MIDMR as an object model for artificial intelligence training. In yet another application, the second MIDMR can be used in 3D printing. In this application, data from the second MIDMR is to a 3D printer.

Although the present example describes segmenting out content from a first MIDMR, it should be noted that context can also be segmented out in other examples. For instance, the background scenery can be segmented out and presented as a second MIDMR in some applications. In particular, the context can be selected from the first MIDMR and the context can be segmented from the first MIDMR, such that the context is separated into a distinct interactive model. The resulting MIDMR would then include the scenery surrounding an object but exclude the object itself. A segmented context model can also be used in various applications. For instance, data from the resulting MIDMR can be sent to a 3D printer. In some examples, this could be printed as a panoramic background on a flat or curved surface. If a context model is also printed, then the object of interest can be placed in front of the panoramic background to produce a three-dimensional "photograph" or model of the MIDMR. In another application, the segmented out context can be used as background to a different object of interest. Alternatively, a segmented out content can be placed in a new segmented out context. In these examples, providing an alternative content or context allows objects of interest to be placed into new backgrounds, etc. For instance, a MIDMR of a person could be placed in various background contexts, showing the person standing on a beach in one MIDMR, and standing in the snow in another MIDMR.

With reference to FIG. 17B, shown is one example of a segmented object viewed from different angles. In particular, a rotational view 1720 is shown of an athletic shoe. Object views 1722, 1724, 1726, 1728, and 1730 show the athletic shoe from various angles or viewpoints. As shown, the object itself is shown without any background or context. According to various embodiments, these different views of the segmented object can be automatically obtained from MIDMR content. One application of these types of rotational views is in e-commerce to show product views from different angles. Another application can be in visual search, according to various embodiments.

Figure 18:
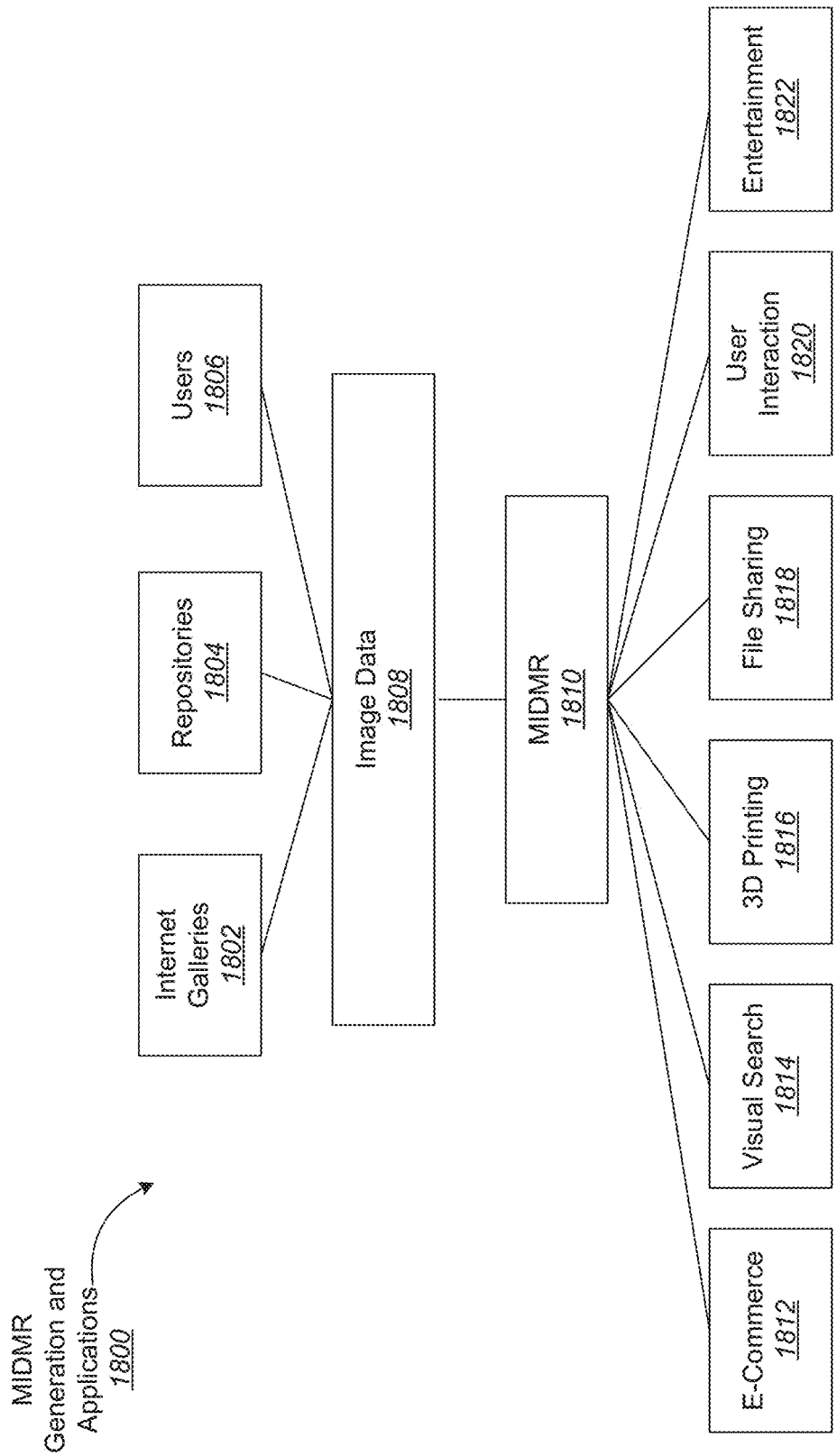
FIG. 18 illustrates one example of various data sources that can be used for MIDMR generation and various applications that can be used with a MIDMR.

According to various embodiments, MIDMRs can be generated from data obtained from various sources and can be used in numerous applications. With reference to FIG. 18, shown is a block diagram illustrating one example of various sources that can be used for MIDMR generation and various applications that can be used with a MIDMR. In the present example, MIDMR generation and applications 1800 includes sources for image data 1808 such as internet galleries 1802, repositories 1804, and users 1806. In particular, the repositories can include databases, hard drives, storage devices, etc. In addition, users 1806 can include images and information obtained directly from users such as during image capture on a smartphone, etc. Although these particular examples of data sources are indicated, data can be obtained from other sources as well. This information can be gathered as image data 1808 to generate a MIDMR 1810, in particular embodiments.

In the present example, a MIDMR 1810 can be used in various applications. As shown, a MIDMR can be used in applications such as e-commerce 1812, visual search 1814, 3D printing 1816, file sharing 1818, user interaction 1820, and entertainment 1822. Of course, this list is only illustrative, and MIDMRs can also be used in other applications not explicitly noted.

As described above with regard to segmentation, MIDMRs can be used in e-commerce 1812. For instance, MIDMRs can be used to allow shoppers to view a product from various angles. In some applications, shoppers can even use MIDMRs to determine sizing, dimensions, and fit. In particular, a shopper can provide a self-model and determine from MIDMRs whether the product would fit the model. MIDMRs can also be used in visual search 1814 as described in more detail below with regard to FIGS. 19-22. Some of the visual search applications can also relate to e-commerce, such as when a user is trying to find a particular product that matches a visual search query.

Another application of segmentation includes three-dimensional printing (3D printing) 1816. Three-dimensional printing has been recently identified as one of the future disruptive technologies that will improve the global economy in the next decade. According to various embodiments, content can be 3D printed from a MIDMR. In addition, the panoramic background context in a MIDMR can also be printed. In some examples, a printed background context can complement the final 3D printed product for users that would like to preserve memories in a 3D printed format. For instance, the context could be printed either as a flat plane sitting behind the 3D content, or as any other geometric shape (spherical, cylindrical, U shape, etc).

As described above with regard to FIG. 16A, MIDMRs can be stored with thumbnail views for user access. This type of application can be used for file sharing 1818 between users in some examples. For instance, a site can include infrastructure for users to share MIDMRs in a manner similar to current photo sharing sites. File sharing 1818 can also be implemented directly between users in some applications.

Also as described with regard to FIGS. 14 and 15, user interaction is another application of MIDMRs. In particular, a user can navigate through a MIDMR for their own pleasure or entertainment. Extending this concept to entertainment 1822, MIDMRs can be used in numerous ways. For instance, MIDMRs can be used in advertisements, videos, etc.

Figure 19:
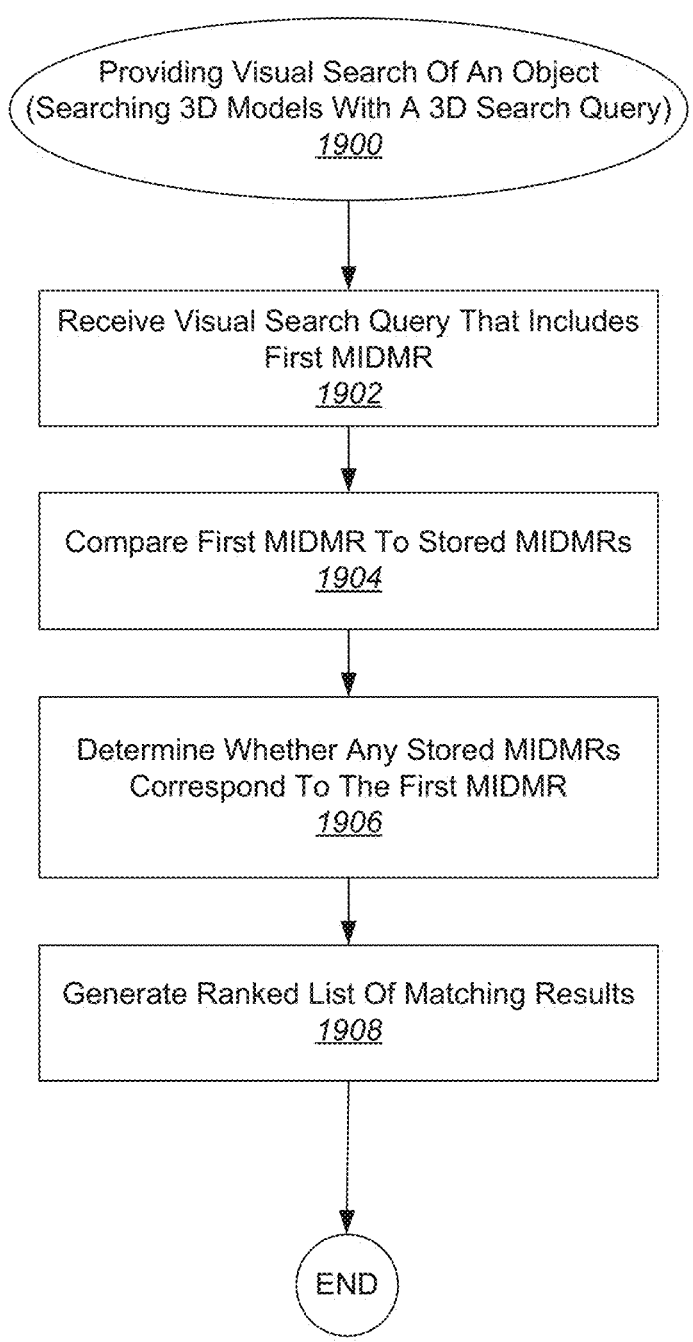
FIG. 19 illustrates one example of a process for providing visual search of an object, where the search query includes a MIDMR of the object and the data searched includes three-dimensional models.
Figure 20:
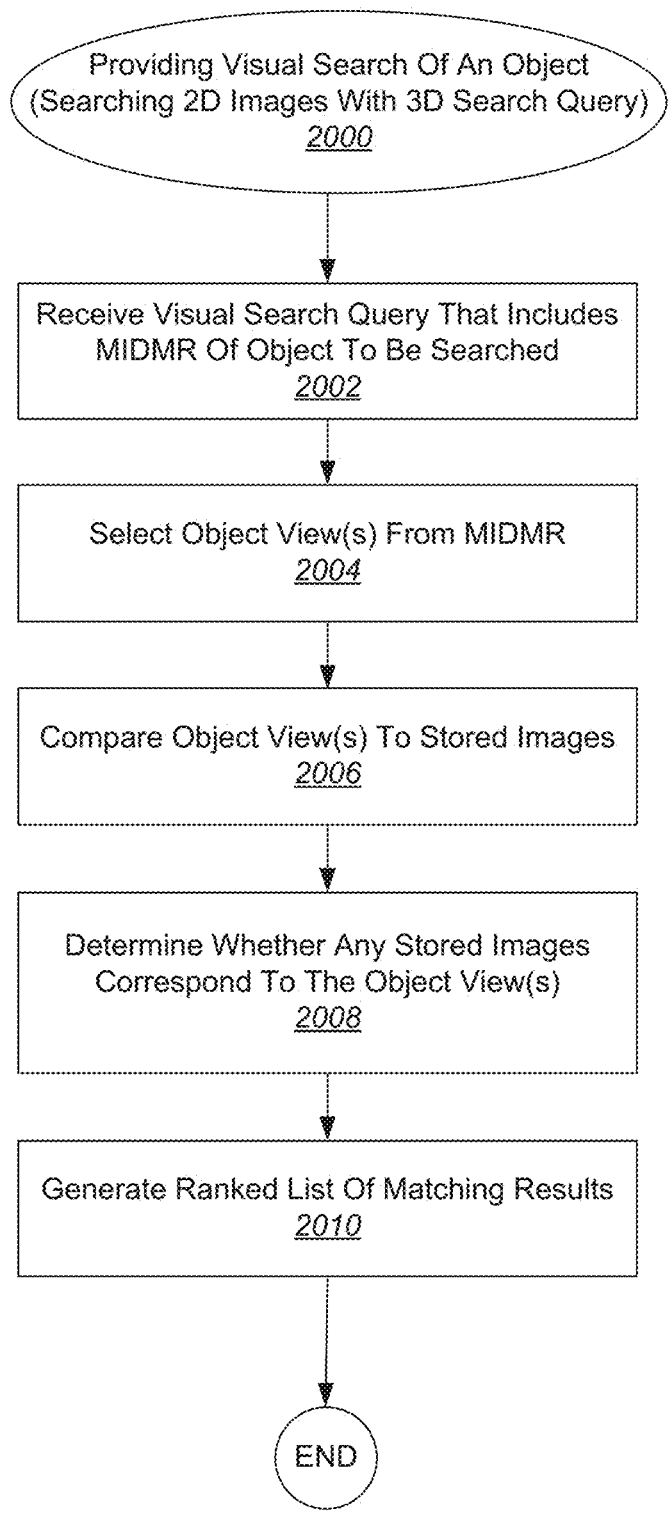
FIG. 20 illustrates one example of a process for providing visual search of an object, where the search query includes a MIDMR of the object and the data searched includes two-dimensional images.
Figure 22:
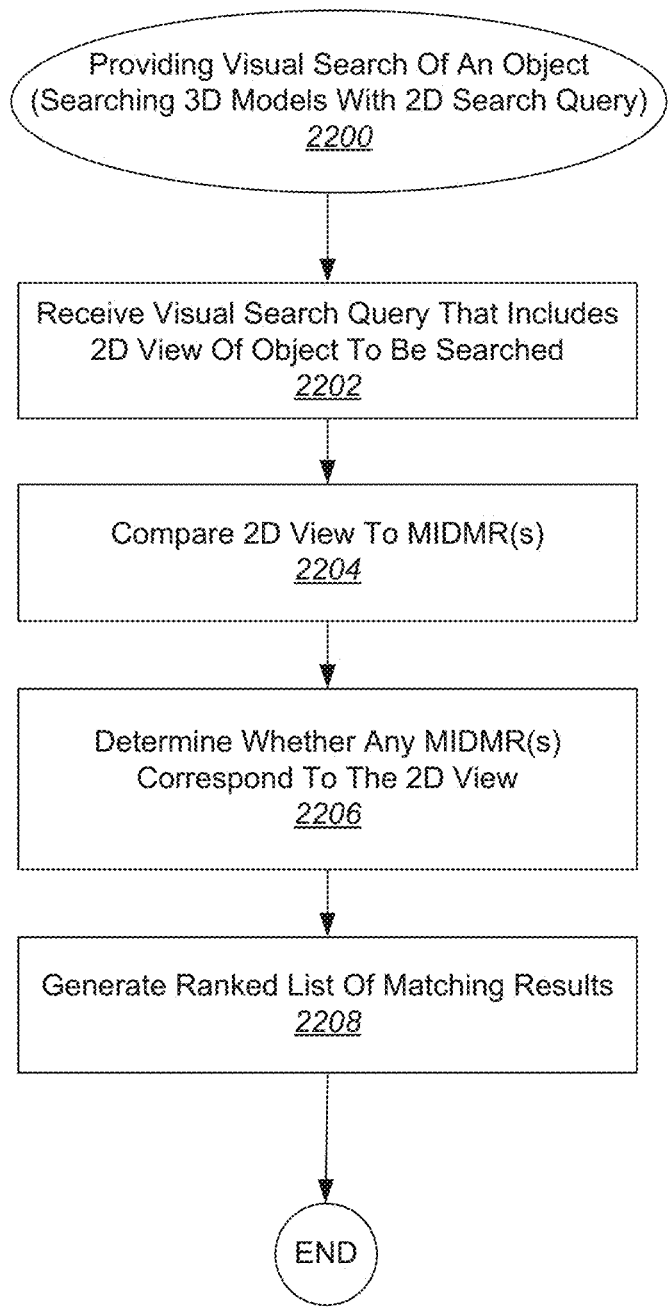
FIG. 22 illustrates an example of a process for providing visual search of an object, where the search query includes a two-dimensional view of the object and the data searched includes MIDMR(s).

As previously described, one application of MIDMRs is visual search. FIGS. 19, 20, and 22 depict examples of visual search using MIDMRs. According to various embodiments, using MIDMRs can provide much higher discriminative power in search results than any other digital media representation to date. In particular, the ability to separate content and context in a MIDMR is an important aspect that can be used in visual search.

Existing digital media formats such as 2D images are unsuitable for indexing, in the sense that they do not have enough discriminative information available natively. As a result, many billions of dollars are spent in research on algorithms and mechanisms for extracting such information from them. This has resulted in satisfactory results for some problems, such as facial recognition, but in general the problem of figuring out a 3D shape from a single image is ill-posed in existing technologies. Although the level of false positives and negatives can be reduced by using sequences of images or 2D videos, the 3D spatial reconstruction methods previously available are still inadequate.

According to various embodiments, additional data sources such as location-based information, which are used to generate MIDMRs, provide valuable information that improves the capability of visual recognition and search. In particular example embodiments, two components of a MIDMR, the context and the content, both contribute significantly in the visual recognition process. In particular example embodiments, the availability of three-dimensional information that the content offers can significantly reduce the number of hypotheses that must be evaluated to recognize a query object or part of a scene. According to various embodiments, the content's three-dimensional information can help with categorization (i.e., figuring out the general category that an object belongs to), and the two-dimensional texture information can indicate more about a specific instance of the object. In many cases, the context information in a MIDMR can also aid in the categorization of a query object, by explaining the type of scene in which the query object is located.

In addition to providing information that can be used to find a specific instance of an object, MIDMRs are also natively suited for answering questions such as: "what other objects are similar in shape and appearance?" Similar to the top-N best matches provided in response to a web search query, a MIDMR can be used with object categorization and recognition algorithms to indicate the "closest matches," in various examples.

Visual search using MIDMRs can be used and/or implemented in various ways. In one example, visual search using MIDMRs can be used in object recognition for robotics. In another example, visual search using MIDMRs can be used in social media curation. In particular, by analyzing the MIDMR data being posted to various social networks, and recognizing objects and parts of scenes, better #hashtags indices can be automatically generated. By generating this type of information, feeds can be curated and the search experience can be enhanced.

Another example in which visual search using MIDMRs can be used is in a shopping context that can be referred to as "Search and Shop." In particular, this visual search can allow recognition of items that are similar in shape and appearance, but might be sold at different prices in other stores nearby. For instance, with reference to FIG. 21, a visual search query may yield similar products available for purchase.

In yet another example in which visual search using MIDMRs can be used is in a shopping context that can be referred to as "Search and Fit." According to various embodiments, because MIDMR content is three-dimensional, precise measurements can be extracted and this information can be used to determine whether a particular object represented in a MIDMR would fit in a certain context (e.g., a shoe fitting a foot, a lamp fitting a room, etc).

In another instance, visual search using MIDMRs can also be used to provide better marketing recommendation engines. For example, by analyzing the types of objects that appear in MIDMRs generated by various users, questions such as "what type of products do people really use in their daily lives" can be answered in a natural, private, and non-intrusive way. Gathering this type of information can facilitate improved recommendation engines, decrease and/ or stop unwanted spam or marketing ads, thereby increasing the quality of life of most users. FIG. 16B shows one implementation in which recommendations can be provided according to various embodiments of the present disclosure.

With reference to FIG. 19, shown is one example of a process for providing visual search of an object 1900, where the search query includes a MIDMR of the object and the data searched includes three-dimensional models. At 1902, a visual search query that includes a first MIDMR is received. This first MIDMR is then compared to stored MIDMRs at 1904. In some embodiments, this comparison can include extracting first measurement information for the object in the first MIDMR and comparing it to second measurement information extracted from the one or more stored MIDMRs. For instance, this type of measurement information can be used for searching items such as clothing, shoes, or accessories.

Next, a determination is made whether any stored MIDMRs correspond to the first MIDMR at 1906. In some examples, this determination is based on whether the subject matter in any of the stored MIDMRs is similar in shape to the object in the first MIDMR. In other examples, this determination is based on whether any of the subject matter in the stored MIDMRs is similar in appearance to the object in the first MIDMR. In yet other examples, this determination is based on whether any subject matter in the stored MIDMRs include similar textures included in the first MIDMR. In some instances, this determination is based on whether any of the contexts associated with the stored MIDMRs match the context of the first MIDMR. In another example, this determination is based on whether the measurement information associated with a stored MIDMR dimensionally fits the object associated with the first MIDMR. Of course any of these bases can be used in conjunction with each other.

Once this determination is made, a ranked list of matching results is generated at 1908. In some embodiments, generating a ranked list of matching results includes indicating how closely any of the stored MIDMRs dimensionally fits the object associated with the first measurement information. According to various embodiments, this ranked list can include displaying thumbnails of matching results. In some examples, links to retailers can be included with the thumbnails. Additionally, information about the matching results such as name, brand, price, sources, etc. can be included in some applications.

Although the previous example includes using a MIDMR as a visual search query to search through stored MIDMRs or three-dimensional models, current infrastructure still includes a vast store of two-dimensional images. For instance, the internet provides access to numerous two-dimensional images that are easily accessible. Accordingly, using a MIDMR to search through stored two-dimensional images for matches can provide a useful application of MIDMRs with the current two-dimensional infrastructure.

With reference to FIG. 20, shown is one example of a process for providing visual search of an object 2000, where the search query includes a MIDMR of the object and the data searched includes two-dimensional images. At 2002, a visual search query that includes a first MIDMR is received. Next, object view(s) are selected from the MIDMR at 2004. In particular, one or more two-dimensional images are selected from the MIDMR. Because these object view(s) will be compared to two-dimensional stored images, selecting multiple views can increase the odds of finding a match. Furthermore, selecting one or more object views from the MIDMR can include selecting object views that provide recognition of distinctive characteristics of the object.

In the present example, the object view(s) are then compared to stored images at 2006. In some embodiments, one or more of the stored images can be extracted from stored MIDMRs. These stored MIDMRs can be retrieved from a database in some examples. In various examples, comparing the one or more object views to the stored images includes comparing the shape of the object in the MIDMR to the stored images. In other examples, comparing the one or more object views to the stored images includes comparing the appearance of the object in the MIDMR to the stored images. Furthermore, comparing the one or more object views to the stored images can include comparing the texture of the object in the MIDMR to the stored images. In some embodiments, comparing the one or more object views to the stored images includes comparing the context of the object in the MIDMR to the stored images. Of course any of these criteria for comparison can be used in conjunction with each other.

Next, a determination is made whether any stored images correspond to the object view(s) at 2008. Once this determination is made, a ranked list of matching results is generated at 2010. According to various embodiments, this ranked list can include displaying thumbnails of matching results. In some examples, links to retailers can be included with the thumbnails. Additionally, information about the matching results such as name, brand, price, sources, etc. can be included in some applications.

Figure 21:
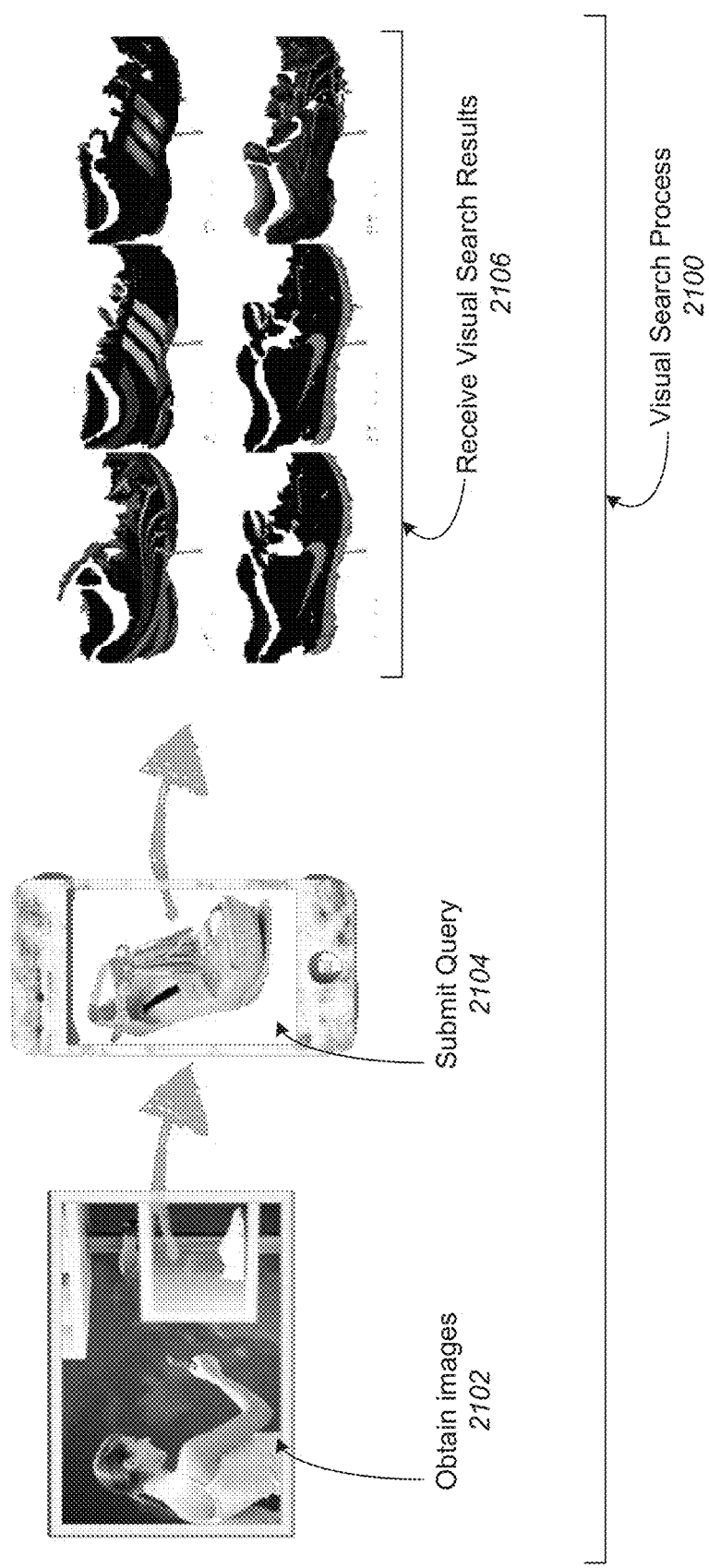
FIG. 21 illustrates an example of a visual search process.

With reference to FIG. 21, shown is an example of a visual search process 2100. In the present example, images are obtained at 2102. These images can be captured by a user or pulled from stored files. Next, according to various embodiments, a MIDMR is generated based on the images. This MIDMR is then used as a visual search query that is submitted at 2104. In this example, a MIDMR can be used to answer questions such as "which other objects in a database look like the query object." As illustrated, MIDMRs can help shift the visual search paradigm from finding other "images that look like the query," to finding other "objects that look like the query," due to their better semantic information capabilities. As described with regard to FIGS. 19 and 20 above, the MIDMR can then be compared to the stored MIDMRs or images and a list of matching results can be provided at 2106.

Although the previous examples of visual search include using MIDMRs as search queries, it may also be useful to provide search queries for two-dimensional images in some embodiments. With reference to FIG. 22, shown is an example of a process for providing visual search of an object 2200, where the search query includes a two-dimensional view of the object and the data searched includes MIDMR(s). At 2202, a visual search query that includes a two-dimensional view of an object to be searched is received. In some examples, the two-dimensional view is obtained from an object MIDMR, wherein the object MIDMR includes a three-dimensional model of the object. Next, the two-dimensional view is compared to MIDMRs at 2204. In some examples, the two-dimensional view can be compared to one or more content views in the MIDMRs. In particular, the two-dimensional view can be compared to one or more two-dimensional images extracted from the MIDMRs from different viewing angles. According to various examples, the two-dimensional images extracted from the MIDMRs correspond to viewing angles that provide recognition of distinctive characteristics of the content. In other examples, comparing the two-dimensional view to one or more MIDMRs includes comparing the two-dimensional view to one or more content models. Various criteria can be used to compare the images or models such as the shape, appearance, texture, and context of the object. Of course any of these criteria for comparison can be used in conjunction with each other.

Figure 23:
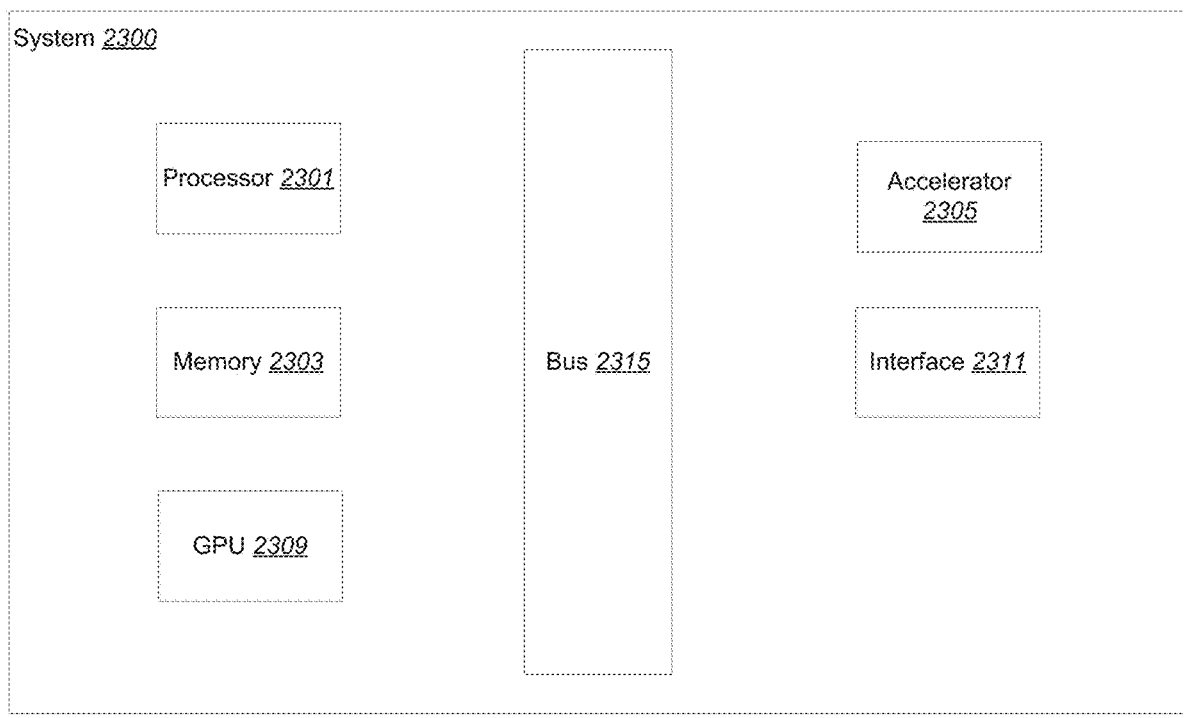
FIG. 23 illustrates a particular example of a computer system that can be used with various embodiments of the present disclosure.

With reference to FIG. 23, shown is a particular example of a computer system that can be used to implement particular examples of the present disclosure. For instance, the computer system 2300 can be used to provide MIDMRs according to various embodiments described above. According to particular example embodiments, a system 2300 suitable for implementing particular embodiments of the present disclosure includes a processor 2301, a memory 2303, an acceleratory 2305, an interface 2311, and a bus 2315 (e.g., a PCI bus or other interconnection fabric). The interface 2311 may include separate input and output interfaces, or may be a unified interface supporting both operations. When acting under the control of appropriate software or firmware, the processor 2301 is responsible for such tasks such as optimization. Various specially configured devices can also be used in place of a processor 2301 or in addition to processor 2301. The complete implementation can also be done in custom hardware. The interface 2311 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In some embodiments, system 2300 further comprises a graphics processing unit (GPU) 2309. As described above, the GPU 2309 may be implemented to process each pixel on a separate thread to compute and determine transformation. In some embodiments, system 2300 further comprises an accelerator 2305. In various embodiments, accelerator 2305 is a rendering accelerator chip, which may be separate from the graphics processing unit. Accelerator 2305 may be configured to speed up the processing for the overall system 2300 by processing pixels in parallel to prevent overloading of the system 2300. For example, in certain instances, ultra-high-definition images may be processed, which include many pixels, such as DCI 4K or UHD-1 resolution. In such instances, excess pixels may be more than can be processed on a standard GPU processor, such as GPU 2309. In some embodiments, accelerator 2305 may only be utilized when high system loads are anticipated or detected.

In some embodiments, accelerator 2305 may be a hardware accelerator in a separate unit from the CPU, such as processor 2301. Accelerator 2305 may enable automatic parallelization capabilities in order to utilize multiple processors simultaneously in a shared memory multiprocessor machine. The core of accelerator 2305 architecture may be a hybrid design employing fixed-function units where the operations are very well defined and programmable units where flexibility is needed. In various embodiments, accelerator 2305 may be configured to accommodate higher performance and extensions in APIs, particularly OpenGL 2 and DX9. The systems and method described herein provide many benefits including improvements to the actual computers themselves. The generation of the multi-view interactive digital media representations are stored without polygon and/or texturizing parameters. Thus, navigation of different views of the interactive digital media representations on a viewing device requires less processing power as compared with 3D models generated through traditional means. Less processing power means quicker transitions, without lag, and smoother transitions. In addition, lower-end devices with less processing power and less computing resources, which prevent the devices from properly displaying traditional high quality 3D models, will also be able to display the multi-view interactive digital media representations while maintaining high quality user experiences.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:
1. A method comprising:
 obtaining a first multi-view interactive digital media representation of a dynamic object in motion in a background, the first multi-view interactive digital media representation being generated via stitching together two-dimensional images such that the stitched two-dimensional images are experienced as a three dimensional view without actually rendering or generating an actual three-dimensional model using polygon generation, wherein the two-dimensional images were generated using a concave capture motion relative to the dynamic object;

tagging the dynamic object in the first multi-view interactive digital media representation with a first tag, the first tag identifying the dynamic object;

generating a second multi-view interactive digital media representation of the dynamic object, the second multi-view interactive digital media representation indicating that the dynamic object has moved from a first location to a second location, wherein the second multi-view interactive digital media representation is generated in the same manner as the first multi-view interactive digital media representation; and automatically identifying and tagging the dynamic object in the second multi-view interactive digital media representation with a second tag based at least on a captured velocity of the dynamic object as the dynamic object moved from the first location to the second location, the second tag corresponding to the first tag, wherein generating the second multi-view interactive digital media representation of the dynamic object and automatically identifying and tagging the dynamic object in the second multi-view interactive digital media representation are performed in substantially real-time upon tagging the dynamic object.

2. The method of claim 1, wherein the first multi-view interactive digital media representation depicts a first view angle of the background.

3. The method of claim 1, wherein the second multi-view interactive digital media representation depicts a second view angle of the background.

4. The method of claim 1, wherein the second multi-view interactive digital media representation depicts the dynamic object from a different angle as well as a different location from the dynamic object in the first multi-view interactive digital media representation.

5. The method of claim 1, wherein the first and second tags include the same text or title for identifying the dynamic object.

6. The method of claim 1, wherein the first tag is mapped to a first location in the first multi-view interactive digital media representation.

7. The method of claim 1, wherein the second tag is mapped to a second location in the second multi-view interactive digital media representation corresponding to how much the dynamic object has moved from the first multi-view interactive digital media representation to the second multi-view interactive digital media representation.

8. A system comprising:
a processor; and
memory comprising instructions to execute a method, the method comprising:
obtaining a first multi-view interactive digital media representation of a dynamic object in motion in a background, the first multi-view interactive digital media representation being generated via stitching together two-dimensional images such that the stitched two-dimensional images are experienced as a three dimensional view without actually rendering or generating an actual three-dimensional model using polygon generation, wherein the two-dimensional images were generated using a concave capture motion relative to the dynamic object;

tagging the dynamic object in the first multi-view interactive digital media representation with a first tag, the first tag identifying the dynamic object;

generating a second multi-view interactive digital media representation of the dynamic object, the second multi-view interactive digital media representation indicating that the dynamic object has moved from a first location to a second location, wherein the second multi-view interactive digital media representation is generated in the same manner as the first multi-view interactive digital media representation; and automatically identifying and tagging the dynamic object in the second multi-view interactive digital media representation with a second tag based at least on a captured velocity of the dynamic object as the dynamic object moved from the first location to the second location, the second tag corresponding to the first tag, wherein generating the second multi-view interactive digital media representation of the dynamic object and automatically identifying and tagging the dynamic object in the second multi-view interactive digital media representation are performed in substantially real-time upon tagging the dynamic object.

9. The system of claim 8, wherein the first multi-view interactive digital media representation depicts a first view angle of the background.

10. The system of claim 8, wherein the second multi-view interactive digital media representation depicts a second view angle of the background.

11. The system of claim 8, wherein the second multi-view interactive digital media representation depicts the dynamic object from a different angle as well as a different location from the dynamic object in the first multi-view interactive digital media representation.

12. The system of claim 8, wherein the first and second tags include the same text or title for identifying the dynamic object.

13. The system of claim 8, wherein the first tag is mapped to a first location in the first multi-view interactive digital media representation.

14. The system of claim 8, wherein the second tag is mapped to a second location in the second multi-view interactive digital media representation corresponding to how much the dynamic object has moved from the first multi-view interactive digital media representation to the second multi-view interactive digital media representation.

15. A non-transitory computer readable medium comprising instructions to execute a method, the method comprising:
obtaining a first multi-view interactive digital media representation of a dynamic object in motion in a background, the first multi-view interactive digital media representation being generated via stitching together two-dimensional images such that the stitched two-dimensional images are experienced as a three dimensional view without actually rendering or generating an actual three-dimensional model using polygon generation, wherein the two-dimensional images were generated using a concave capture motion relative to the dynamic object;

tagging the dynamic object in the first multi-view interactive digital media representation with a first tag, the first tag identifying the dynamic object;

generating a second multi-view interactive digital media representation of the dynamic object, the second multi-view interactive digital media representation indicating that the dynamic object has moved from a first location to a second location, wherein the second multi-view interactive digital media representation is generated in the same manner as the first multi-view interactive digital media representation; and automatically identifying and tagging the dynamic object in the second multi-view interactive digital media representation with a second tag based at least on a captured velocity of the dynamic object as the dynamic object moved from the first location to the second location, the second tag corresponding to the first tag, wherein generating the second multi-view interactive digital media representation of the dynamic object and automatically identifying and tagging the dynamic object in the second multi-view interactive digital media representation are performed in substantially real-time upon tagging the dynamic object.

16. The non-transitory computer readable medium of claim 15, wherein the first multi-view interactive digital media representation depicts a first view angle of the background.

17. The non-transitory computer readable medium of claim 15, wherein the second multi-view interactive digital media representation depicts a second view angle of the background.

18. The non-transitory computer readable medium of claim 15, wherein the second multi-view interactive digital media representation depicts the dynamic object from a different angle as well as a different location from the dynamic object in the first multi-view interactive digital media representation.

19. The non-transitory computer readable medium of claim 15, wherein the first and second tags include the same text or title for identifying the dynamic object.

20. The non-transitory computer readable medium of claim 15, wherein the first tag is mapped to a first location in the first multi-view interactive digital media representation and the second tag is mapped to a second location in the second multi-view interactive digital media representation corresponding to how much the dynamic object has moved from the first multi-view interactive digital media representation to the second multi-view interactive digital media representation.

* * * * *